United States Patent [19]
Toyoyama et al.

[11] Patent Number: 5,864,494
[45] Date of Patent: Jan. 26, 1999

[54] DISCRETE COSINE TRANSFORMER AND INVERSE DISCRETE COSINE TRANSFORMER

[75] Inventors: Shinji Toyoyama, Nara; Yuichi Sato, Mie, both of Japan

[73] Assignee: Sharp Kabushiki Kaisha, Osaka, Japan

[21] Appl. No.: 906,519

[22] Filed: Aug. 5, 1997

[30] Foreign Application Priority Data

Aug. 8, 1996 [JP] Japan .................................. 8-209493

[51] Int. Cl.$^6$ ....................................................... G06F 17/14
[52] U.S. Cl. ......................................................... 364/725.03
[58] Field of Search ........................................ 364/725.03

[56] References Cited

U.S. PATENT DOCUMENTS

| | | | |
|---|---|---|---|
| 5,331,584 | 7/1994 | Kitsuki et al. ..................... | 364/725.03 |
| 5,357,453 | 10/1994 | Kim et al. .......................... | 364/725.03 |
| 5,471,412 | 11/1995 | Shyu ................................... | 364/725.03 |
| 5,477,469 | 12/1995 | Motomura .......................... | 364/725.03 |

OTHER PUBLICATIONS

"A New Hardware Realization of Digital Filters", Peled et al, IEEE Transactions on Acoustics, Speech, and Signal Processing, vol. ASSP–22, No. 6, pp. 456–462.

"A 100–Mhz 2–D Discrete Cosine Transfor Core Processor", Uramoto et al., IEEE Journal of Solid–State Circuits, vol. 27, No. 4, Apr. 1992, pp. 492–499.

Primary Examiner—David H. Malzahn

[57] ABSTRACT

A discrete cosine transformer capable of real time processing without a multiplier having small circuit scale and small power consumption includes an adder/subtractor receiving a plurality of image data items for outputting a plurality of image data item addition/subtraction values in accordance with a prescribed rule, a bit distributor connected to the adder/subtractor, receiving the plurality of image data item addition/subtraction values for outputting a plurality of bit trains consisting of bits at same bit position of the plurality of image data item addition/subtraction values, a selection signal generating circuit for successively generating a selection signal of a DCT coefficient, and a DCT coefficient generating circuit connected to the bit distributor and to the selection signal generating circuit, receiving a plurality of bit trains and responsive to the successively generated selection signal, for performing calculation of the DCT coefficient in time-divisional manner.

20 Claims, 26 Drawing Sheets

FIG.4A  PRIOR ART

|  |  | ROM429<br>ROM529,530 | ROM430<br>ROM531,532 | ROM431<br>ROM533,534 | ROM432<br>ROM535,536 |
|---|---|---|---|---|---|
| INPUT | 0000 | 0 | 0 | 0 | 0 |
|  | 0001 | C4 | -C2 | C4 | -C6 |
|  | 0010 | C4 | -C6 | -C4 | C2 |
|  | 0011 | 2C4 | -C2-C6 | 0 | C2-C6 |
|  | 0100 | C4 | C6 | -C4 | -C2 |
|  | 0101 | 2C4 | -C2+C6 | 0 | -C2-C6 |
|  | 0110 | 2C4 | 0 | -2C4 | 0 |
|  | 0111 | 3C4 | -C2 | -C4 | -C6 |
|  | 1000 | C4 | C2 | C4 | C6 |
|  | 1001 | 2C4 | 0 | 2C4 | 0 |
|  | 1010 | 2C4 | C2-C6 | 0 | C2+C6 |
|  | 1011 | 3C4 | -C6 | C4 | C2 |
|  | 1100 | 2C4 | C2+C6 | 0 | -C2+C6 |
|  | 1101 | 3C4 | C6 | C4 | -C2 |
|  | 1110 | 3C4 | C2 | -C4 | C6 |
|  | 1111 | 4C4 | 0 | 0 | 0 |

FIG.4B  PRIOR ART

|  |  | ROM433<br>ROM537,538 | ROM434<br>ROM539,540 | ROM435<br>ROM541,542 | ROM436<br>ROM543,544 |
|---|---|---|---|---|---|
| INPUT | 0000 | 0 | 0 | 0 | 0 |
|  | 0001 | C7 | -C5 | C3 | -C1 |
|  | 0010 | C5 | -C1 | C7 | C3 |
|  | 0011 | C5+C7 | -C1-C5 | C3+C7 | -C1+C3 |
|  | 0100 | C3 | -C7 | -C1 | -C5 |
|  | 0101 | C3+C7 | -C5-C7 | -C1+C3 | -C1-C5 |
|  | 0110 | C3+C5 | -C1-C7 | -C1+C7 | C3-C5 |
|  | 0111 | C3+C5+C7 | -C1-C5-C7 | -C1+C3+C7 | -C1+C3-C5 |
|  | 1000 | C1 | C3 | C5 | C7 |
|  | 1001 | C1+C7 | C3-C5 | C3+C5 | -C1+C7 |
|  | 1010 | C1+C5 | -C1+C3 | C5+C7 | C3+C7 |
|  | 1011 | C1+C5+C7 | -C1+C3-C5 | C3+C5+C7 | -C1+C3+C7 |
|  | 1100 | C1+C3 | C3-C7 | -C1+C5 | -C5+C7 |
|  | 1101 | C1+C3+C7 | C3-C5-C7 | -C1+C3+C5 | -C1-C5+C7 |
|  | 1110 | C1+C3+C5 | -C1+C3-C7 | -C1+C5+C7 | C3-C5+C7 |
|  | 1111 | C1+C3+C5+C7 | -C1+C3-C5-C7 | -C1+C3+C5+C7 | -C1+C3-C5+C7 |

*FIG.11A*

ROM122~131

| | | INPUT (ROW SELECTION SIGNAL) | | | |
|---|---|---|---|---|---|
| | | 000 | 001 | 010 | 011 |
| INPUT (4 BIT TRAIN) | 0000 | 0 | 0 | 0 | 0 |
| | 0001 | C4 | -C2 | C4 | -C6 |
| | 0010 | C4 | -C6 | -C4 | C2 |
| | 0011 | 2C4 | -C2-C6 | 0 | C2-C6 |
| | 0100 | C4 | C6 | -C4 | -C2 |
| | 0101 | 2C4 | -C2+C6 | 0 | -C2-C6 |
| | 0110 | 2C4 | 0 | -2C4 | 0 |
| | 0111 | 3C4 | -C2 | -C4 | -C6 |
| | 1000 | C4 | C2 | C4 | C6 |
| | 1001 | 2C4 | 0 | 2C4 | 0 |
| | 1010 | 2C4 | C2-C6 | 0 | C2+C6 |
| | 1011 | 3C4 | -C6 | C4 | C2 |
| | 1100 | 2C4 | C2+C6 | 0 | -C2+C6 |
| | 1101 | 3C4 | C6 | C4 | -C2 |
| | 1110 | 3C4 | C2 | -C4 | C6 |
| | 1111 | 4C4 | 0 | 0 | 0 |

*FIG.11B*

ROM122~131

| | | INPUT (ROW SELECTION SIGNAL) | | | |
|---|---|---|---|---|---|
| | | 100 | 101 | 110 | 111 |
| INPUT (4 BIT TRAIN) | 0000 | 0 | 0 | 0 | 0 |
| | 0001 | C7 | -C5 | C3 | -C1 |
| | 0010 | C5 | -C1 | C7 | C3 |
| | 0011 | C5+C7 | -C1-C5 | C3+C7 | -C1+C3 |
| | 0100 | C3 | -C7 | -C1 | -C5 |
| | 0101 | C3+C7 | -C5-C7 | -C1+C3 | -C1-C5 |
| | 0110 | C3+C5 | -C1-C7 | -C1+C7 | C3-C5 |
| | 0111 | C3+C5+C7 | -C1-C5-C7 | -C1+C3+C7 | -C1+C3-C5 |
| | 1000 | C1 | C3 | C5 | C7 |
| | 1001 | C1+C7 | C3-C5 | C3+C5 | -C1+C7 |
| | 1010 | C1+C5 | -C1+C3 | C5+C7 | C3+C7 |
| | 1011 | C1+C5+C7 | -C1+C3-C5 | C3+C5+C7 | -C1+C3+C7 |
| | 1100 | C1+C3 | C3-C7 | -C1+C5 | -C5+C7 |
| | 1101 | C1+C3+C7 | C3-C5-C7 | -C1+C3+C5 | -C1-C5+C7 |
| | 1110 | C1+C3+C5 | -C1+C3-C7 | -C1+C5+C7 | C3-C5+C7 |
| | 1111 | C1+C3+C5+C7 | -C1+C3-C5-C7 | -C1+C3+C5+C7 | -C1+C3-C5+C7 |

FIG.16A

ROM222

| | INPUT (ROW SELECTION SIGNAL) | | | |
|---|---|---|---|---|
| | 000 | 001 | 010 | 011 |
| OUTPUT | 0<br>C4<br>C4<br>2C4<br>C4<br>2C4<br>2C4<br>3C4<br>C4<br>2C4<br>2C4<br>3C4<br>2C4<br>3C4<br>3C4<br>4C4 | 0<br>-C2<br>-C6<br>-C2-C6<br>C6<br>-C2+C6<br>0<br>-C2<br>C2<br>0<br>C2-C6<br>-C6<br>C2+C6<br>C6<br>C2<br>0 | 0<br>C4<br>-C4<br>0<br>-C4<br>0<br>-2C4<br>-C4<br>C4<br>2C4<br>0<br>C4<br>0<br>C4<br>-C4<br>0 | 0<br>-C6<br>C2<br>C2-C6<br>-C2<br>-C2-C6<br>0<br>-C6<br>C6<br>0<br>C2+C6<br>C2<br>-C2+C6<br>-C2<br>C6<br>0 |

FIG.16B

ROM222

| | INPUT (ROW SELECTION SIGNAL) | | | |
|---|---|---|---|---|
| | 100 | 101 | 110 | 111 |
| OUTPUT | 0<br>C7<br>C5<br>C5+C7<br>C3<br>C3+C7<br>C3+C5<br>C3+C5+C7<br>C1<br>C1+C7<br>C1+C5<br>C1+C5+C7<br>C1+C3<br>C1+C3+C7<br>C1+C3+C5<br>C1+C3+C5+C7 | 0<br>-C5<br>-C1<br>-C1-C5<br>-C7<br>-C5-C7<br>-C1-C7<br>-C1-C5-C7<br>C3<br>C3-C5<br>-C1+C3<br>-C1+C3-C5<br>C3-C7<br>C3-C5-C7<br>-C1+C3-C7<br>-C1+C3-C5-C7 | 0<br>C3<br>C7<br>C3+C7<br>-C1<br>-C1+C3<br>-C1+C7<br>-C1+C3+C7<br>C5<br>C3+C5<br>C5+C7<br>C3+C5+C7<br>-C1+C5<br>-C1+C3+C5<br>-C1+C5+C7<br>-C1+C3+C5+C7 | 0<br>-C1<br>C3<br>-C1+C3<br>-C5<br>-C1-C5<br>C3-C5<br>-C1+C3-C5<br>C7<br>-C1+C7<br>C3+C7<br>-C1+C3+C7<br>-C5+C7<br>-C1-C5+C7<br>C3-C5+C7<br>-C1+C3-C5+C7 |

FIG.20A

ROM325

| | | ROW SELECTION SIGNAL | | | | | | | |
|---|---|---|---|---|---|---|---|---|---|
| | | 000 | 001 | 010 | 011 | 100 | 101 | 110 | 111 |
| INPUT | 0 | 0 | 0 | 0 | 0 | 0 | 0 | 0 | 0 |
| | 1 | -C4 | -C2 | -C4 | -C6 | -C1 | -C3 | -C5 | -C7 |

FIG.20B

ROM326~328

| | | ROW SELECTION SIGNAL | | | | | | | |
|---|---|---|---|---|---|---|---|---|---|
| | | 000 | 001 | 010 | 011 | 100 | 101 | 110 | 111 |
| INPUT | 000 | 0 | 0 | 0 | 0 | 0 | 0 | 0 | 0 |
| | 001 | C4 | C2 | C4 | C6 | C1 | C3 | C5 | C7 |
| | 010 | 2C4 | 2C2 | 2C4 | 2C6 | 2C1 | 2C3 | 2C5 | 2C7 |
| | 011 | 3C4 | 3C2 | 3C4 | 3C6 | 3C1 | 3C3 | 3C5 | 3C7 |
| | 100 | 4C4 | 4C2 | 4C4 | 4C6 | 4C1 | 4C3 | 4C5 | 4C7 |
| | 101 | 5C4 | 5C2 | 5C4 | 5C6 | 5C1 | 5C3 | 5C5 | 5C7 |
| | 110 | 6C4 | 6C2 | 6C4 | 6C6 | 6C1 | 6C3 | 6C5 | 6C7 |
| | 111 | 7C4 | 7C2 | 7C4 | 7C6 | 7C1 | 7C3 | 7C5 | 7C7 |

FIG.20C

ROM329

| | | ROW SELECTION SIGNAL | | | | | | | |
|---|---|---|---|---|---|---|---|---|---|
| | | 000 | 001 | 010 | 011 | 100 | 101 | 110 | 111 |
| INPUT | 0 | 0 | 0 | 0 | 0 | 0 | 0 | 0 | 0 |
| | 1 | -C4 | -C6 | C4 | C2 | -C3 | C7 | C1 | C5 |

FIG.20D

ROM330~332

| | | ROW SELECTION SIGNAL | | | | | | | |
|---|---|---|---|---|---|---|---|---|---|
| | | 000 | 001 | 010 | 011 | 100 | 101 | 110 | 111 |
| INPUT | 000 | 0 | 0 | 0 | 0 | 0 | 0 | 0 | 0 |
| | 001 | C4 | C6 | -C4 | -C2 | C3 | -C7 | -C1 | -C5 |
| | 010 | 2C4 | 2C6 | -2C4 | -2C2 | 2C3 | -2C7 | -2C1 | -2C5 |
| | 011 | 3C4 | 3C6 | -3C4 | -3C2 | 3C3 | -3C7 | -3C1 | -3C5 |
| | 100 | 4C4 | 4C6 | -4C4 | -4C2 | 4C3 | -4C7 | -4C1 | -4C5 |
| | 101 | 5C4 | 5C6 | -5C4 | -5C2 | 5C3 | -5C7 | -5C1 | -5C5 |
| | 110 | 6C4 | 6C6 | -6C4 | -6C2 | 6C3 | -6C7 | -6C1 | -6C5 |
| | 111 | 7C4 | 7C6 | -7C4 | -7C2 | 7C3 | -7C7 | -7C1 | -7C5 |

FIG.21A

ROM333

| | | ROW SELECTION SIGNAL | | | | | | | |
|---|---|---|---|---|---|---|---|---|---|
| | | 000 | 001 | 010 | 011 | 100 | 101 | 110 | 111 |
| INPUT | 0 | 0 | 0 | 0 | 0 | 0 | 0 | 0 | 0 |
| | 1 | -C4 | C6 | C4 | -C2 | -C5 | C1 | -C7 | -C3 |

FIG.21B

ROM334~336

| | | ROW SELECTION SIGNAL | | | | | | | |
|---|---|---|---|---|---|---|---|---|---|
| | | 000 | 001 | 010 | 011 | 100 | 101 | 110 | 111 |
| INPUT | 000 | 0 | 0 | 0 | 0 | 0 | 0 | 0 | 0 |
| | 001 | C4 | -C6 | -C4 | C2 | C5 | -C1 | C7 | C3 |
| | 010 | 2C4 | -2C6 | -2C4 | 2C2 | 2C5 | -2C1 | 2C7 | 2C3 |
| | 011 | 3C4 | -3C6 | -3C4 | 3C2 | 3C5 | -3C1 | 3C7 | 3C3 |
| | 100 | 4C4 | -4C6 | -4C4 | 4C2 | 4C5 | -4C1 | 4C7 | 4C3 |
| | 101 | 5C4 | -5C6 | -5C4 | 5C2 | 5C5 | -5C1 | 5C7 | 5C3 |
| | 110 | 6C4 | -6C6 | -6C4 | 6C2 | 6C5 | -6C1 | 6C7 | 6C3 |
| | 111 | 7C4 | -7C6 | -7C4 | 7C2 | 7C5 | -7C1 | 7C7 | 7C3 |

FIG.21C

ROM337

| | | ROW SELECTION SIGNAL | | | | | | | |
|---|---|---|---|---|---|---|---|---|---|
| | | 000 | 001 | 010 | 011 | 100 | 101 | 110 | 111 |
| INPUT | 0 | 0 | 0 | 0 | 0 | 0 | 0 | 0 | 0 |
| | 1 | -C4 | C2 | -C4 | C6 | -C7 | C5 | -C3 | C1 |

FIG.21D

ROM338~340

| | | ROW SELECTION SIGNAL | | | | | | | |
|---|---|---|---|---|---|---|---|---|---|
| | | 000 | 001 | 010 | 011 | 100 | 101 | 110 | 111 |
| INPUT | 000 | 0 | 0 | 0 | 0 | 0 | 0 | 0 | 0 |
| | 001 | C4 | -C2 | C4 | -C6 | C7 | -C5 | C3 | -C1 |
| | 010 | 2C4 | -2C2 | 2C4 | -2C6 | 2C7 | -2C5 | 2C3 | -2C1 |
| | 011 | 3C4 | -3C2 | 3C4 | -3C6 | 3C7 | -3C5 | 3C3 | -3C1 |
| | 100 | 4C4 | -4C2 | 4C4 | -4C6 | 4C7 | -4C5 | 4C3 | -4C1 |
| | 101 | 5C4 | -5C2 | 5C4 | -5C6 | 5C7 | -5C5 | 5C3 | -5C1 |
| | 110 | 6C4 | -6C2 | 6C4 | -6C6 | 6C7 | -6C5 | 6C3 | -6C1 |
| | 111 | 7C4 | -7C2 | 7C4 | -7C6 | 7C7 | -7C5 | 7C3 | -7C1 |

DISCRETE COSINE TRANSFORMER AND INVERSE DISCRETE COSINE TRANSFORMER

BACKGROUND OF THE INVENTION

1. Field of the Invention

The present invention relates to a discrete cosine transformer for performing discrete cosine transform in a device for compressing image data, and to an inverse discrete cosine transformer for performing inverse discrete cosine transform in a device for decompressing image data, for example. More specifically, the present invention relates to a discrete cosine transformer and an inverse discrete cosine transformer having small circuit scale and small power consumption.

2. Description of the Background Art

Image signals contain formidable amount of data. Therefore, it is a general practice to compress the amount of data for transmission or recording, and to decompress to the original data amount at the time of reception or reproduction. Generally, image data has much low frequency component but less high frequency component. Therefore, the low frequency component is subjected to fine quantization while the high frequency component is subjected to coarse quantization. For this purpose, it is necessary to transform the image data to frequency components. Discrete cosine transformation (hereinafter referred to as DCT) is used as a method for transforming image data to frequency component. Inverse discrete cosine transformation (hereinafter referred to as IDCT) is used as a method for reverse transformation.

Generally, image data is processed on a unit of 8×8 pixels, which requires two-dimensional DCT of 8×8 as well as a two-dimensional IDCT of 8×8. However, direct implementation of two-dimensional DCT or IDCT results in a considerably large circuit scale. Accordingly, the two-dimensional DCT or two-dimensional IDCT is realized by performing one-dimensional DCT or one-dimensional IDCT once for the longitudinal direction and once for the lateral direction of the image.

The one-dimensional DCT and one-dimensional IDCT will be described in the following. Let us represent 8 input signals as $X_j$ (j=0 to 7). The DCT can be represented by the following expression (1).

$$Y_i = C(i) \cdot \sum_{j=0}^{7} X_j \cdot \cos\{(2j+1)i\pi/16\} \quad (i = 0 \text{ to } 7) \tag{1}$$

$$\text{where } C(i) = 1/2\sqrt{2} \quad (\text{when } i = 0)$$
$$= 1/2 \quad (\text{when } i \neq 0)$$

8$Y_i$(i=0 to 7) obtained by this expression are referred to as DCT coefficients.

The expression (1) can be represented by the following matrix representation (2).

$$\begin{bmatrix} Y_0 \\ Y_1 \\ Y_2 \\ Y_3 \\ Y_4 \\ Y_5 \\ Y_6 \\ Y_7 \end{bmatrix} = \frac{1}{2} \begin{bmatrix} C_4 & C_4 & C_4 & C_4 & C_4 & C_4 & C_4 & C_4 \\ C_1 & C_3 & C_5 & C_7 & -C_7 & -C_5 & -C_3 & -C_1 \\ C_2 & C_6 & -C_6 & -C_2 & -C_2 & -C_6 & C_6 & C_2 \\ C_3 & -C_7 & -C_1 & -C_5 & C_5 & C_1 & C_7 & -C_3 \\ C_4 & -C_4 & -C_4 & C_4 & C_4 & -C_4 & -C_4 & C_4 \\ C_5 & -C_1 & C_7 & C_3 & -C_3 & -C_7 & C_1 & -C_5 \\ C_6 & -C_2 & C_2 & -C_6 & -C_6 & C_2 & -C_2 & C_6 \\ C_7 & -C_5 & C_3 & -C_1 & C_1 & -C_3 & C_5 & -C_7 \end{bmatrix} \begin{bmatrix} X_0 \\ X_1 \\ X_2 \\ X_3 \\ X_4 \\ X_5 \\ X_6 \\ X_7 \end{bmatrix} \tag{2}$$

where $C_k$(k=1 to 7) represents cos (k $\pi$/16).

The following matrix representations (3) and (4) are derived from matrix representation (2).

$$\begin{bmatrix} Y_0 \\ Y_2 \\ Y_4 \\ Y_6 \end{bmatrix} = \frac{1}{2} \begin{bmatrix} C_4 & C_4 & C_4 & C_4 \\ C_2 & C_6 & -C_6 & -C_2 \\ C_4 & -C_4 & -C_4 & C_4 \\ C_6 & -C_2 & C_2 & -C_6 \end{bmatrix} \begin{bmatrix} X_0 + X_7 \\ X_1 + X_6 \\ X_2 + X_5 \\ X_3 + X_4 \end{bmatrix} \tag{3}$$

$$\begin{bmatrix} Y_1 \\ Y_3 \\ Y_5 \\ Y_7 \end{bmatrix} = \frac{1}{2} \begin{bmatrix} C_1 & C_3 & C_5 & C_7 \\ C_3 & -C_7 & -C_1 & -C_5 \\ C_5 & -C_1 & C_7 & C_3 \\ C_7 & -C_5 & C_3 & -C_1 \end{bmatrix} \begin{bmatrix} X_0 - X_7 \\ X_1 - X_6 \\ X_2 - X_5 \\ X_3 - X_4 \end{bmatrix} \tag{4}$$

Meanwhile, one-dimensional IDCT for inverse transformation to one-dimensional DCT is represented by the following expression (5).

$$X_j = \sum_{j=0}^{7} C(i) \cdot Y_i \cdot \cos\{(2j+1)i\pi/16\} \quad (j = 0 \text{ to } 7) \tag{5}$$

$$\text{where } C(i) = 1/2\sqrt{2} \quad (\text{when } i = 0)$$
$$= 1/2 \quad (\text{when } i \neq 0)$$

The expression (5) can be represented by the following matrix representation (6).

$$\begin{bmatrix} X_0 \\ X_1 \\ X_2 \\ X_3 \\ X_4 \\ X_5 \\ X_6 \\ X_7 \end{bmatrix} = \tag{6}$$

-continued $$\frac{1}{2}\begin{bmatrix} C_4 & C_1 & C_2 & C_3 & C_4 & C_5 & C_6 & C_7 \\ C_4 & C_3 & C_6 & -C_7 & -C_4 & -C_1 & -C_2 & -C_5 \\ C_4 & C_5 & -C_6 & -C_1 & -C_4 & C_7 & C_2 & C_3 \\ C_4 & C_7 & -C_2 & -C_5 & C_4 & C_3 & -C_6 & -C_1 \\ C_4 & -C_7 & -C_2 & C_5 & C_4 & -C_3 & -C_6 & C_1 \\ C_4 & -C_5 & -C_6 & C_1 & -C_4 & -C_7 & C_2 & -C_3 \\ C_4 & -C_3 & C_6 & C_7 & -C_4 & C_1 & -C_2 & C_5 \\ C_4 & -C_1 & C_2 & -C_3 & C_4 & -C_5 & C_6 & -C_7 \end{bmatrix}\begin{bmatrix} Y_0 \\ Y_1 \\ Y_2 \\ Y_3 \\ Y_4 \\ Y_5 \\ Y_6 \\ Y_7 \end{bmatrix}$$

The following matrix representations (7) and (8) are derived from the matrix representation (6).

$$\begin{bmatrix} X_0+X_7 \\ X_1+X_6 \\ X_2+X_5 \\ X_3+X_4 \end{bmatrix} = \frac{1}{2}\begin{bmatrix} C_4 & C_2 & C_4 & C_6 \\ C_4 & C_6 & -C_4 & -C_2 \\ C_4 & -C_6 & -C_4 & C_2 \\ C_4 & -C_2 & C_4 & -C_6 \end{bmatrix}\begin{bmatrix} Y_0 \\ Y_2 \\ Y_4 \\ Y_6 \end{bmatrix} \quad (7)$$

$$\begin{bmatrix} X_0-X_7 \\ X_1-X_6 \\ X_2-X_5 \\ X_3-X_4 \end{bmatrix} = \frac{1}{2}\begin{bmatrix} C_1 & C_3 & C_5 & C_7 \\ C_3 & -C_7 & -C_1 & -C_5 \\ C_5 & -C_1 & C_7 & C_3 \\ C_7 & -C_5 & C_3 & -C_1 \end{bmatrix}\begin{bmatrix} Y_1 \\ Y_3 \\ Y_5 \\ Y_7 \end{bmatrix} \quad (8)$$

When DCT and IDCT are to be performed actually, in order to reduce the number of multiplication, not the 8×8 matrix representations of (2) and (6) but 4×4 matrix representations of (3), (4), (7) and (8) of the representations for DCT and IDCT listed above are used.

For multiplication and accumulation implementing the matrix operation, a multiplier accumulator including a multiplier and an adder are often used. However, the multiplication and accumulation using the multiplier accumulator results in a large scale multiplier. Accordingly, a method for performing multiplication and accumulation using a memory instead of the multiplier has been proposed. Once such method of multiplication and accumulation using a memory and an adder is disclosed, for example, in A. Peled and B. Liu, "A New Hardware Realization of Digital Filters", *IEEE Transactions on Acoustics, Speech, and Signal Processing*, vol. ASSP-22, pp. 456–462, December 1974., in which distributed arithmetic method is discussed.

The distributed arithmetic method will be described in the following. Multiplication and accumulation of the variable $X_j(j=0$ to $M-1)$ and a fixed coefficient $Cj(j=0$ to $M-1)$ of the following equation (9) will be considered.

$$Y = \sum_{j=0}^{M-1} C_j \cdot X_j \quad (9)$$

When Xj is represented by a 2's complement of N bits, Xj will be given by the following expression (10).

$$X_j = -X_j(0) + \sum_{k=1}^{N-1} X_j(k) \cdot 2^{-k} \quad (j = 0 \text{ to } M-1) \quad (10)$$

where $X_j(k)$ represents a bit at the kth bit position (lower by k than the most significant bit), which is either 0 or 1.

From the expression (10), the expression (9) can be modified to the expression (11).

$$Y = -\left\{ \sum_{j=0}^{M-1} C_j \cdot X_j(0) \right\} + \sum_{k=1}^{N-1} \left\{ \sum_{j=0}^{M-1} C_j \cdot X_j(k) \right\} \cdot 2^{-k} \quad (11)$$

When the partial sum $Z_k$ is defined by the following expression (12), the expression (11) will be given by the following expression (13).

$$Z_k = \sum_{j=0}^{M-1} C_j \cdot Xj(k) \quad (k = 0 \text{ to } N-1) \quad (12)$$

$$Y = -Z_0 + \sum_{k=1}^{N-1} Z_k \cdot 2^{-k} \quad (13)$$

In this manner, the result Y of multiplication and accumulation of variable $X_j(j=0$ to $M-1)$ and the fixed coefficient $C_j(j=0$ to $M-1)$ is given by the expression (13). Note the partial sum $Z_k$ defined by the expression (12). Components of this expression are $C_j(j=0$ to $M-1)$ and $X_j(k)(j=0$ to $M-1)$, that is, a bit train including M bits $(X_0(k)\ X_1(k)\ X_2(k)\ \ldots\ X_{M-1}(k))$ which are the bits at the kth bit position of the variables $X_j(j=0$ to $M-1)$ (hereinafter, the bit train will be referred to as M bit train $X_j(k)(j=0$ to $M-1))$. Here, $C_j$ is a fixed coefficient. Accordingly, the partial sum $Z_k$ is a function of the M bit train $X_j(k)(j=0$ to $M-1)$. Accordingly, values which the partial sum $Z_k$ can assume are stored in advance in a memory so that when the memory is accessed using (inputting) a bit train $X_j(k)(j=0$ to $M-1)$ as an address, a partial sum $Z_k$ corresponding to the bit train can be read (output). Multiplication and accumulation is possible when each of the partial sums $Z_k$ read from the memory is shifted as represented by the expression (13) in accordance with the bit position k of the bits of the bit train constituting the partial sum and the shifted sums are added.

Referring to FIG. 1, a one-dimensional DCT circuit (discrete cosine transformer) employing the distributed arithmetic is adapted such that 8 multiplication and accumulation operations implementing the matrix representations of (3) and (4) are performed by distributed arithmetic on input $X_j(j=0$ to 7) and to output DCT coefficients $Y_i(i=0$ to 7). Here, it is assumed that both $X_j(j=0$ to 7) and $Y_i(i=0$ to 7) are data of 9 bits, respectively.

The operation of the circuit will be described in the following. 8 data $X_0$ to $X_7$ input from an input terminal 401 are successively transferred to registers 402 to 409, and held in registers 409 to 402, respectively. Outputs $X_0$ to $X_7$ from registers 409 to 402 are added or subtracted in adder/subtractor 410. Results of addition $X_0+X_7$, $X_1+X_6$, $X_2+X_5$ and $X_3+X_4$ are held by registers 411 to 414, respectively. Results of subtraction $X_0-X_7$, $X_1-X_6$, $X_2-X_5$ and $X_3-X_4$ are held in registers 415 to 418, respectively. Since input $X_j(j=0$ to 7) is data containing 9 bits, the results of addition $X_0+X_7$, $X_1+X_6$, $X_2+X_5$ and $X_3+X_4$ as well as the results of subtraction $X_0-X_7$, $X_1-X_6$, $X_2-X_5$ and $X_3-X_4$ are data of 10 bits, respectively.

Referring to FIGS. 2A and 2B, operations of a bit distributor 419 receiving as inputs the outputs $X_0+X_7$, $X_1+X_6$, $X_2+X_5$ and $X_3+X_4$ from registers 411 to 414, and a bit distributor 420 receiving as inputs the outputs $X_0-X_7$, $X_1-X_6$, $X_2-X_5$ and $X_3-X_4$ from registers 415 to 418, respectively will be described in the following. In bit distributor 419, outputs from registers 411 to 414 are divided into ten signal lines corresponding to the most significant to the least significant bits (most significant bit [9] to least significant bit [0]). Ten sets of four signal lines representing 4 bits of signals of the same bit position are provided and connected to a selector 479. In response to a select signal output from a select signal generating circuit 479b, values of ten sets of 4 bit signal lines are successively selected by selector 479 starting from the set of the most significant bit, and output to multiplication and accumulation blocks 421 to 424. More specifically, the values of 4 bit signal lines are output to multiplication and accumulation blocks 421 to 424 in the order of signal lines [9], [8], . . . , [0]. Similarly, in bit distributor 420, the values of ten sets of 4 bit signal lines are provided from the outputs of registers 415 to 418, and 4 bit signal lines are connected to multiplication and accumulation blocks 415 to 418, in the order of signal lines [9], [8], . . . , [0].

In summary, ten sets of 4 bit trains including bits of the same bit position of the outputs $X_0+X_7$, $X_1+X_6$, $X_2+X_5$ and $X_3+X_4$ which are outputs from registers 111 to 114, respectively, are output from bit distributor 419 to multiplication and accumulation blocks 421 to 424, starting from the set of the most significant bit. Similarly, from bit distributor 420, ten sets of 4 bit trains which include bits of the same bit position of $X_0-X_7$, $X_1-X_6$, $X_2-X_5$ and $X_3-X_4$, which are outputs from registers 115 to 118, respectively, are output to multiplication and accumulation blocks 425 to 428 successively, starting from the set of the most significant bit.

Thereafter, the multiplication and accumulation blocks 421 to 424 successively receive ten sets of 4 bit trains from bit distributor 419, and carry out four multiplication and accumulation operations implementing the matrix representation of (3), to calculate $Y_0$, $Y_2$, $Y_4$ and $Y_6$, respectively. Multiplication and accumulation blocks 425 to 428 successively receive ten sets of 4 bit trains from bit distributor 420, perform four multiplications and accumulations implementing the matrix representation of (4), to calculate $Y_1$, $Y_3$, $Y_5$ and $Y_7$, respectively. These operations will be described taking calculation of $Y_0$ by multiplication and accumulation block 421 as an example.

Referring to FIGS. 3A and 4A, ROM 429 provided in multiplication and accumulation block 421 is adapted to output 0 when the input 4 bit train is (0000), to output $C_4$ when the 4 bit train is (0001), . . . and $4C_4$ when (1111), respectively. The respective bit values of the 4 bit trains are the values of bits of the same position of $X_0+X_7$, $X_1+X_6$, $X_2+X_5$ and $X_3+X_4$. An output from ROM 429 is, when a 4 bit train is an input, a partial sum of $Y_0=\{C_4(X_0+X_7)+C_4(X_1+X_6)+C_4(X_2+X_5)+C_4(X_3+X_4)\}/2$. Though not shown, in multiplication and accumulation block 421, output polarity of ROM 429 for every ten inputs is inverted. This corresponds to the fact that a partial sum having 4 bit trains of the most significant bit is negative. In the following, it is assumed that the ROM 429 is structured as described above.

First, 4 bit trains consisting of the most significant bits of $X_0+X_7$, $X_1+X_6$, $X_2+X_5$ and $X_3+X_4$ from bit distributor 419 are input to ROM 429. From ROM 429, a partial sum of $Y_0$ including as component 4 bit trains of the most significant bit will be output. The output from ROM 429 is input to adder 437 where it is added to an initial output value 0 of shifter 453, and the result is held in register 445. Namely, in this stage, a partial sum of $Y_0$ having 4 bit trains of the most significant bit as a component is held in register 445.

Thereafter, 4 bit trains consisting of bits at a bit position 1 of $X_0+X_7$, $X_1+X_6$, $X_2+X_5$ and $X_3+X_4$ from bit distributor 419 are input to ROM 429. Consequently, a partial sum of $Y_0$ having 4 bit trains of the bits at bit position 1 is output from ROM 429. The output from ROM 429 is input to adder 437. Meanwhile, the value held in register 445 is shifted upward by 1 bit by shifter 453 and input to adder 437. The result of addition at adder 437 is held in register 445. Namely, in this stage, register 445 holds the result of addition of the partial sum (shifted upward by 1 bit) of $Y_0$ having 4 bit trains of the most significant bit as a component and a partial sum of $Y_0$ having 4 bit trains of the bits at bit position 1 as a component.

Thereafter, 4 bit trains of the bits at bit position 2, 4 bit trains of the bits at bit position 3, . . . 4 bit trains of the least significant bit (bits at bit position 9) of $X_0+X_7$, $X_1+X_6$, $X_2+X_5$ and $X_3+X_4$ from bit distributor 419 are input in this order to ROM 429. Every time, the output from ROM 429 is added to the data (shifted by 1 bit upward by shifter 453) held in register 445 in adder 437, and the result of addition is held in register 445.

Ten sets of 4 bit trains consisting of bits of the same bit position of $X_0+X_7$, $X_1+X_6$, $X_2+X_5$ and $X_3+X_4$ are input from bit distributor 419 to multiplication and accumulation block 421 starting from the ones of the most significant bit. After the end of above described operation, the data held in register 445 is rounded to 9 bits by a rounding circuit 461, held in register 469 and then output from multiplication and accumulation block 421.

Now, assume that ten sets of 4 bit trains consisting of the bits of the same bit position of $X_0+X_7$, $X_1+X_6$, $X_2+X_5$ and $X_3+X_4$ are all input from bit distributor 419 to multiplication and accumulation block 421 and the above described operation is completed. At that time, determining from the content of operation and expression (13), the data held in register 445 is $Y_0$. Namely, $Y_0$ is output from multiplication and accumulation block 421.

Referring to FIGS. 3B to 3D, in multiplication and accumulation blocks 422 to 424, the relation between input/output of ROM 430 to 432 are as shown in FIG. 4A, respectively, and these blocks perform similar operation as in multiplication and accumulation block 421. Therefore, ten sets of 4 bit trains consisting of the bits at the same bit position of $X_0+X_7$, $X_1+X_6$, $X_2+X_5$ and $X_3+X_4$ are input starting from the ones consisting of the most significant bit, from bit distributor 419, and $Y_2$, $Y_4$ and $Y_6$, are output, respectively.

Referring to FIGS. 3E to 3H, the relations between input/output of ROMs 433 to 436 of multiplication and accumulation blocks 425 to 428 are as shown in FIG. 4B, respectively, and the multiplication and accumulation blocks perform similar operation as in accumulation and multiplication block 421. Accordingly, ten sets of 4 bit trains consisting of bits at the same bit positions of $X_0-X_7$, $X_1-X_6$, $X_2-X_5$ and $X_3-X_4$ are successively input starting the ones consisting of the most significant bits from bit distributor 420, and $Y_1$, $Y_3$, $Y_5$ and $Y_7$ are output, respectively.

Here, coefficient of each of the matrixes (3) and (4) is assumed to have 10 bits. Accordingly, the number of bits of the outputs ROMs 429 to 436 is 12 and the number of bits of the output from adders 437 to 444, registers 445 to 452 and shifters 453 to 460 is 21.

Finally, $Y_0$, $Y_2$, $Y_4$, $Y_6$, $Y_1$, $Y_3$, $Y_5$ and $Y_7$ output from multiplication and accumulation blocks 421 to 428, respectively, are input to an output selector 477. The respective input values are selected in a prescribed order, output from a successive output terminal 478, and one-dimensional DCT is completed.

Here, in the one-dimensional DCT circuit, $X_j(j=0$ to 7) are input successively in 8 steps from input terminal 401. Meanwhile, for calculation of $Y_0$ to $Y_7$ in multiplication and accumulation blocks 421 to 428, ten steps, that is, same as the number of bits of $X_0+X_7$, $X_1+X_6$, $X_2+X_5$ and $X_3+X_4$ as well as $X_0-X_7$, $X_1-X_6$, $X_2-X_5$ and $X_3-X_4$ are necessary. Namely, the time of calculation is longer than the time of input. This means that the DCT circuit is not capable of real time operation. Therefore, when input is continuously given through input terminal 401 to the DCT circuit, calculation cannot catch up. Therefore, continuous output from input terminal 401 is not possible, which means that efficient image compression is impossible.

In order to solve this problem, a method has been proposed, for example, in S. Uramoto et al., "A 100-MHz 2-D Discrete Cosine Transform Core Processor", *IEEE Journal of Solid-State Circuits*, vol. 27, No. 4, pp. 492–499, April 1992, in which a plurality of 4 bit trains are processed two sets by two sets simultaneously, each train consisting of bits of the same bit position of the input data.

Referring to FIG. 5, a one-dimensional DCT circuit (discrete cosine transformer) is adapted such that matrix representations (3) and (4) are implemented by distributed arithmetic on input $X_j$(j=0 to 7), and a DCT coefficient $Y_i$(i=0 to 7) is output. Here, it is assumed that $X_j$(j=0 to 7) and $Y_i$(i=0 to 7) are data of 9 bits, respectively.

The operation of the circuit will be described in the following. 8 data $X_0$ to $X_7$ input from an input terminal 501 are successively transferred to registers 502 to 509 in the order of input, and held in registers 509 to 502, respectively. Outputs $X_0$ to $X_7$ of registers 509 to 502 are added or subtracted in an adder/subtractor 510, respectively. The result of addition $X_0+X_7$, $X_1+X_6$, $X_2+X_5$ and $X_3+X_4$ are held in registers 511 to 514, respectively. The result of subtraction $X_0-X_7$, $X_1-X_6$, $X_2-X_5$ and $X_3-X_4$ are held in registers 515 to 518, respectively. Since input $X_j$(j=0 to 7) is data of 9 bits, the results of addition $X_0+X_7$, $X_1+X_6$, $X_2+X_5$ and $X_3+X_4$ as well as the results of subtraction $X_0-X_7$, $X_1-X_6$, $X_2-X_5$ and $X_3-X_4$ are each data of 10 bits.

Referring to FIGS. 6A and 6B, operations of bit distributor 519 receiving outputs $X_0+X_7$, $X_1+X_6$, $X_2+X_5$ and $X_3+X_4$ of registers 511 to 514, respectively and bit distributor 520 receiving outputs $X_0-X_7$, $X_1-X_6$, $X_2-X_5$ and $X_3-X_4$ of registers 515 to 518, respectively, will be described in the following. In bit distributor 519, output from registers 511 to 514 are distributed to ten signal lines (most significant [9] to least significant [0]) from the most to least significant bits, and ten sets of 4 bits signal lines including a combination of four signal lines of the same bit position are provided. Of these, five sets of 4 bit signal lines [9], [7], [5], [3] and [1] are connected to selector 603, while five sets of 4 bit signal lines [8], [6], [4], [2] and [0] are connected to selector 604. In response to a select signal output from a select signal generating circuit 603b, the five sets of 4 bit signal lines are successively selected starting from the set of higher bit, by selectors 603 and 604. More specifically, two sets of 4 bit signal lines, that is, values of signal lines [9] and [8], [7] and [6], [5] and [4], [3] and [2] and [1] and [0] are simultaneously output to multiplication and accumulation blocks 521 to 524. Similarly, in bit distributor 520, ten sets of 4 bit signal lines are provided based on the output from registers 515 to 518, and two sets of 4 bit signal lines, that is, the values of signal lines [9] and [8], [7] and [6], [5] and [4], [3] and [2] and [1] and [0] are output to multiplication and accumulation blocks 525 to 528.

In summary, ten sets of 4 bit trains consisting of the bits of the same bit positions of four data $X_0+X_7$, $X_1+X_6$, $X_2+X_5$ and $X_3+X_4$ which are the outputs from registers 511 to 514 are output two sets by two sets starting from the most significant bit, to multiplication and accumulation blocks 521 to 524. Similarly, from bit distributor 520, ten sets of 4 bit trains consisting of bits of the same bit positions of four data $X_0-X_7$, $X_1-X_6$, $X_2-X_5$ and $X_3-X_4$ which are the outputs of registers 515 to 518 are output successively two sets by two sets starting from the most significant bit, to multiplication and accumulation blocks 525 to 528.

Then, multiplication and accumulation blocks 521 to 524 successively receive the ten sets of 4 bit trains two sets by two sets from bit distributor 519, perform four multiplications and accumulations implementing the matrix representation (3), and calculate $Y_0$, $Y_2$, $Y_4$ and $Y_6$, respectively. Multiplication and accumulation blocks 525 to 528 successively receive the ten sets of 4 bit trains two sets by two sets from bit distributor 520, perform multiplications and accumulations implementing the matrix representation (4) and calculate $Y_1$, $Y_3$, $Y_5$ and $Y_7$, respectively. These operations will be described, taking multiplication and accumulation block 521 calculating $Y_0$ as an example.

Referring to FIG. 7A, ROMs 529 and 530 provided in multiplication and accumulation block 521 are adapted to output 0 when input 4 bit train is (0000), $C_4$ when it is (0001), . . . , and $4C_4$ when it is (1111), as shown in FIG. 4A. The bit values of respective 4 bit trains are the values of the bits of the same bit position of $X_0+X_7$, $X_1+X_6$, $X_2+X_5$ and $X_3+X_4$. The outputs from ROMs 529 and 530 are partial sum of $Y_0=\{C_4(X_0+X_7)+C_4(X_1+X_6)+C_4(X_2+X_5)C_4(X_3+X_4)\}/2$, when a 4 bit train is input. In multiplication and accumulation block 521, though not shown, the output polarity of upper ROM (ROM 529) is inverted for every five inputs. This corresponds to the fact that a partial sum having the 4 bit train consisting of the most significant bit as a component is negative. The following description is on the premise that ROMs 529 and 530 are structured as described above.

First, 4 bit trains consisting of the most significant bit of $X_0+X_7$, $X_1+X_6$, $X_2+X_5$ and $X_3+X_4$, and 4 bit trains consisting of the bits at bit position 1 are input from bit distributor 519 to ROMs 529 and 530. Consequently, a partial sum of $Y_0$ having 4 bit trains consisting of the most significant bit as a component is output from ROM 529. A partial sum of $Y_0$ having 4 bit trains consisting of the bit at bit position 1 as a component is output from ROM 530. Two outputs from ROM 529 and 530 are added in adder 553 after the output of ROM 529 is shifted by 1 bit upward by shifter 545. The result of addition is added to initial output 0 of shifter 577 in adder 561, and the result of addition is held in register 569. More specifically, in this stage, register 569 holds the result of addition of a partial sum (shifted by 1 bit upward) having 4 bit trains of the most significant bit as a component and partial sum of $Y_0$ having 4 bit trains of the bits at bit position 1 as a component.

Thereafter, 4 bit trains consisting of bits at bit position 2 of $X_0+X_7$, $X_1+X_6$, $X_2+X_5$ and $X_3+X_4$ and 4 bit trains consisting of bits at bit position 3 of $X_0+X_7$, $X_1+X_6$, $X_2+X_5$ and $X_3+X_4$ are respectively input to ROMs 529 and 530 from bit distributor 519. Consequently, a partial sum of $Y_0$ having 4 bit trains consisting of bits at bit position 2 as a component is output from ROM 529. A partial sum of $Y_0$ having 4 bit trains consisting of bits at bit position 3 as a component is output from ROM 530. The two outputs from ROMs 529 and 530 are added in adder 553 after the output from ROM 529 is shifted by 1 bit upward by shifter 545. The result of addition is added to data held in register 569, which has been shifted 2 bits upward by shifter 577, and the result of addition is held in register 569. More specifically, in this stage, register 569 holds the result of addition of partial sum (shifted by 3 bits upward) of $Y_0$ having 4 bit trains consisting of most significant bits as a component, a partial sum (shifted by 2 bits upward) of $Y_0$ having 4 bit trains consisting of bits at bit position 1 as a component, a partial sum (shifted by 1 bit upward) of $Y_0$ having 4 bit trains consisting of bits at bit position 2 as a component, and a partial sum of $Y_0$ having 4 bit trains consisting of bits at bit position 3 as a component.

Thereafter, 4 bit trains consisting of bits at bit position 4, 4 bit trains consisting of bits at bit position 5, 4 bit trains consisting of bits at bit position 6, 4 bit trains consisting of bits at bit position 7, 4 bit trains consisting of bits at bit position 8 and thereafter 4 bit trains of least significant bits (bits at bit position 9) of $X_0+X_7$, $X_1+X_6$, $X_2+X_5$ and $X_3+X_4$ are input to ROMs 529 and 530, successively, in this order, from bit distributor 519, and at every input, the output from ROM 529 (shifted by 1 bit upward by shifter 545) and output from ROM 530 are added in adder 553. The result of addition is added to data (shifted by 2 bits by shifter 577) held in register 569 in adder 561. The result of addition is held in register 569.

Thereafter, ten sets of 4 bit trains consisting of bits at the same bit positions of $X_0+X_7$, $X_1+X_6$, $X_2+X_5$ and $X_3+X_4$ are all input two sets by two sets starting from those consisting of the most significant bits from bit distributor 519 to multiplication and accumulation block 521. After the end of the above described operation, the data held in register 569 is rounded to 9 bits in rounding circuit 585, held in register 593 and output from multiplication and accumulation block 521.

Now, assume that ten sets of 4 bit trains consisting of bits of respective same bit positions of $X_0+X_7$, $X_1+X_6$, $X_2+X_5$ and $X_3+X_4$ are all input two sets by two sets starting from the ones consisting of the most significant bits from bit distributor 519 to multiplication and accumulation block 521 and the above described operation is completed. At this time, determining from the content of operation and expression (13), the data held in register 569 is $Y_0$, and hence $Y_0$ is output from multiplication and accumulation block 521.

Further, in multiplication and accumulation blocks 522 to 524, the relation between input/output of ROMs 531 and 532, 533 and 534 and 535 and 536 are as shown in FIG. 4A, and these blocks operate in the similar manner as multiplication and accumulation block 521. Therefore, ten sets of 4 bit trains consisting of bits of the same bit positions of $X_0+X_7$, $X_1+X_6$, $X_2+X_5$ and $X_3+X_4$ are input two sets by two sets starting from those consisting of the most significant bit from bit distributor 519, and $Y_2$, $Y_4$ and $Y_6$ are output, respectively.

Referring to FIG. 7B, in multiplication and accumulation blocks 525 to 528, the relations between input and output of ROMs 537 and 538, 539 and 540, 541 and 542 and 543 and 544 are as shown in FIG. 4B, and these blocks operate in the similar manner as multiplication and accumulation block 521. Therefore, ten sets of 4 bit trains consisting of bits of the same bit positions of $X_0-X_7$, $X_1-X_6$, $X_2-X_5$ and $X_3-X_4$ are input two sets by two sets successively starting from the ones consisting of most significant bits from bit distributor 520, and $Y_1$, $Y_3$, $Y_5$ and $Y_7$ are output.

Now, each coefficient of the matrixes shown in (3) and (4) is assumed to have 10 bits. Accordingly, the number of bits of the outputs from ROMs 529 to 544 is 12, the number of bits of the outputs from adders 553 to 560 is 13, and that of adders 561 to 568, registers 569 to 576 and shifters 577 to 584 is 21.

Finally, $Y_0$, $Y_2$, $Y_4$, $Y_6$, $Y_1$, $Y_3$, $Y_5$ and $Y_7$ output from multiplication and accumulation blocks 521 to 528, respectively, are input to an output selector 601. The respective input values are selected in a prescribed order and output successively from an output terminal 602. Thus one-dimensional DCT is completed.

Now, in the one-dimensional DCT circuit, $X_j$ (j=0 to 7) are successively input in 8 steps from input terminal 501. Meanwhile, calculation of $Y_0$ to $Y_7$ in multiplication and accumulation blocks 521 to 528 requires 5 steps, that is, half the number of bits of $X_0+X_7, X_1+X_6, X_2+X_5$ and $X_3+X_4$ and $X_0-X_7, X_1-X_6, X_2-X_5$ and $X_3-X_4$. Namely, the time for calculation is shorter than the time for input. It means that the DCT circuit is capable of real time operation. Therefore, when input is continuously provided from input terminal 501 to the DCT circuit, calculation can be done in time without fail. This allows continuous input from input terminal 501, and image compression can be done efficiently.

In this manner, by using a memory and an adder, one-dimensional DCT is possible in real time without using a multiplier. However, in the one-dimensional DCT circuit, 8 multiplications and accumulations are performed in parallel, two partial sums including two sets of 4 bit trains consisting of bits of the same bit positions of the input data as components are successively generated for multiplication and accumulation respectively, and these are added and stored. Therefore, the number of adders is as large as 16, and the number of registers is also as large as 16. Further, it is necessary for the register to hold the final result of multiplication and accumulation. Therefore, it has the wide input/output bit width of 21. Accordingly, the output bit width of the adders related to the registers and the input/output bid width of the shifter are also 21, which means that the circuit scale is considerably large. Further, an output having a large bit width of the register is fed back to the adders through the shifter. This means that there are much changes in signals and much power consumption.

SUMMARY OF THE INVENTION

Therefore, an object of the present invention is to provide a discrete cosine transformer and an inverse discrete cosine transformer capable of real time processing without a multiplier which has small circuit scale and small power consumption.

Another object of the present invention is to provide a discrete cosine transformer and an inverse discrete cosine transformer capable of real time processing without using a multiplier, which has smaller number of adders.

A still further object of the present invention is to provide a discrete cosine transformer and an inverse discrete cosine transformer capable of real time processing without using a multiplier having smaller number of registers.

A still further object of the present invention is to provide a discrete cosine transformer and an inverse discrete cosine transformer capable of real time processing without using a multiplier, which is susceptible to less signal changes.

The discrete cosine transformer in accordance with the present invention includes an adder/subtractor receiving a plurality of image data items for outputting a plurality of image data item addition/subtraction values in accordance with a prescribed rule; a bit distributor connected to the adder/subtractor, receiving the plurality of image data item addition/subtraction values for outputting a plurality of bit trains consisting of bits of same bit positions of the plurality of image data item addition/subtraction values; a selection signal generating circuit for successively generating a selection signal of a DCT coefficient; and a DCT coefficient generating circuit connected to the bit distributor and the selection signal generating circuit, receiving the plurality of bit trains and responsive to the successively generated selection signal for performing calculation of the DCT coefficient in time-divisional manner.

According to the present invention, the DCT coefficient generating circuit performs calculation of the DCT coefficient in time-divisional manner. Therefore, as compared with a circuit which performs parallel processing, the circuit scale can be made smaller. Further, changes in signals can be reduced. Therefore, power consumption can be reduced.

Preferably, the DCT coefficient generating circuit includes memories same in number as the number of bits of the image data item addition/subtraction values, connected to the bit distributor and the selection signal generating circuit, responsive to the plurality of bit trains respectively and to the selection signal for respectively outputting partial sums of the DCT coefficient; and a circuit connected to the memories same in number as the number of bits of the image data item addition/subtraction values, responsive to the bit positions of the plurality of image data item addition/ subtraction values for shifting and adding the plurality of partial sums respectively.

The DCT coefficient circuit shifts and adds the plurality of partial sums. Therefore, the number of adders can be made to at most the number of partial sums minus one. Further, it is not necessary to provide a register for storing an intermediate result of the DCT coefficient. This can reduce circuit scale. Further, the output value from an adder is not fed back to the input of the adder. Therefore, there is less signal change and smaller power consumption.

More preferably, the DCT coefficient generating circuit includes a single memory connected to the selection signal generating circuit, responsive to the selection signal for outputting the plurality of partial sums of the DCT coefficient, a plurality of selectors, and a circuit connected to the plurality of selectors respectively, responsive to the bit positions of the plurality of image data item addition/ subtraction values for shifting and adding the plurality of partial sums. Each of the plurality of selectors is connected to the single memory and the bit distributor, receives the plurality of partial sums, and in response to the value of a prescribed bit train of a plurality of bit trains, selects and outputs one of the plurality of partial sums.

The number of memories for outputting the partial sums of the DCT coefficient can be made to a common one. Therefore, it is not necessary to provide a plurality of memories, and hence the circuit scale can be reduced.

According to another aspect of the present invention, the discrete cosine transformer includes an adder/subtractor receiving a plurality of image data items, for outputting a plurality of image data item addition/subtraction values in accordance with a prescribed rule; a bit distributor connected to the adder/subtractor, receiving the plurality of image data item addition/subtraction values, for outputting a plurality of bit trains consisting of bits of continuous bit positions of the image data item addition/subtraction values; a selection signal generating circuit for successively generating a selection signal of a DCT coefficient; and a DCT coefficient generating circuit connected to the bit distributor and the selection signal generating circuit, receiving the plurality of bit trains and responsive to the successively generated selection signal, for performing calculation of the DCT coefficient in time-divisional manner.

According to the present invention, the DCT coefficient generating circuit performs calculation of the DCT coefficient in time divisional manner. Therefore, as compared with a circuit performing parallel processing, the circuit scale can be made smaller. Further, signal changes can be made smaller. Therefore, power consumption can be reduced.

Preferably, the DCT coefficient generating circuit includes a plurality of memories connected to the bit distributor and the selection signal generating circuit, responsive to the plurality of bit trains and to the selection signal, for outputting partial sums of the DCT coefficient, respectively, and a circuit connected to the plurality of memories respectively, responsive to continuous bit positions of the image data item addition/subtraction values for shifting and adding the plurality of partial sums.

The DCT coefficient generating circuit includes a plurality of memories for outputting partial sums of the DCT coefficient for each of the plurality of bit trains. Therefore, capacity of each memory can be reduced. Further, it is not necessary to provide a register for storing intermediate result of the DCT coefficient. This reduces circuit scale. Further, the output value of the adder is not fed back to the input of the adder. Therefore, there is less signal change and smaller power consumption.

More preferably, the DCT coefficient generating circuit includes a bus of a minimum bit width for transferring internal data item.

According to the present invention, the closer an adder is placed to the input side in the DCT coefficient generating circuit, the smaller the output bit width thereof can be made. Therefore, power consumption can be reduced.

According to a still further aspect of the present invention, the inverse discrete cosine transformer includes a bit distributor receiving a plurality of DCT coefficients for outputting a plurality of bit trains consisting of bits of the same bit positions of the plurality of DCT coefficients; a selection signal generating circuit for successively generating a selection signal of image data item addition/subtraction values; an image data item addition/subtraction value generating circuit connected to the bit distributor and the selection signal generating circuit, receiving the plurality of bit trains and responsive to the successively generated selection signal, for performing calculation of the image data item addition/subtraction value in time-divisional manner; and an adder/subtractor connected to the image data item addition/ subtraction value generating circuit, receiving a plurality of said image data item addition/subtraction values for outputting a plurality of image data items in accordance with a prescribed rule.

The image data item addition/subtraction value generating circuit performs calculation of the image data item addition/subtraction value in time-divisional manner. Therefore, as compared with a circuit performing parallel processing, circuit scale can be made smaller. Further, signal change can be made smaller, and accordingly, power consumption can be reduced.

Preferably, the image data item addition/subtraction value generating circuit includes memories same in number as the number of bits of the DCT coefficient connected to the bit distributor and the selection signal generating circuit, responsive to the plurality of bit trains and to the selection signal for respectively outputting partial sums of the image data item addition/subtraction values, and a circuit connected to the memories same in number as the number of bits of the DCT coefficient, responsive to the bit position of the plurality of DCT coefficients for shifting and adding the plurality of partial sums.

The image data item addition/subtraction value generating circuit shifts and adds the plurality of partial sums. Therefore, the number of adders can be made to at most the number of partial sums minus one. Further, it is not necessary to provide a register for storing an intermediate result of the image data item addition/subtraction value. Therefore, circuit scale can be made smaller. Further, the output value of the adder is not fed back to the input of the adder. Therefore, there is less signal change and smaller power consumption.

More preferably, the image data item addition/subtraction value generating circuit includes a single memory connected to the selection signal generating circuit, responsive to the selection signal for generating a plurality of partial sums of the image data item addition/subtraction value, a plurality of selectors, and a circuit connected to the plurality of selectors respectively, responsive to the bit position of the plurality of DCT coefficients for shifting and adding a plurality of partial sums. Each of the plurality of selectors is connected to the single memory and to the bit distributor, receives the plurality of partial sums, and in response to the value of a predetermined bit train of the plurality of bit trains, selects and outputs one of the partial sums.

The memory for outputting partial sums of the image data item addition/subtraction value can be made to common one. Therefore, it is not necessary to provide a plurality of memories and the circuit scale can be reduced.

According to a still further aspect, the inverse discrete cosine transformer includes a bit distributor receiving a plurality of DCT coefficients for outputting a plurality of bit trains consisting of bits of continuous bit positions of the DCT coefficient; a selection signal generating circuit for successively generating selection signals of image data item addition/subtraction values; an image data item addition/subtraction value generating circuit connected to the bit distributor and the selection signal generating circuit, receiving the plurality of bit trains, and responsive to the successively generated selection signal, for performing calculation of the image data item addition/subtraction value in time-divisional manner; and an adder/subtractor connected to the image data item addition/subtraction value generating circuit, receiving a plurality of said image data item addition/subtraction values, for outputting a plurality of image data items in accordance with a prescribed rule.

According to the invention, the image data item addition/subtraction value generating circuit performs calculation of the data item addition/subtraction value in time-divisional manner. Therefore, as compared with a circuit performing parallel processing, circuit scale can be made smaller. Further, signal changes can be reduced. Therefore, power consumption can be reduced.

Preferably, the image data item addition/subtraction value generating circuit includes a plurality of memories connected to the bit distributor and the selection signal generating circuit, responsive to the plurality of bit trains and to the selection signal for outputting partial sums of image data item addition/subtraction values respectively, and a circuit connected to the plurality of memories respectively, responsive to continuous bit positions of the DCT coefficient for shifting and adding a plurality of partial sums.

According to the invention, the image data item addition/subtraction value generating circuit has a plurality of memories for outputting partial sums of image data item addition/subtraction values for each of the plurality of bit trains. Therefore, memory capacity can be reduced, and it is not necessary to provide a register for storing intermediate result of the image data item addition/subtraction values. This can reduce circuit scale. Further, the output value of the adder is not fed back to the input of the adder. Therefore, there is less signal changes and smaller power consumption.

Preferably, the image data item addition/subtraction value generating circuit includes a bus of minimum bit width for transferring an internal data item.

According to the invention, the closer to the input side in the image data item addition/subtraction value generating circuit, the smaller the bit width of the output of the adder. Therefore, power consumption can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A and 4B show input/output relation of ROMs 429 to 436.

FIGS. 11A and 11B show input/output relation between ROMs 122 to 131.

FIGS. 16A and 16B show input/output relation of ROM 222.

FIGS. 20A to 20D show input/output relations between ROMs 325 to 332.

FIGS. 21A to 21D show input/output relations between ROMs 333 to 340.

DESCRIPTION OF THE PREFERRED EMBODIMENTS

Figure 1:
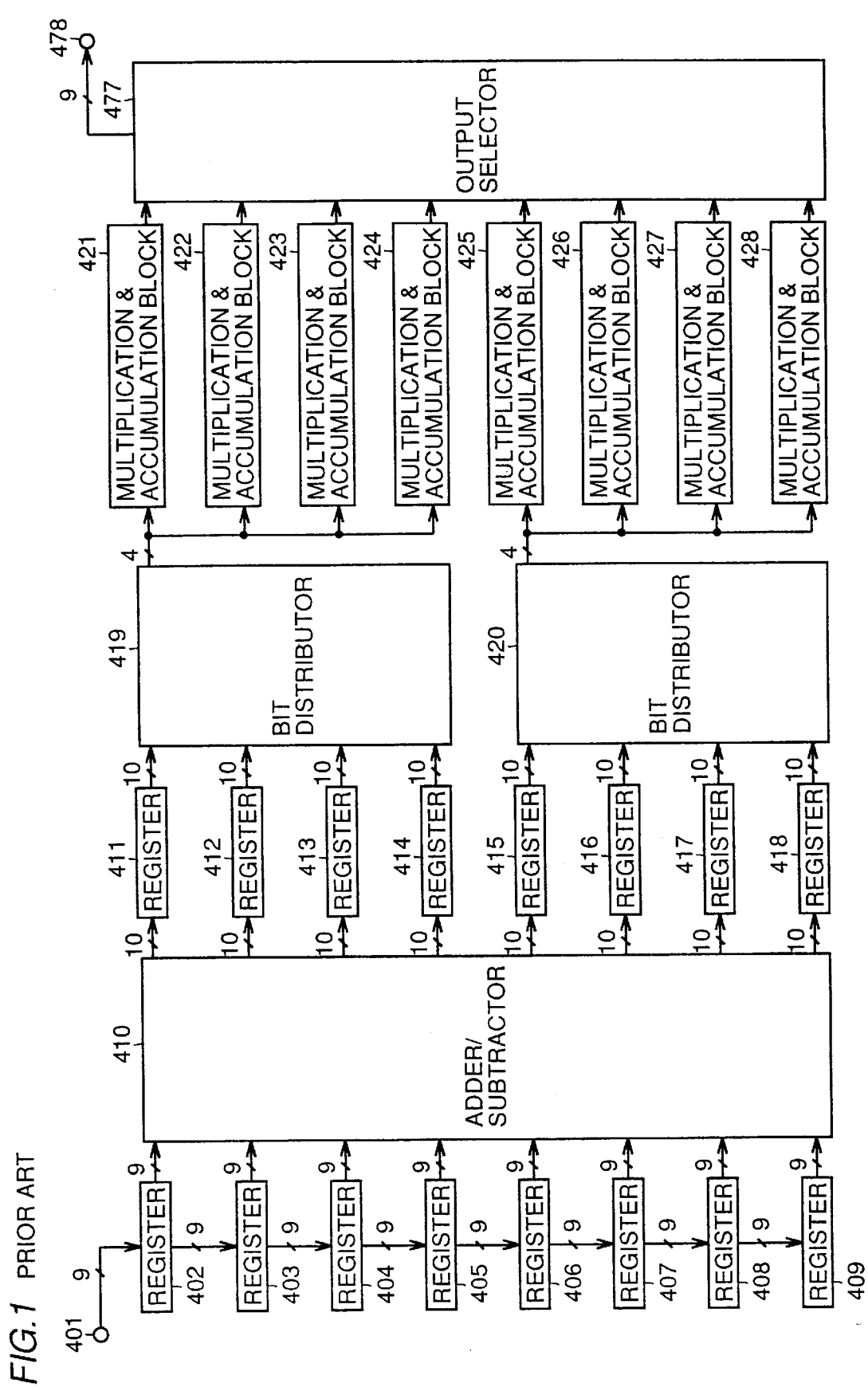
FIG. 1 is a block diagram of a conventional one-dimensional DCT circuit not capable of real time processing.
Figure 2A:
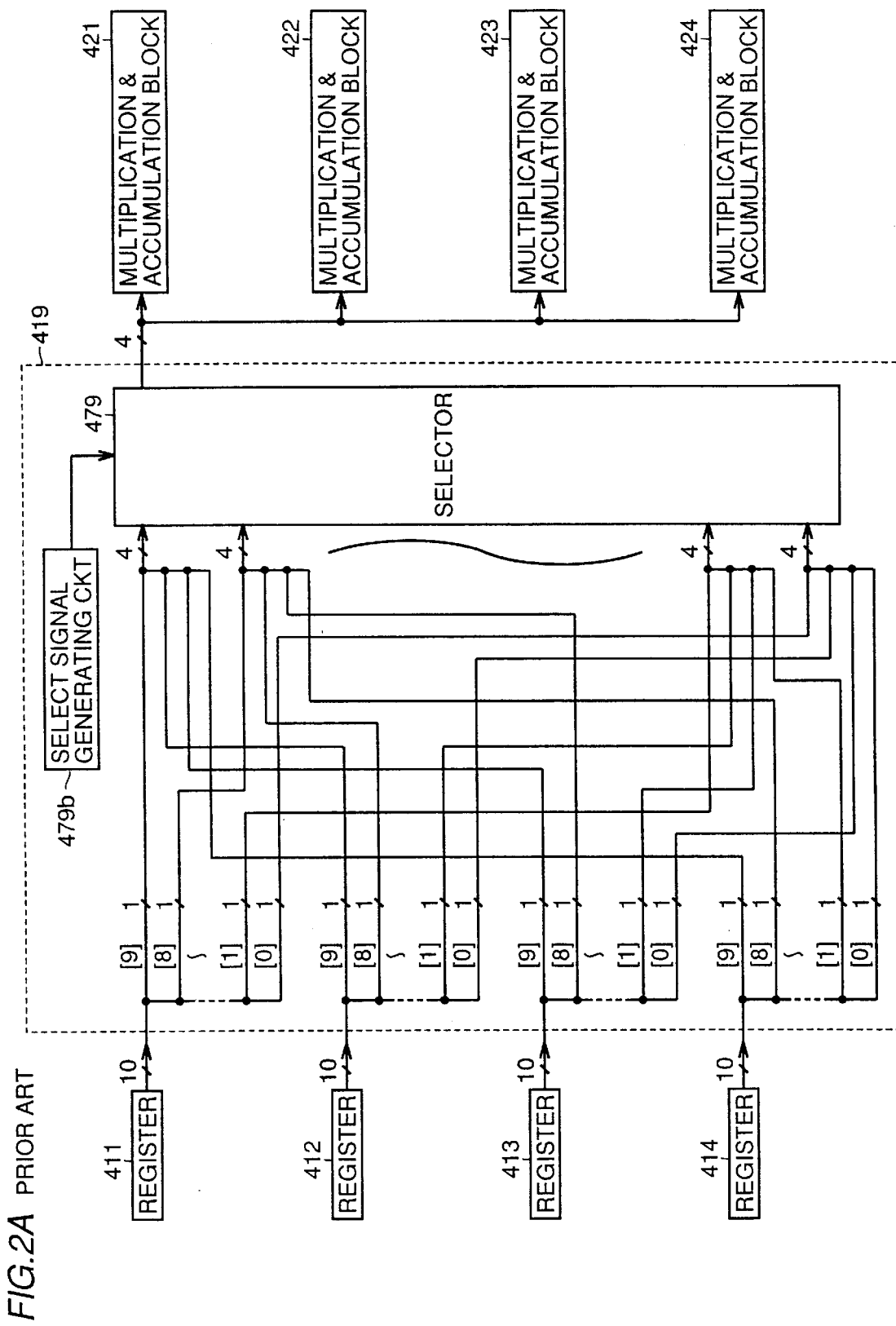
FIGS. 2A and 2B show structures of bit distributors 419 and 420.
Figure 2B:
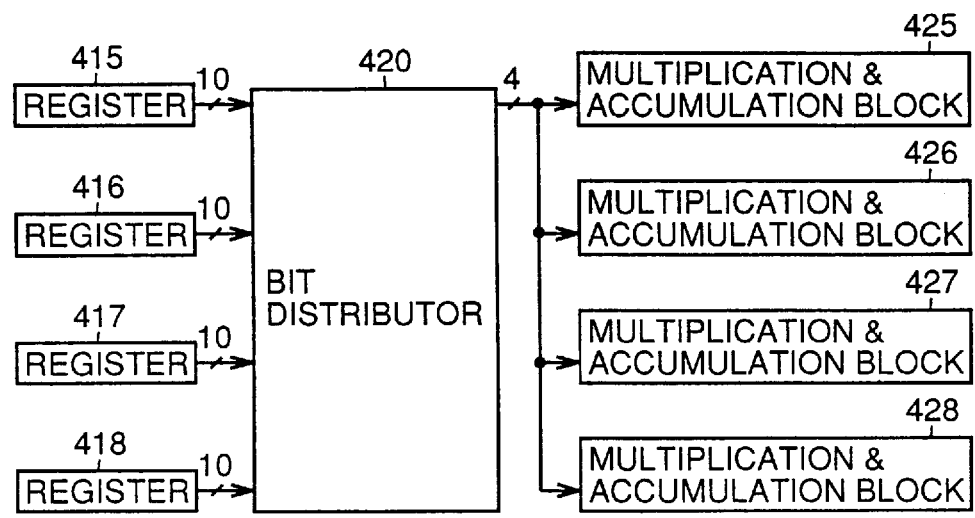
Figure 3A:
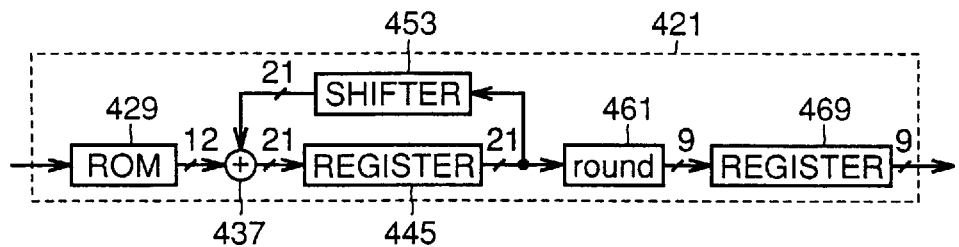
FIGS. 3A to 3H show structures of multiplication and accumulation blocks 421 to 428.
Figure 3B:
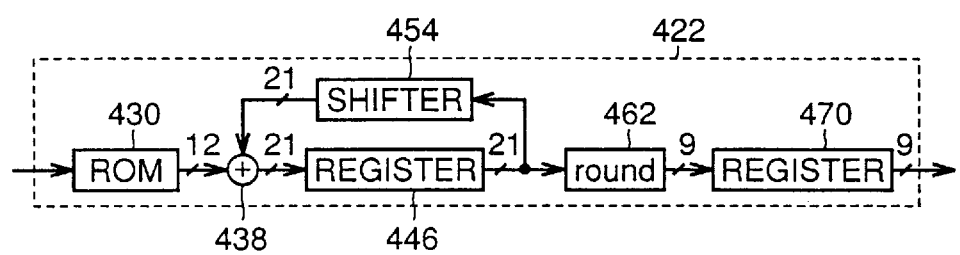
Figure 3C:
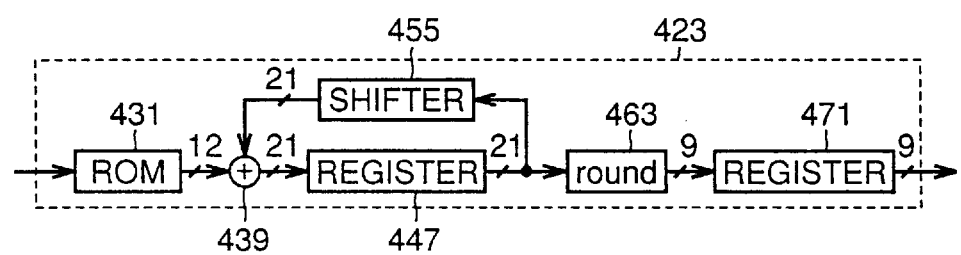
Figure 3D:
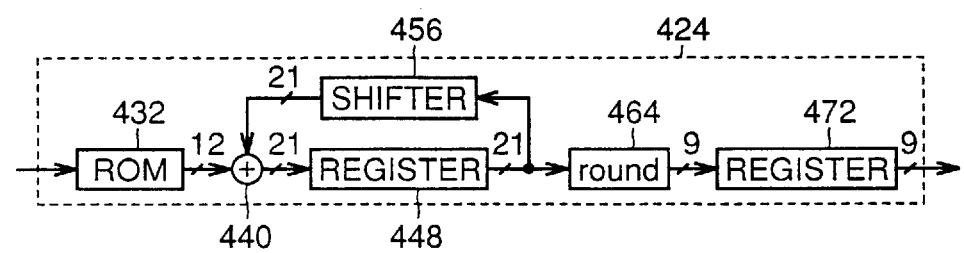
Figure 3E:
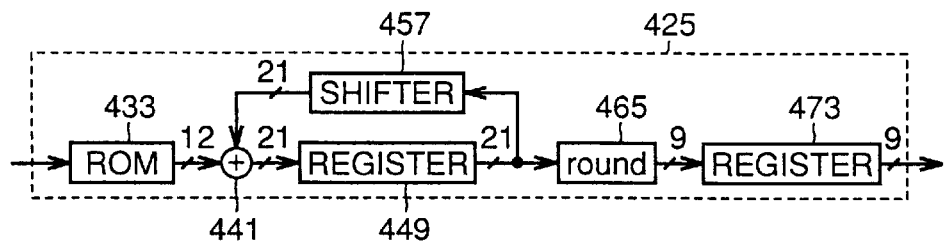
Figure 3F:
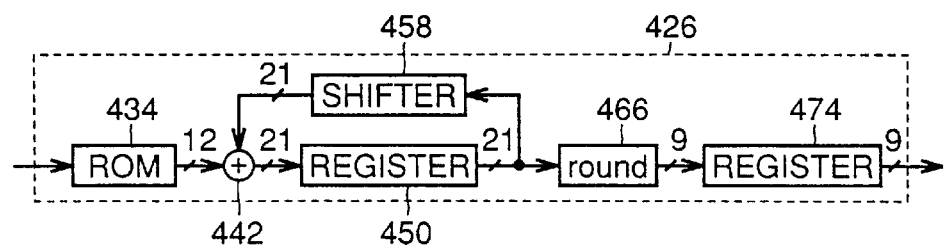
Figure 3G:
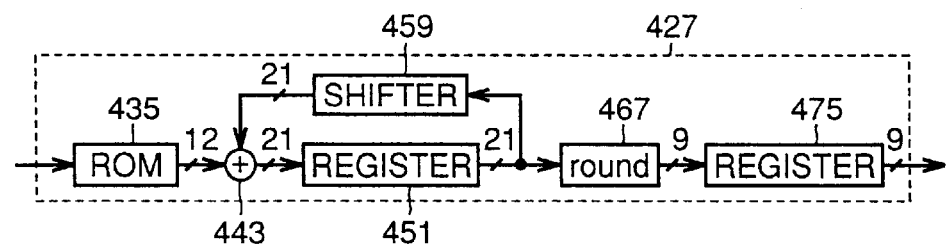
Figure 3H:
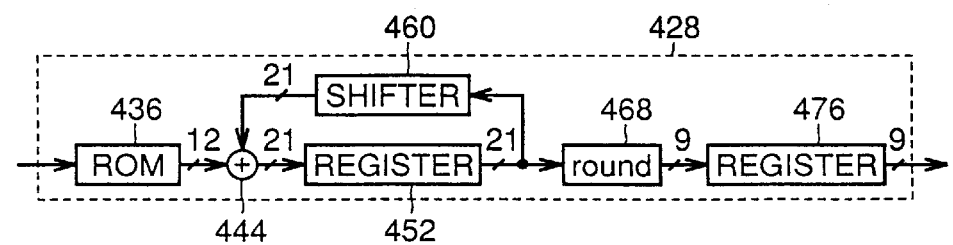
Figure 5:
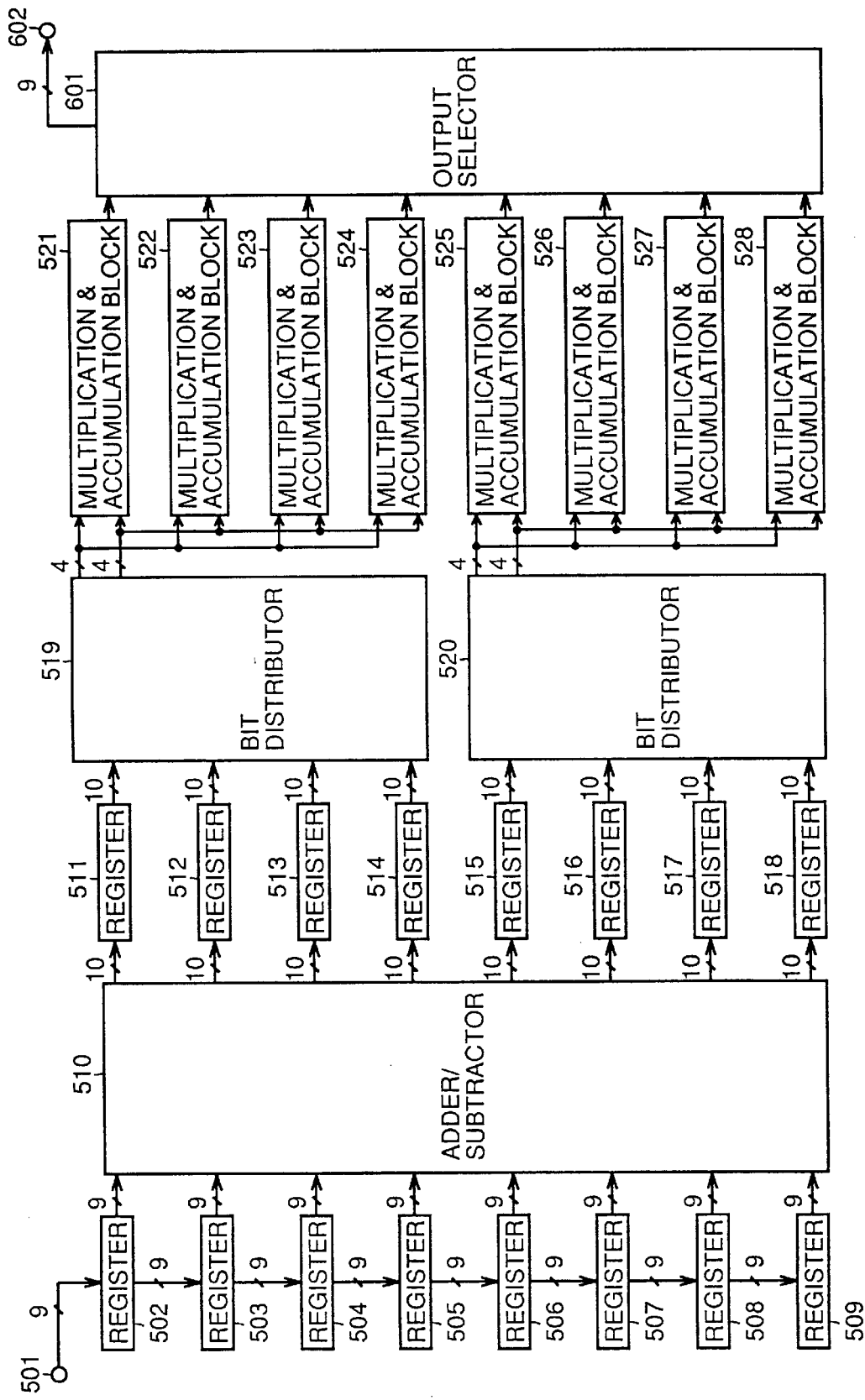
FIG. 5 is a block diagram of a conventional one-dimensional DCT circuit which is capable of real time processing.
Figure 6A:
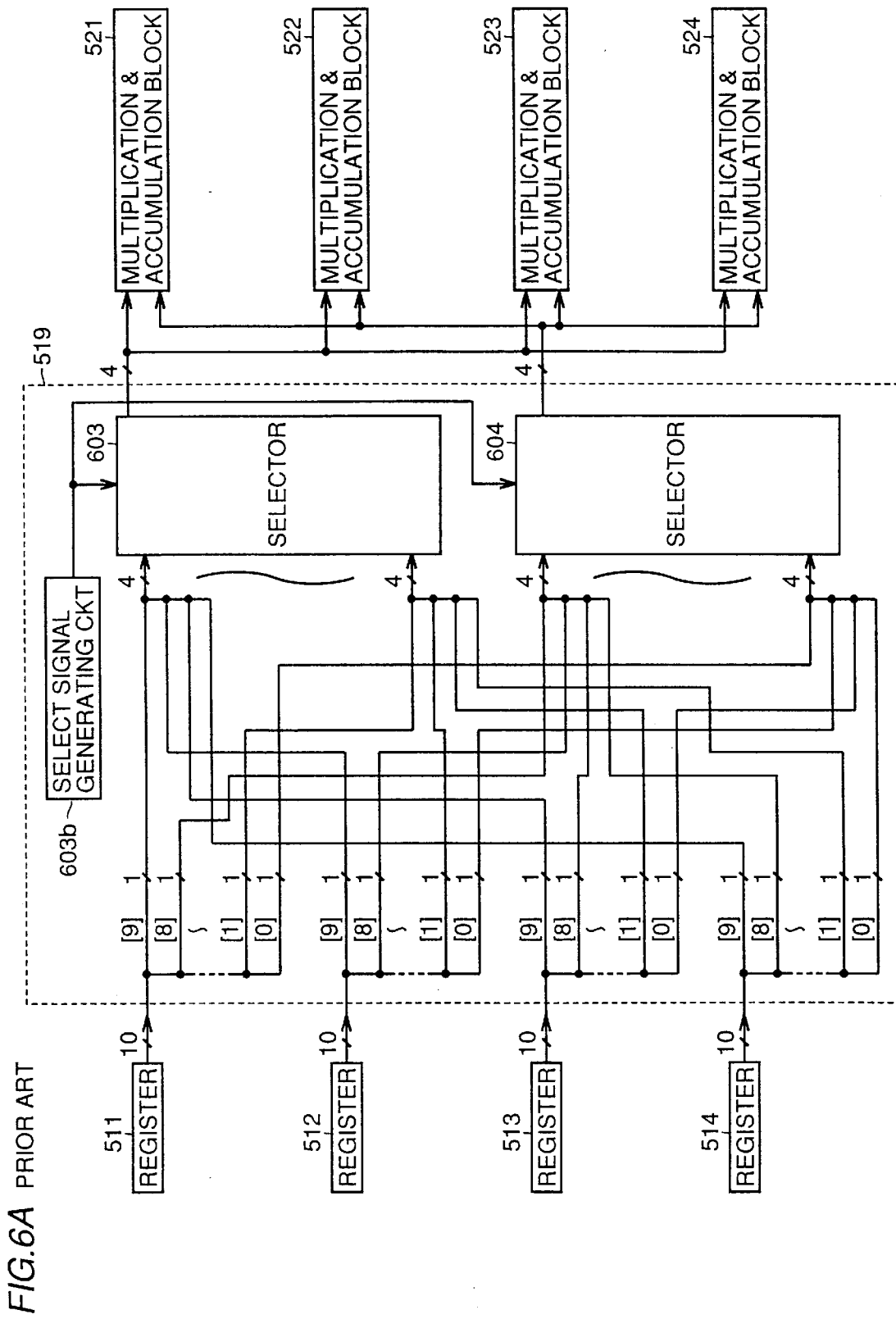
FIGS. 6A and 6B show structures of bit distributors 519 and 520.
Figure 6B:
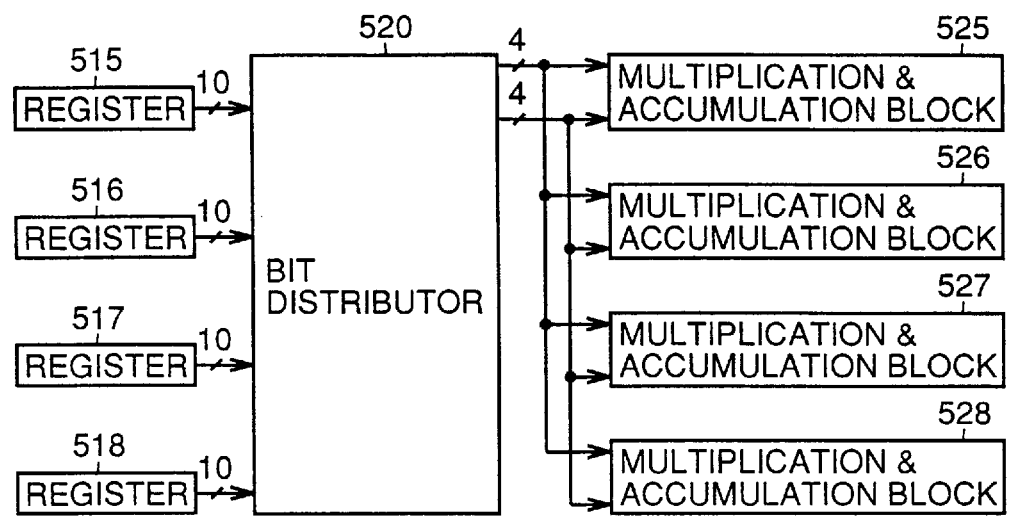
Figure 7A:
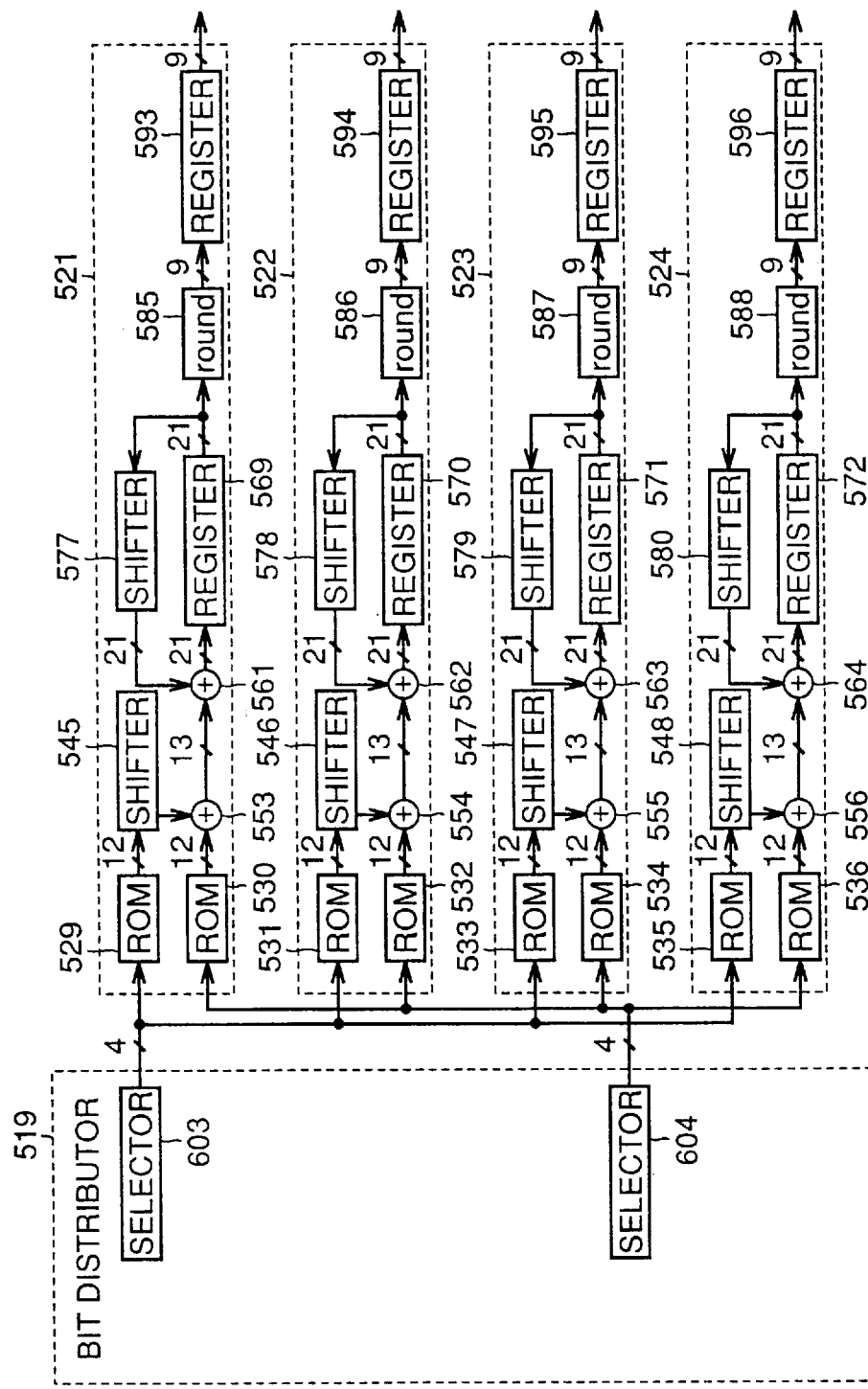
FIGS. 7A and 7B show structures of multiplication and accumulation blocks 521 to 528.
Figure 7B:
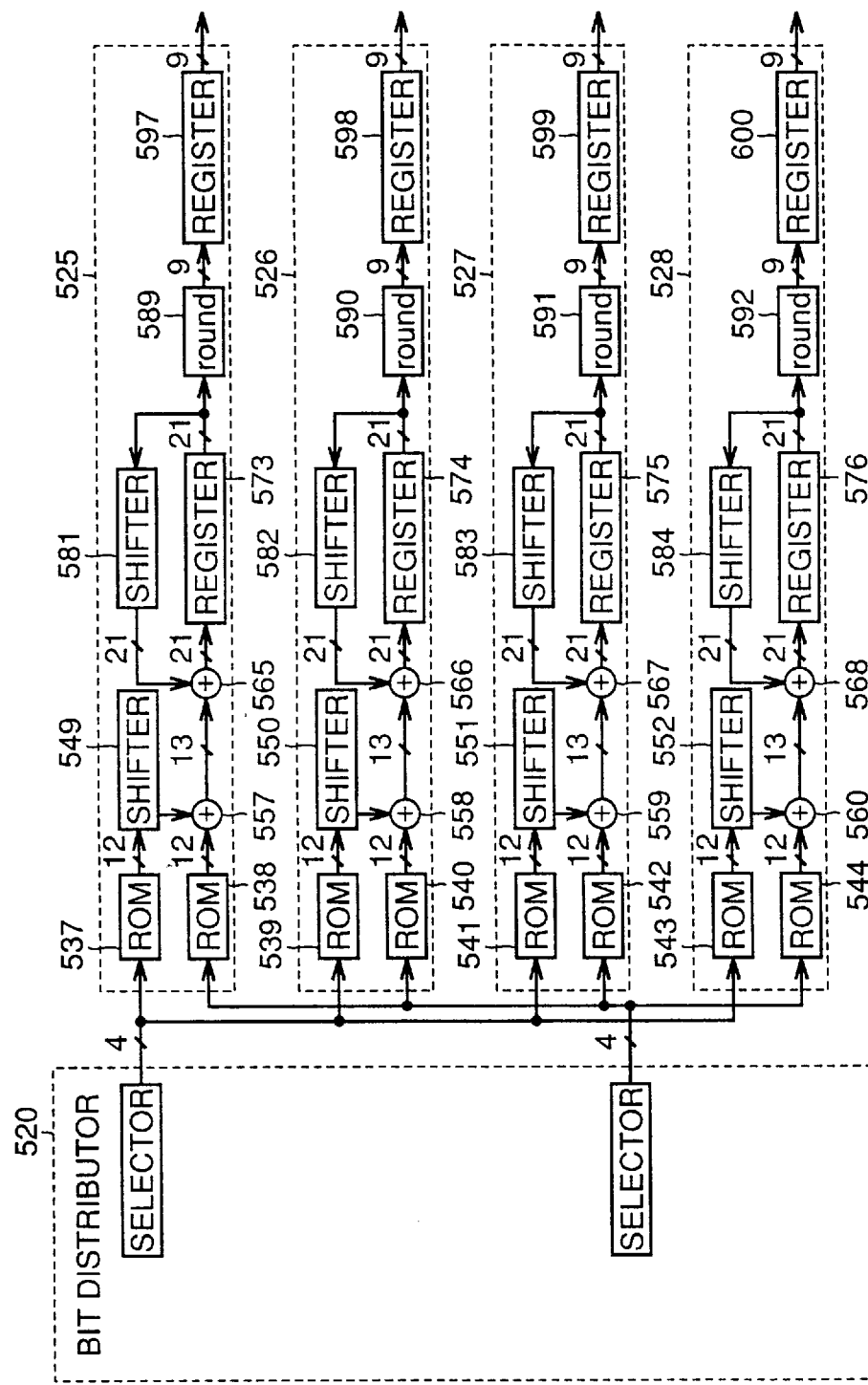
Figure 8:
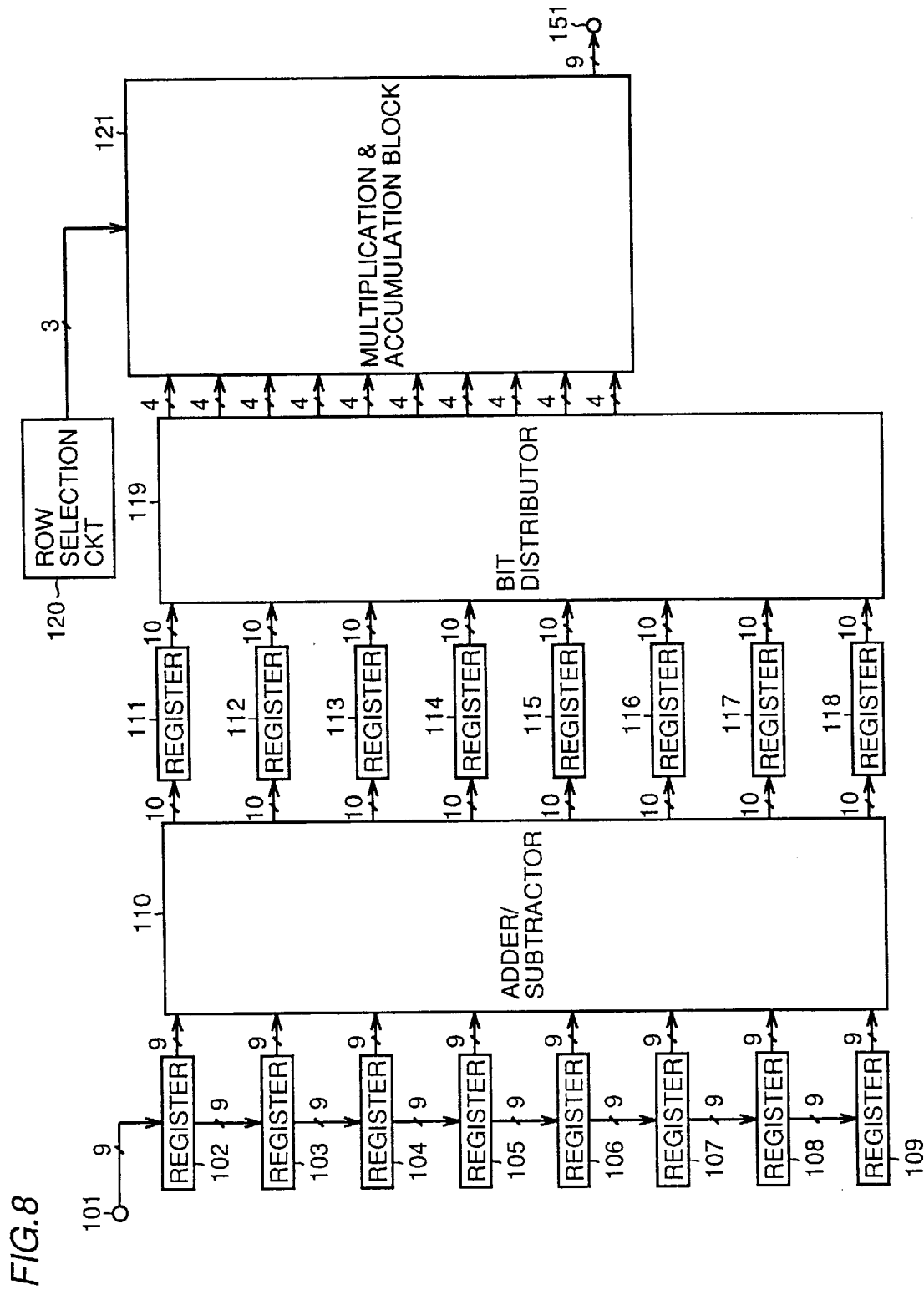
FIG. 8 is a block diagram of a one-dimensional DCT circuit in accordance with a first embodiment of the present invention.

Embodiments of the present invention will be described with reference to the figures. Referring to FIG. 8, one-dimensional DCT circuit (discrete cosine transformer) in accordance with a first embodiment of the present invention performs matrix representations (3) and (4) on an input $X_j$(j=0 to 7) by distributed arithmetic, and outputs DCT coefficient $Y_i$(i=0 to 7). Here, it is assumed that both $X_j$(j=0 to 7) and $Y_i$(i=0 to 7) are data of 9 bits.

Referring to FIG. 8, the one-dimensional DCT circuit in accordance with the first embodiment includes: an input terminal 101 for receiving input data; registers 109 to 102 for respectively holding input data $X_0$ to $X_7$; an adder/ subtractor 110 connected to registers 102 to 109 for outputting results of addition $X_0+X_7$, $X_1+X_6$, $X_2+X_5$ and $X_3+X_4$ as well as results of subtraction $X_0-X_7$, $X_1-X_6$, $X_2-X_5$ and $X_3-X_4$; registers 111 to 118 connected to adder/subtractor 110 for respectively holding the results of addition $X_0+X_7$, $X_1+X_6$, $X_2+X_5$ and $X_3+X_4$ as well as the results of subtraction $X_0-X_7$, $X_1-X_6$, $X_2-X_5$ and $X_3-X_4$; a bit distributor 119 connected to registers 111 to 118 for outputting bit trains consisting of bits at the same bit position of $X_0+X_7$, $X_1+X_6$, $X_2+X_5$ and $X_3+X_4$, or bit trains consisting of bits at the same bit position of $X_0-X_7$, $X_1-X_6$, $X_2-X_5$ and $X_3-X_4$; and a multiplication and accumulation block 121 connected to bit distributor 119 and a row selecting circuit 120 for calculating a value of a DCT coefficient in accordance with a row selection signal output from the row selection circuit 120 and for outputting the calculated value through an output terminal 151.

Figure 9:
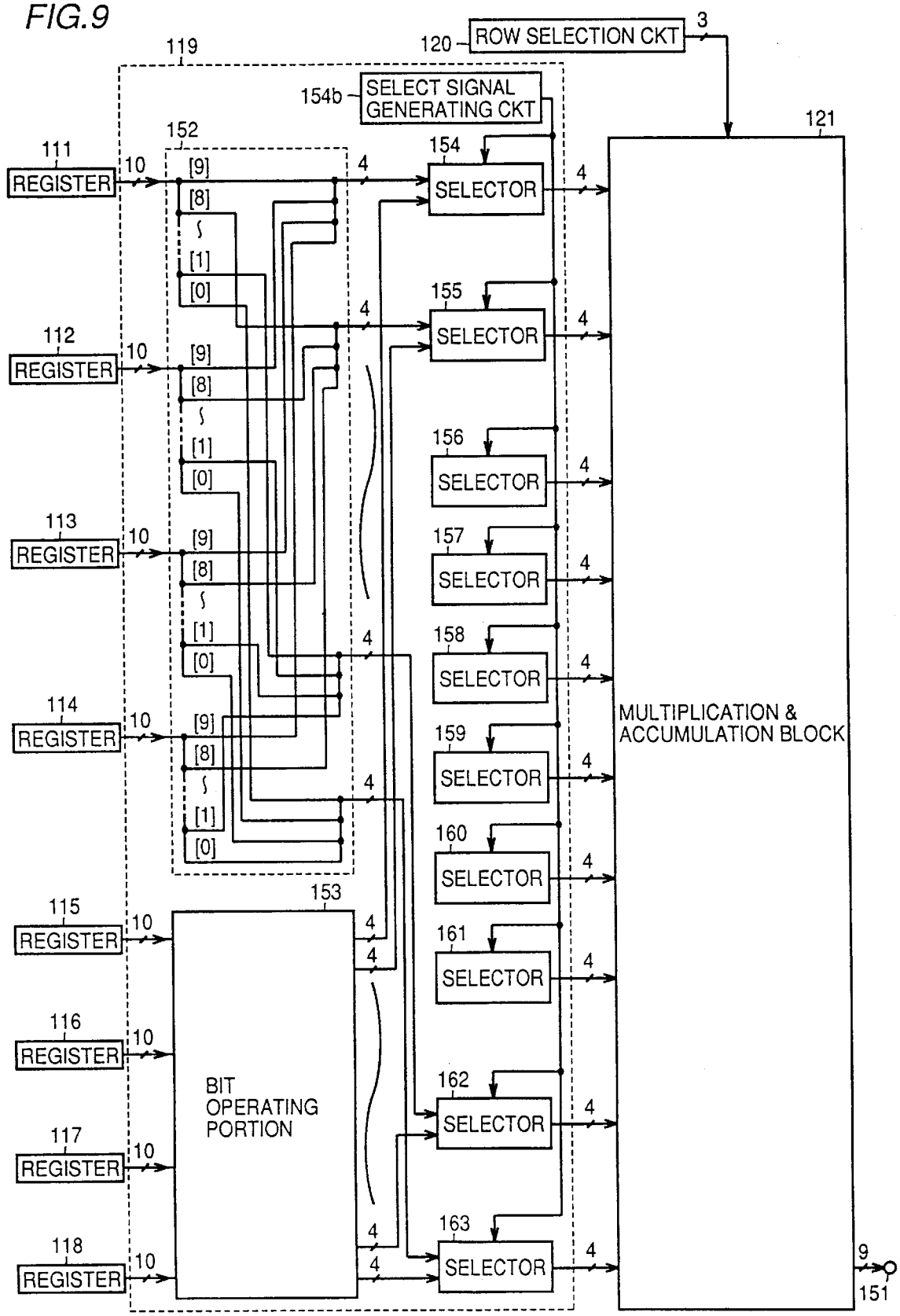
FIG. 9 shows a structure of a bit distributor 119.

Referring to FIG. 9, the bit distributor 119 includes: a bit operating portion 152 connected to registers 111 to 114, receiving 10 bits of data $X_0+X_7$, $X_1+X_6$, $X_2+X_5$ and $X_3+X_4$ for outputting ten sets of bit trains of the same bit position; a bit operating portion 153 connected to registers 115 to 118, receiving 10 bits of data $X_0-X_7$, $X_1-X_6$, $X_2-X_5$ and $X_3-X_4$ for outputting ten sets of bit trains of the same bit position; and selectors 154 to 163 connected to bit operating portions 152 and 153 as well as to a select signal generating circuit 154b for receiving a certain bit train of bit operating portion 152 and a certain bit train of bit operating portion 153 for selecting and outputting either of the bit trains in accordance with a select signal output from the select signal generating circuit 154b.

Figure 10:
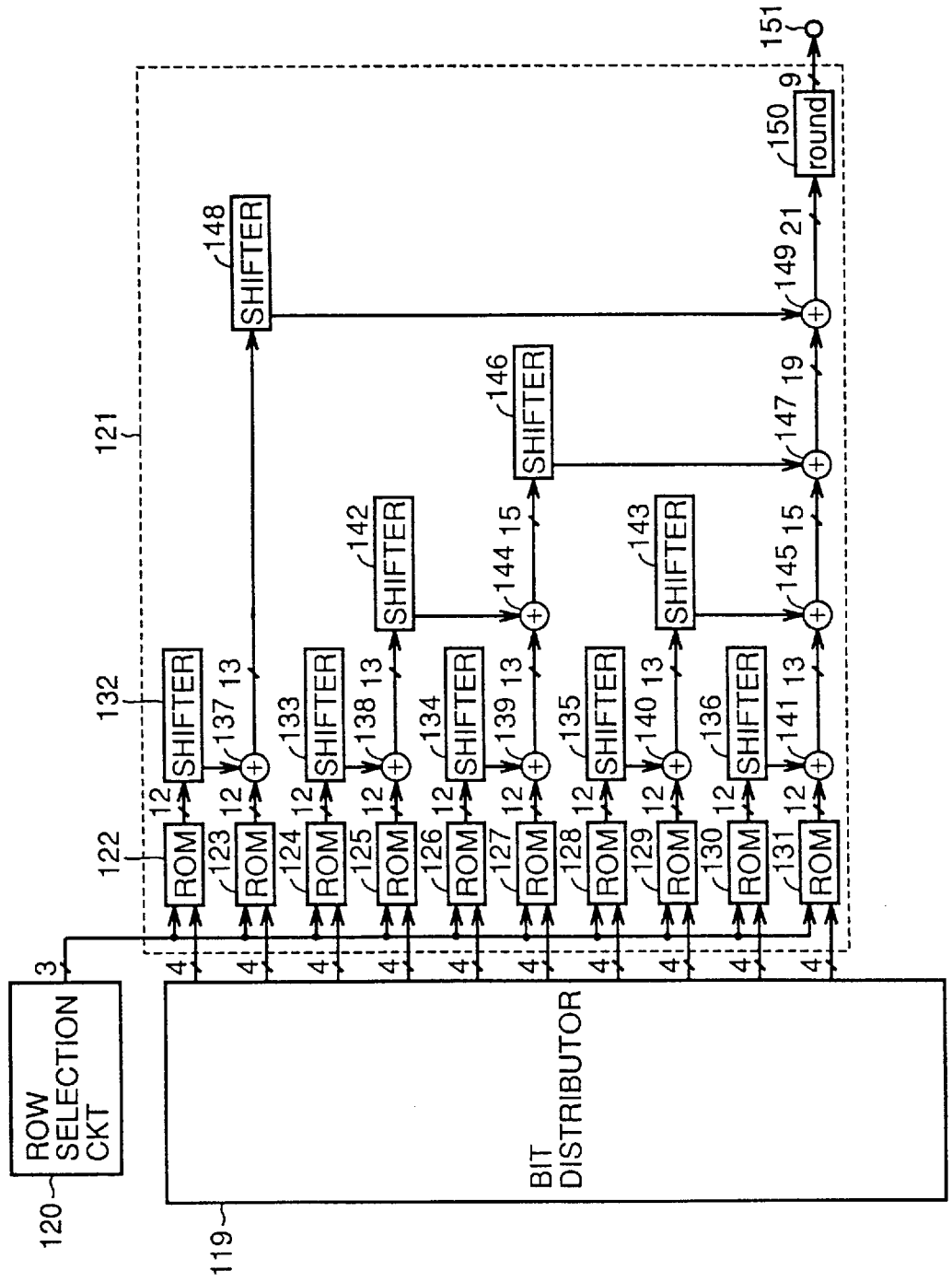
FIG. 10 shows a structure of multiplication and accumulation block 121.

Referring to FIG. 10, the multiplication and accumulation block 121 includes: ROMs 122 to 131 connected to bit distributor 119 and row selection circuit 120, responsive to the bit trains output from bit distributor 119 for respectively outputting partial sums of DCT coefficient in accordance with the row selection signal output from row selection circuit 120; shifters 132, 133, 134, 135 and 136 connected to ROMs 122, 124, 126, 128 and 130, respectively, for shifting by one bit and outputting respective output values; an adder 137 connected to shifter 132 and ROM 123 for adding respective output values and for outputting the result; an adder 138 connected to shifter 133 and ROM 125 for adding respective output values and for outputting the result; an adder 139 connected to shifter 134 and ROM 127 for adding respective output values and for outputting the result; an adder 140 connected to shifter 135 and ROM 129 for adding respective output values and for outputting the result; an adder 141 connected to shifter 136 and ROM 131 for adding respective output values and for outputting the result; shifters 142 and 143 connected to adders 138 and 140, respectively, for shifting respective output values by 2 bits and for outputting the shifted values; an adder 144 connected to shifter 142 and to adder 139 for adding respective output values and for outputting the result; an adder 145 connected to shifter 143 and adder 141 for adding respective output values and for outputting the result; a shifter 146 connected to adder 144 and for shifting the output value by 4 bits; an adder 147 connected to shifter 146 and adder 145 for adding respective output values and for outputting the result; a shifter 148 connected to adder 137 for shifting the output by 8 bits; an adder 149 connected to shifter 148 and adder 147 for adding respective output values and for outputting the result; and a rounding circuit 150 connected to adder 149 for rounding the output to 9 bits for outputting the rounding result to an output terminal 151.

The operation of the circuit will be described in the following. 8 data $X_0$ to $X_7$ input through input terminal 101 are successively transferred to registers 102 to 109 in the order of input, and held in registers 109 to 102, respectively. Outputs $X_0$ to $X_7$ of registers 109 to added or added or subtracted by adder/subtractor 110, respectively. Results of addition $X_0+X_7$, $X_1+X_6$, $X_2+X_5$ and $X_3+X_4$ are held in registers 111 to 114, respectively. Results of subtraction $X_0-X_7$, $X_1-X_6$, $X_2-X_5$ and $X_3-X_4$ are held in registers 115 to 118, respectively. Since input $X_j(j=0$ to 7) is data having 9 bits, the results of addition $X_0+X_7$, $X_1+X_6$, $X_2+X_5$ and $X_3+X_4$ and the results of subtraction $X_0-X_7$, $X_1-X_6$, $X_2-X_5$ and $X_3-X_4$ are data of 10 bits.

Referring to FIG. 9, operation of bit distributor 119 which receives the outputs $X_0+X_7$, $X_1+X_6$, $X_2+X_5$ and $X_3+X_4$ from registers 111 to 114 and the outputs $X_0-X_7$, $X_1-X_6$, $X_2-X_5$ and $X_3-X_4$ from registers 115 to 118, respectively, will be described. In bit distributor 119, respective outputs from registers 111 to 114 are distributed to ten signal lines (most significant [9] to least significant [0]) from the most significant to the least significant bits, by bit operating portion 152. Ten sets of 4 bit signal lines indicating signals of 4 bits, are provided by the combination of four signal lines of the same bit positions. 4 bit signal lines of the signal lines [9] are connected to selector 154, 4 bits signal lines of [8] are connected to selector 155, ... and 4 bits signal lines of [0] are connected to selector 163, and in this manner, these signal lines are connected to selectors 154 to 163, respectively.

Similarly, respective outputs from registers 115 to 118 are distributed to ten signal lines (most significant [9] to least significant [0]) from the most significant to least significant bits by bit operating portion 153. Ten sets of 4 bit signal lines including four signal lines of the same bit position are provided, and 4 bit signal lines of the signal line [9] are connected to selector 154, 4 bit signal lines of [8] are connected to selector 155, ... and 4 bit signal lines of [0] are connected to selector 163. In this manner, these signal lines are connected to selectors 154 to 163, respectively.

In this manner, selectors 154 to 163 receive two sets of 4 bit trains, that is, 4 bit trains consisting of bits of the same bit positions of $X_0+X_7$, $X_1+X_6$, $X_2+X_5$ and $X_3+X_4$ and 4 bit trains consisting of the bits of the same bit positions of $X_0-X_7$, $X_1-X_6$, $X_2-X_5$ and $X_3-X_4$. Selectors 154 to 163 are adapted to output the former 4 bit trains when $Y_0$, $Y_2$, $Y_4$ and $Y_6$ are to be calculated and to output the latter 4 bit trains when $Y_1$, $Y_3$, $Y_5$ and $Y_7$ are to be calculated, in accordance with a select signal outputs from select signal generating circuit 154b, to multiplication and accumulation block 121.

In summary, when $Y_0$, $Y_2$, $Y_4$ and $Y_6$ are to be calculated, ten sets of 4 bit trains consisting of bits of the same bit positions of $X_0+X_7$, $X_1+X_6$, $X_2+X_5$ and $X_3+X_4$ which are the outputs of registers 111 to 114 are output simultaneously from bit distributor 119 to multiplication and accumulation block 121. When $Y_1$, $Y_3$, $Y_5$ and $Y_7$ are to be calculated, ten sets of 4 bit trains consisting of bits of the same bit positions of $X_0-X_7$, $X_1-X_6$, $X_2-X_5$ and $X_3-X_4$, which are the outputs of registers 115 to 118, are output simultaneously from bit distributor 119 to multiplication and accumulation block 121.

Multiplication and accumulation block 121 simultaneously receives ten sets of 4 bit trains from bit distributor 119, perform 8 multiplications and accumulations implementing matrix representations (3) and (4) in a prescribed order, and successively calculates $Y_0$, $Y_1$, $Y_2$, $Y_3$, $Y_4$, $Y_5$, $Y_6$ and $Y_7$. This operation will be described taking the calculation of the first row of representation (3), namely, calculation of $Y_0$, as an example.

Referring to FIG. 10, ROMs 122 to 131 provided in multiplication and accumulation block 121 receive 3 bits of row selection signal from row selection circuit 120, and separate from the row selection signal, the 4 bit trains. Referring to FIGS. 11A and 11B, ROMs 122 to 131 output, when row selection signal is (000), 0 if 4 bit trains is (0000), $C_4$ if the 4 bit trains is (0001), . . . and $4C_4$ when the 4 bit trains is (1111). ROMs 122 to 131 output, when row selection signal is (001), 0 if the 4 bit trains is (0000), $-C_2$ if (0001), . . . and 0 if (1111). Similarly, ROMs 122 to 131 are adapted to output, when row selection signal is (111), 0 if the 4 bit train is (0000), $-C_1$ if the train is (0001), . . . and $-C_1+C_3-C_5+C_7$ if the train is (1111).

The row selection signal is for selecting the DCT coefficient calculated by multiplication and accumulation block 121. The bit values of the 4 bit train represent the bit values of the same bit position of $X_0+X_7$, $X_1+X_6$, $X_2+X_5$ and $X_3+X_4$, or the bit values of the same bit position of $X_0-X_7$, $X_1-X_6$, $X_2-X_5$ and $X_3-X_4$. For example, assume that DCT coefficient $Y_0$ is calculated, setting row selection signal to (000). In this case, outputs from ROMs 122 to 132 represent partial sum of $Y_0=\{C_4(X_0+X_7)+C_4(X_1+X_6)+C_4(X_2+X_5)+C_4(X_3+X_4)\}/2$ when a 4 bit train is input.

Accordingly, from representations (3) and (4), when the input row selection signal is (000) and the 4 bit train consists of bits at the same bit position of $X_0+X_7$, $X_1+X_6$, $X_2+X_5$ and $X_3+X_4$, a partial sum of $Y_0$ is output. Similarly, when the input row selection signal is (001) and the 4 bit train consists of bits of the same bit position of $X_0+X_7$, $X_1+X_6$, $X_2+X_5$ and $X_3+X_4$, then partial sum of $Y_2$ is output. When the input row selection signal is (111) and the 4 bit train consists of the bits of the same bit position of $X_0-X_7$, $X_1-X_6$, $X_2-X_5$ and $X_3-X_4$, partial sum of $Y_7$ is output. Though not shown, data stored in ROM 122 has its polarity opposite to data stored in other ROMs 123 to 131, which corresponds to the fact that the partial sum having the 4 bit train consisting of the most significant bit as its component is negative. The following description is on the premise that ROMs 122 to 131 are structured as described above.

First, (000) is input as the row selection signal from row selection circuit 120 to ROMs 122 to 131. At the same time, 4 bit train consisting of the most significant bit of $X_0+X_7$, $X_1+X_6$, $X_2+X_5$ and $X_3+X_4$ is input to ROM 122, 4 bit train consisting of the bits at bit position 1 is input to ROM 123, . . . and 4 bit train consisting of the least significant bit (bits at bit position 9) is input to ROM 131, from bit distributor 119, respectively. Consequently, partial sum of $Y_0$ having the 4 bit train consisting of the most significant bit is output from ROM 122, partial sum of $Y_0$ having the 4 bit train consisting of bits at bit position 1 as its component is output form ROM 123, . . . and partial sum of $Y_0$ having the 4 bit train consisting of the least significant bit as its component is output from ROM 131, respectively.

Thereafter, outputs from ROMs 122, 124, 126, 128 and 130 are shifted by 1 bit upward by shifters 132, 133, 134, 135 and 136, and added to outputs of ROMs 123, 125, 127, 129 and 131 in adders 137, 138, 139, 140 and 141.

Accordingly, the output from adder 137 is a result of addition of partial sum (shifted by 1 bit upward) of $Y_0$ having 4 bit train consisting of the most significant bit as its component and partial sum of $Y_0$ having 4 bit train consisting of bits at bit position 1 as its component. The output from adder 138 is a result of addition of partial sum (shifted by 1 bit upward) of $Y_0$ having 4 bit train consisting of bits at bit position 2 as its component and partial sum of $Y_0$ having 4 bit train consisting of bits at bit position 3 as its component. The output from adder 139 is a result of addition of partial sum (shifted by 1 bit upward) of $Y_0$ having 4 bit train consisting of bits at bit position 4 as its component and partial sum of $Y_0$ having 4 bit train consisting of bits at bit position 5 as its component. The output of adder 140 is a result of addition of partial sum (shifted by 1 bit upward) of $Y_0$ having 4 bit train consisting of bits at bit position 6 as its component and partial sum of $Y_0$ having 4 bit train consisting of bits at bit position 7 as its component. The output from adder 141 is a result of addition of partial sum (shifted by 1 bit upward) having 4 bit train consisting of bits at bit position 8 as a component and partial sum of $Y_0$ having 4 bit train consisting of the least significant bits as its component.

Outputs from adders 138 and 140 are shifted by 2 bits upward by shifters 142 and 143, and added to the outputs from adders 139 and 141 in adders 144 and 145, respectively. Therefore, the output from adder 144 is a result of addition of partial sum (shifted by 3 bits upward) of $Y_0$ having the 4 bit train consisting of bits at bit position 2 as its component, partial sum (shifted by 2 bits upward) of $Y_0$ having the 4 bit train consisting of bits at bit position 3 as its component, partial sum (shifted by 1 bit upward) of $Y_0$ having the 4 bit train consisting of bits at bit position 4 as its component and partial sum of $Y_0$ having the 4 bit train consisting of bits at bit position 5 as its component. The output from adder 145 is a result of addition of partial sum (shifted by 3 bits upward) of $Y_0$ having the 4 bit train consisting of bits at bit position 6 as its component, partial sum (shifted by 2 bits upward) of $Y_0$ having the 4 bit train consisting of bits at bit position 7 as its component, partial sum (shifted by 1 bit upward) of $Y_0$ having the 4 bit train consisting of bits at bit position 8 as its component, and the partial sum of $Y_0$ having the 4 bit train consisting of the least significant bits as its component.

The output from adder 144 is shifted by 4 bits upward by shifter 146, and added to the output of adder 145 in adder 147. Therefore, the output from adder 147 is a result of addition of partial sum (shifted by 7 bits upward) of $Y_0$ having the 4 bit train consisting of bits at bit position 2 as its component, partial sum (shifted by 6 bits upward) of $Y_0$ having the 4 bit train consisting of bits at bit position 3 as its component, partial sum (shifted by 5 bits upward) of $Y_0$ having the 4 bit train consisting of bits at bit position 4 as its component, partial sum (shifted by 4 bits upward) of $Y_0$ having the 4 bit train consisting of bits at bit position 5 as its component, partial sum (shifted by 3 bits upward) of $Y_0$ having the 4 bit train consisting of bits at bit position 6 as its component, partial sum (shifted by 2 bits upward) of $Y_0$ having the 4 bit train consisting of bits at bit position 7 as its component, partial sum (shifted by 1 bit upward) of $Y_0$ having the 4 bit train consisting of bits at bit position 8 as its component, and partial sum of $Y_0$ having the 4 bit train consisting of the least significant bit as its component.

The output from adder 137 is shifted by 8 bits upward by shifter 148, and added to the output of adder 147 in adder 149. Therefore, the output from adder 149 is a result of addition of partial sum (shifted by 9 bits upward) of $Y_0$ having the 4 bit train consisting of the most significant bits as its component, partial sum (shifted by 8 bits upward) of $Y_0$ having the 4 bit train consisting of bits at bit position 1 as its component, partial sum (shifted by 7 bits upward) of $Y_0$ having the 4 bit train consisting of the bits at bit position 2 as its component, partial sum (shifted by 6 bits upward) of $Y_0$ having the 4 bit train consisting of bits at bit position 3 as its component, partial sum (shifted by 5 bits upward) having the 4 bit train consisting of bits at bit position 4 as its component, partial sum (shifted by 4 bits upward) of $Y_0$ having the 4 bit train consisting of bits at bit position 5 as its component, partial sum (shifted by 3 bits upward) of $Y_0$ having the 4 bit train consisting of bits at bit position 6 as its component, partial sum (shifted by 2 bits upward) of $Y_0$ having the 4 bit train consisting of bits at bit position 7 as its component, partial sum (shifted by 1 bit upward) of $Y_0$ having the 4 bit train consisting of bits at bit position 8 as its component, and partial sum of $Y_0$ having the 4 bit train consisting of the least significant bits as its component.

The output from adder 149 is rounded to 9 bits in rounding circuit 150 and output from output terminal 151.

By the above-described operation, ten partial sums (all partial sums) having ten sets of 4 bit trains consisting of bits at same bit positions of $X_0+X_7$, $X_1+X_6$, $X_2+X_5$ and $X_3+X_4$ as components are generated simultaneously, and these are shifted and added as shown in the expression (13) in accordance with the bit positions. Thus $T_0$ is calculated.

Further, in multiplication and accumulation block 121, ten sets of 4 bits trains from the 4 bit train consisting of the high most significant bits to the 4 bit train consisting of the least significant bits of $X_0+X_7$, $X_1+X_6$, $X_2+X_5$ and $X_3+X_4$ are input to ROMs 122 to 131 from bit distributor 119. When row selection signal input to ROMs 122 to 131 from row selection circuit 120 is (001), (010) or (011), then $Y_2$ $Y_4$ or $Y_6$ is calculated.

In multiplication and accumulation block 121, ten sets of 4 bit trains from the 4 bit train consisting of the most significant bits to the 4 bit train consisting of the least significant bits of $X_0-X_7$, $X_1-X_6$, $X_2-X_5$ and $X_3-X_4$ are input to ROMs 122 to 131 from bit distributor 119. When row selection signal input from row selection circuit 120 to ROMs 122 to 131 is (100), (101), (110) or (111), then $Y_1$, $Y_3$ $Y_5$ or $Y_7$ is calculated.

Which of (000), (001), . . . (111) is to be output as 3 bit selection signal from row selection circuit 120 is appropriately switched. Whether ten sets of 4 bit trains consisting of bits of respective same bit positions of $X_0+X_7$, $X_1+X_6$, $X_2+X_5$ and $X_3+X_4$, which are outputs of registers 111 to 114 are to be simultaneously output or those consisting of bits of respective same bit positions of $X_0-X_7$, $X_1-X_6$, $X_2-X_5$ and $X_3-X_4$ which are output of registers 115 to 118 are to be output simultaneously from bit distributor 119 is appropriately switched. $Y_0$ to $Y_7$ are calculated in a prescribed order and one-dimensional DCT is completed.

Here, in the one-dimensional DCT circuit, $X_j$(j=0 to 7) are input successively in 8 steps from input terminal 101, while the same number as the number $Y_0$ to $Y_7$, that is, 8 steps, are necessary for calculating $Y_0$ to $Y_7$ in multiplication and accumulation block 121. Namely, the time for input is the same as the time for calculation. In other words, the DCT circuit is capable of real time operation. Therefore, even when input is continuously provided through input terminal 101 to the DCT circuit, calculation can catch up the input. Therefore, it is possible to continuously input through input terminal 101, and image compression can be done efficiently.

Further, 8 multiplications and accumulations implementing matrix representations (3) and (4) are performed not in parallel as in the prior art but one by one in time-divisional manner. Further, ten partial sums having ten sets of 4 bit trains consisting of bits of respective same bit positions of four data which are the object of one multiplication and accumulation as components, that is, all the partial sums related to one multiplication and accumulation are generated simultaneously by ROMs 122 to 131. Therefore, in multiplication and accumulation block 121, register is not necessary, and multiplication and accumulation can be done by nine adders. Further, addition of partial sums is not fed back but is fed forward. Therefore, when each coefficient of the matrixes (3) and (4) has 10 bits, the outputs from ROMs 122 to 131 have 12 bits, adder 149 has 21 bits, adder 147 has 19 bits, adders 144 and 145 have 15 bits and adders 137 to 141 have 13 bits. Namely, the closer the adder is to the input side, the smaller the output bit width. Further, signal change is reduced.

Figure 12:
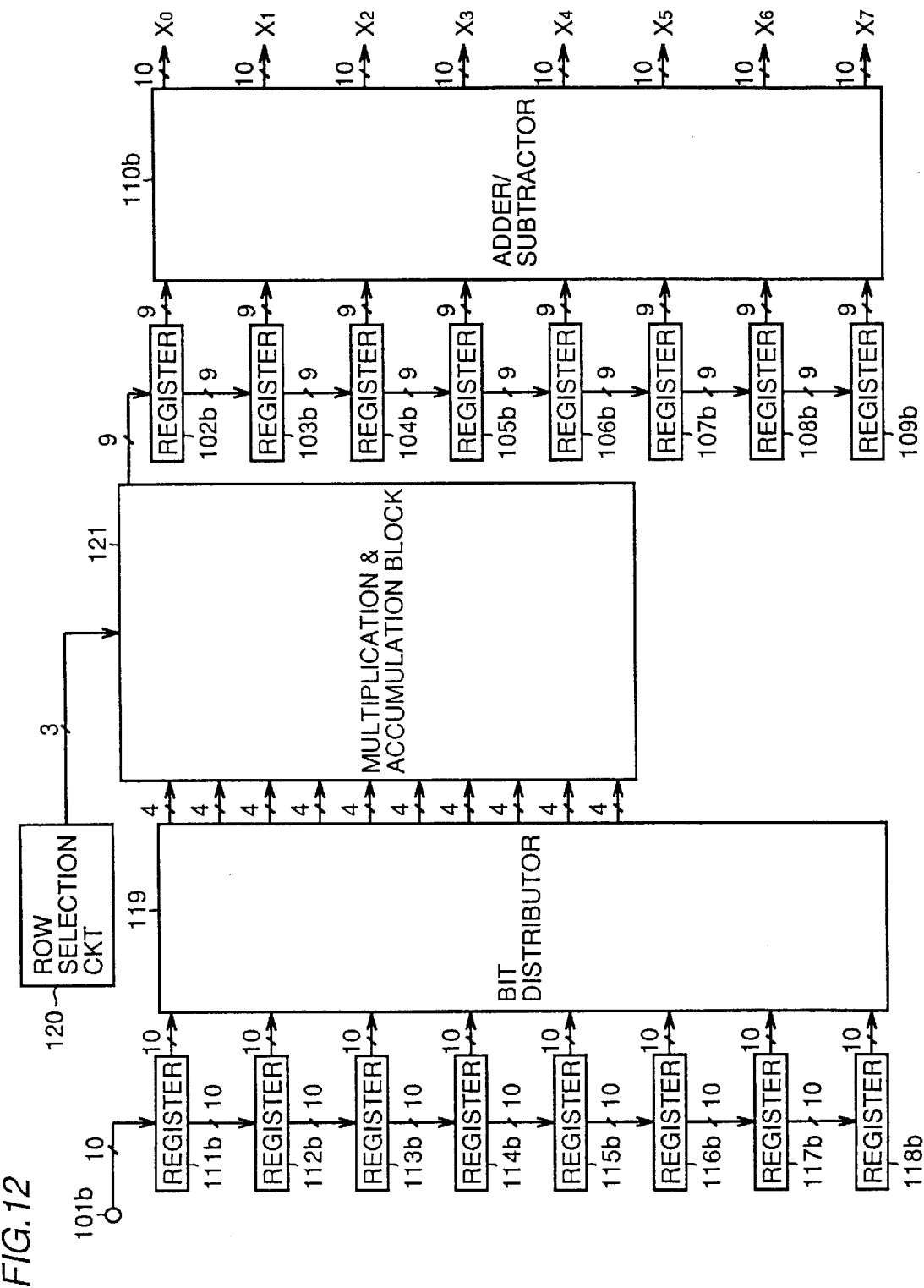
FIG. 12 is a block diagram of one-dimensional IDCT circuit in accordance with a first embodiment of the present invention.

Referring to FIG. 12, using the multiplication and accumulation block 121, a one-dimensional IDC circuit (inverse discrete cosine transformer) can be provided. The one-dimensional IDC circuit is adapted to perform matrix operations shown in (7) and (8) on an input DCT coefficient $Y_i$(i=0 to 7) by distributed arithmetic, and to output data $X_j$(j=0 to 7). Here, it is assumed that both $X_j$(j=0 to 7) and $Y_i$(i=0 to 7) are data of 10 bits.

The one-dimensional IDCT circuit includes: an input terminal 101b for inputting a DCT coefficient; registers 118b to 111b connected to input terminal 101b for holding DCT coefficients $Y_0$ to $Y_7$; a bit distributor 119 connected to registers 111b to 118b for outputting bit trains consisting of bits of the same bit positions of $Y_0,Y_2,Y_4$ and $Y_6$ or bit trains consisting of bits at same bit positions of $Y_1,Y_3,Y_5$ and $Y_7$ a multiplication and accumulation block 121 connected to bit distributer 119 and row selection circuit 120 for successively outputting $X_0+X_7$, $X_1+X_6$, $X_2+X_5$ and $X_3+X_4$, and $X_0-X_7$, $X_1-X_6$, $X_2-X_5$ and $X_3-X_4$ in accordance with a row selection signal output from row selection circuit 120; registers 109b to 102b connected to multiplication and accumulation block 121 for successively receiving $X_0+X_7$, $X_1+X_6$, $X_2+X_5$ and $X_3+X_4$, and $X_0-X_7$, $X_1-X_6$, $X_2-X_5$ and $X_3-X_4$ output from multiplication and accumulation block 121, and holding these respectively; and an adder/subtracter 110b connected to registers 102b to 109b for outputting $X_0$ to $X_7$.

The operation of the circuit will be described in the following. 8 data $Y_0$ to $Y_7$ input through input terminal 101b are successively transferred to registers 111b to 118b in the order of input, and held in registers 118b to 111b, respectively. In bit distributer 119 and multiplication and accumulation block 121, matrix operations are performed in the similar manner as one-dimensional DCT. Results of operations $X_0+X_7$, $X_1+X_6$, $X_2+X_5$ and $X_3+X_4$, and $X_0-X_7$, $X_1-X_6$, $X_2-X_5$ and $X_3-X_4$ are successively output from multiplication and accumulation block 121. The results of operations are held in registers 102b to 109b. Adder/subtracter 110b receives values held in registers 102b to 109b, and outputs data $X_0$ to $X_7$.

Figure 13:
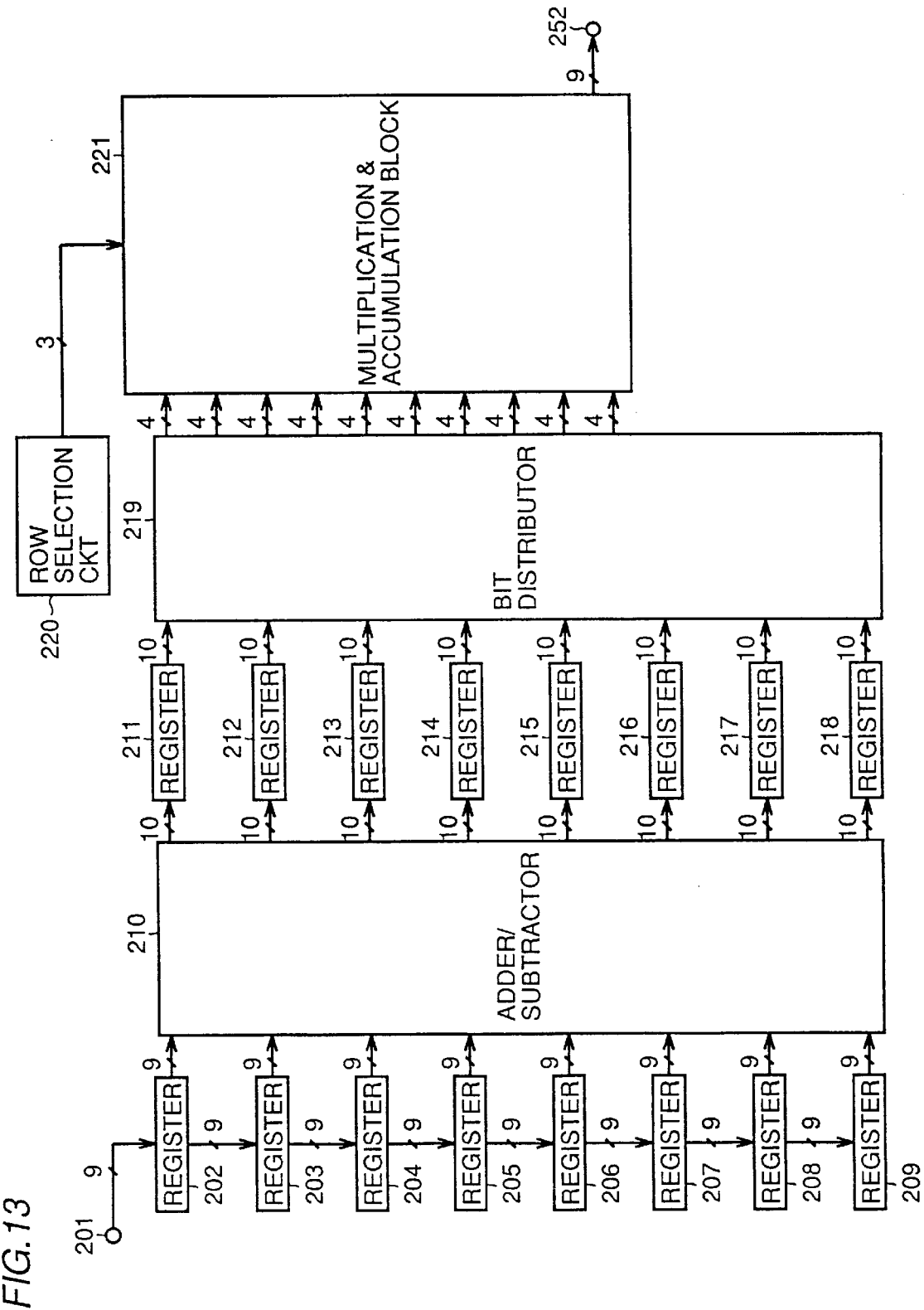
FIG. 13 is a block diagram of one-dimensional DCT circuit in accordance with a second embodiment of the present invention.

Referring to FIG. 13, a one-dimensional DCT circuit (discrete cosine transformer) in accordance with a second embodiment of the present invention is adapted to perform matrix operations represented by (3) and (4) on an input $X_j$(j=0 to 7) by distributed arithmetic, and to output DCT coefficient $Y_i$(i=0 to 7). Here, it is assumed that $X_j$(j=0 to 7) and $Y_i$(i=0 to 7) are both data of 9 bits.

Referring to FIG. 13, the one-dimensional DCT circuit in accordance with the second embodiment includes: an input terminal 201 for inputting input data; registers 209 to 202 connected to input terminal 201 for holding input data $X_0$ to $X_7$, respectively; an adder/subtracter 210 connected to registers 202 to 209 for outputting results of addition $X_0+X_7$, $X_1+X_6$, $X_2+X_5$ and $X_3+X_4$ and results of subtraction $X_0-X_7$, $X_1-X_6$, $X_2-X_5$ and $X_3-X_4$; registers 211 to 218 connected to adders/subtracter 210 for holding the results of addition $X_0+X_7$, $X_1+X_6$, $X_2+X_5$ and $X_3+X_4$ and the results of subtraction $X_0-X_7$, $X_1-X_6$, $X_2-X_5$ and $X_3-X_4$, respectively; a bit distributer 219 connected to registers 211 to 218 for outputting bit trains consisting of bits of the same bit positions of $X_0+X_7$, $X_1+X_6$, $X_2+X_5$ and $X_3+X_4$, or bit trains consisting of bits of the same bit positions of $X_0-X_7$, $X_1-X_6$, $X_2-X_5$ and $X_3-X_4$; and a multiplication and accumulation block 221 connected to bit distributer 219 and a row selection circuit 220 for calculating a value of DCT coefficient in accordance with a row selection signal output from row selection circuit 220 and for outputting the calculated value from an output terminal 251.

Figure 14:
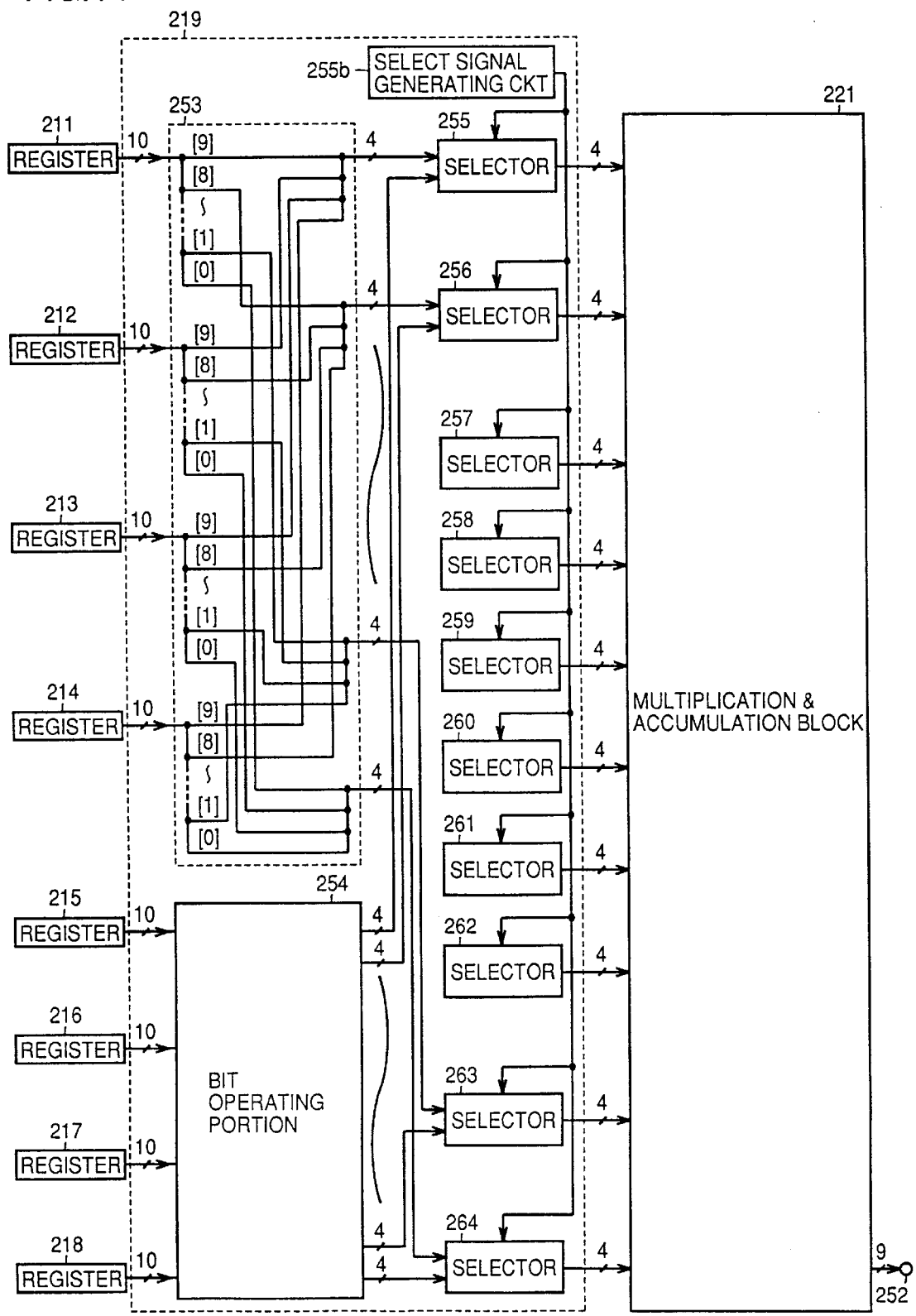
FIG. 14 shows a structure of a bit distributor 219.

Referring to FIG. 14, bit distributer 219 includes: a bit operating portion 253 connected to registers 211 to 214, receiving ten bits of data $X_0+X_7$, $X_1+X_6$, $X_2+X_5$ and $X_3+X_4$, for outputting ten sets of bit trains of the same bit positions; a bit operating portion 254 connected to registers 215 to 218, receiving ten bits of data $X_0-X_7$, $X_1-X_6$, $X_2-X_5$ and $X_3-X_4$, and for outputting ten sets of bit trains of the same bit positions; and selectors 255 to 264 connected to bit operating portions 253 and 254 as well as to a select signal generating circuit 255b, receiving a certain bit train from bit operating portion 253 and a certain bit train of bit operating portion 254 for selecting and outputting either of the bit trains in accordance with a select signal output from select signal generating circuit 255b.

Figure 15:
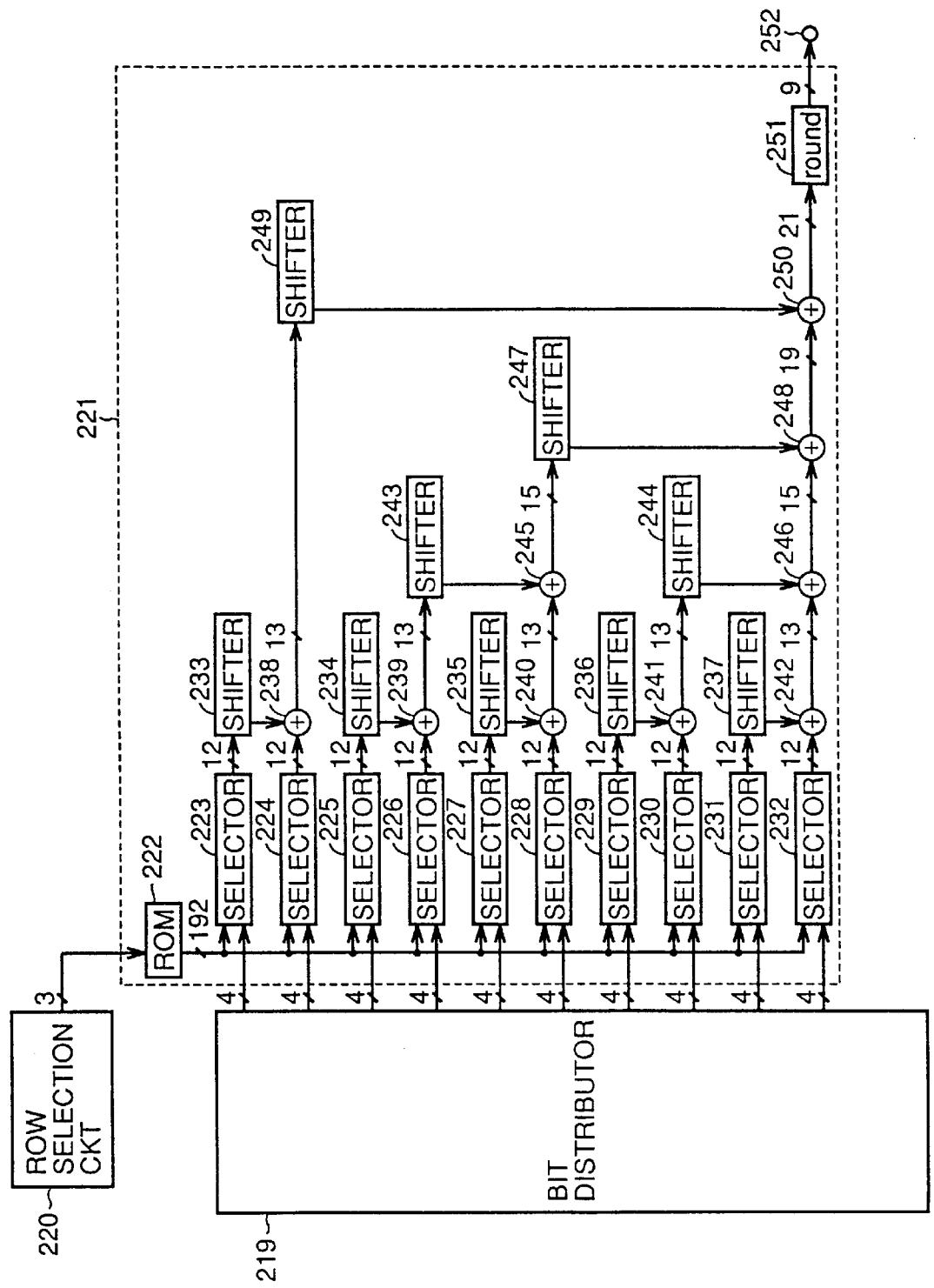
FIG. 15 shows a structure of multiplication and accumulation block 221.

Referring to FIG. 15, multiplication and accumulation block 221 includes: an ROM 222 connected to row selection circuit 220 for outputting a candidate of a partial sum of a DCT coefficient in accordance with the row selection signal output from row selection circuit 220; selectors 223 to 232 connected to ROM 222 and bit distributer 219, responsive to a bit train output from bit distributer 219 for outputting partial sums of DCT coefficient; shifters 233, 234, 235, 236 and 237 connected to selectors 223, 225, 227, 229 and 231, respectively, for shifting by one bit respective output values and for outputting the results; an adder 238 connected to shifter 233 and selector 224 for adding respective output values and for outputting the result; an adder 239 connected to shifter 234 and selector 226 for adding respective output values and for outputting the result; an adder 240 connected to shifter 235 and selector 228 for adding respective output values and for outputting the result; an adder 241 connected to shifter 236 and selector 230 for adding respective output values for outputting the result; an adder 242 connected to shifter 237 and selector 232 for adding respective output values and for outputting the result; shifters 243 and 244 connected to adders 239 and 241 for shifting respective output values by 2 bits and for outputting the results; an adder 245 connected to shifter 243 and adder 240 for adding respective output values and outputting the result; an adder 246 connected to shifter 244 and adder 242 for adding respective output values and for outputting the result; a shifter 247 connected to adder 245 for outputting the output value by shifting 4 bits; an adder 248 connected to shifter 247 and adder 246 for adding respective output values and for outputting the result; a shifter 249 connected to adder 238 for shifting the output by 8 bits; an adder 250 connected to shifter 249 and adder 248 for adding respective output values and for outputting the result; and a rounding circuit 251 connected to adder 250 for rounding the output to 9 bits and providing the rounded output to output terminal 252.

The operation of the circuit will be described in the following. 8 data $X_0$ to $X_7$ input from input terminal 201 are successively transferred to registers 202 to 209 in the order of output, and held in registers 209 to 202, respectively. Outputs $X_0$ to $X_7$ from registers 209 to 202 are added or subtracted in adder/subtracter 210, respectively. Results of addition $X_0+X_7$, $X_1+X_6$, $X_2+X_5$ and $X_3+X_4$ are held in registers 211 to 214, respectively. Results of subtraction $X_0-X_7$, $X_1-X_6$, $X_2-X_5$ and $X_3-X_4$ are held in registers 215 to 218, respectively. Since input $X_j$(j=0 to 7) is data of 9 bits, the results of addition $X_0+X_7$, $X_1+X_6$, $X_2+X_5$ and $X_3+X_4$, and the results of subtraction $X_0-X_7$, $X_1-X_6$, $X_2-X_5$ and $X_3-X_4$ are each data of 10 bits.

Referring to FIG. 14, the operation of bit distributer 219 receiving the outputs $X_0+X_7$, $X_1+X_6$, $X_2+X_5$ and $X_3+X_4$ from registers 211 to 214 and outputs $X_0-X_7$, $X_1-X_6$, $X_2-X_5$ and $X_3-X_4$ from registers 215 to 218 will be described later. In bit distributer 219, outputs from registers 211 to 214, respectively, are distributed to ten signal lines (most significant [9] to least significant [0]) from the most significant to least significant bits by bit operating portion 253, and ten sets of 4 bit signal lines including four signal lines of the same bit positions combined are provided. The 4 bit signal lines of [9] are connected to selector 255, 4 bit signal lines of [8] are connected to selector 256, . . . and 4 bit signal lines of [0] are connected to selector 264. In this manner, the signal lines are connected to selectors 255 to 264, respectively.

Similarly, outputs from registers 215 to 218 are distributed to ten signal lines (most significant [9] to least significant [0]) from the most significant to the least significant bits by bit operating portion 254, and ten sets of four bit signal lines including four signal lines of the same bit positions combined are provided. The 4 bit signal lines of [9] are connected to selector 255, 4 bit signal lines of [8] are connected to selector 256, . . . and 4 bit signal lines of [0] are connected to selector 264. In this manner, these signal lines are connected to selectors 255 to 264, respectively.

In this manner, selectors 255 to 264 receive two 4 bit trains, that is, 4 bit train consisting of bits of the same bit position of $X_0+X_7$, $X_1+X_6$, $X_2+X_5$ and $X_3+X_4$ and 4 bit train consisting of bits of the same bit position of $X_0-X_7$, $X_1-X_6$, $X_2-X_5$ and $X_3-X_4$. When $Y_0$, $Y_2$, $Y_4$ and $Y_6$ are to be calculated, the former 4 bit train is output and when $Y_1$, $Y_3$, $Y_5$ and $Y_7$ are to be calculated, the latter 4 bit train is output to multiplication and accumulation block 221, in response to a select signal output from select signal generating circuit 255b.

In summary, from bit distributer 219, ten sets of 4 bit trains consisting of bits of respective same bit positions of $X_0+X_7$, $X_1+X_6$, $X_2+X_5$ and $X_3+X_4$, which are outputs of registers 211 to 214 are output to multiplication and accumulation block 221 when $Y_0$, $Y_2$, $Y_4$ and $Y_6$ are to be calculated. When $Y_1$, $Y_3$, $Y_5$ and $Y_7$ are to be calculated, ten sets of 4 bit trains consisting of bits of respective same bit positions of $X_0-X_7$, $X_1-X_6$, $X_2-X_5$ and $X_3-X_4$, which are outputs of registers 215 to 218, respectively, are output simultaneously to multiplication and accumulation block 221.

Referring to FIG. 15, multiplication and accumulation block 221 simultaneously receive ten sets of 4 bit trains from bit distributer 219, perform 8 multiplications and accumulations implementing matrix representations (3) and (4) in a prescribed order and successively calculates $Y_0$, $Y_1$, $Y_2$, $Y_3$, $Y_4$, $Y_5$, $Y_6$ and $Y_7$. This operation will be described, taking the operation of the first row of representation (3), that is, operation for calculating $Y_0$, as an example.

ROM 222 provided in multiplication and accumulation block 221 receives a row selection signal of 3 bits from row selection circuit 220. When row selection signal is (000), it outputs 16 sets including 0, $C_4$, $C_4$, $2C_4$, $C_4$, $2C_4$, $2C_4$, $3C_4$, $C_4$, $2C_4$, $2C_4$, $3C_4$, $2C_4$, $3C_4$, $3C_4$ and $4C_4$, as shown in FIGS. 16A and 16B. If selection signal is (001), it outputs 16 sets including 0, $-C_2$, $-C_6$, $-C_2-C_6$, $C_6$, $-C_2+C_6$, 0, $-C_2$, $C_2$, 0, $C_2-C_6$, $-C_6$, $C_2+C_6$, $C_6$, $C_2$ and 0. Similarly, when row selection signal is (111), it outputs 16 sets including 0, $-C_1$, $C_3$, $-C_1+C_3$, $-C_5$, $-C_1-C_5$, $C_3-C_5$, $-C_1+C_3-C_5$, $C_7$, $-C_1+C_7$, $C_3+C_7$, $-C_1+C_3+C_7$, $-C_5+C_7$, $-C_1-C_5+C_7$, $C_3-C_5+C_7$, $-C_1+C_3-C_5+C_7$. In the following, for simplicity of description, 16 sets of outputs will be referred to as first output, second output . . . 16th output, starting from the one described first. For example, when row selection signal is (000), the first output is 0, the second output is $C_4$, and the 16th output is $4C_4$.

Selectors 223 to 232 provided in multiplication and accumulation block 221 receive 16 sets of outputs from ROM 222 and, in addition, a 4 bit train. It is adapted to output the first output of 16 sets of outputs from ROM when the 4 bit train is (0000). When it is (0001), it outputs the second output out of 16 sets of outputs from ROM 222, and similarly, when the 4 bit train is (1111), it outputs the 16th output of the 16 sets of outputs from ROM 222. Therefore, considering representations (3) and (4) as well as the operation of ROM 222 described above, selectors 223 to 232 output partial sum of $Y_0$ when the row selection signal input from row selection circuit 220 to ROM 222 is (000), partial sum of $Y_2$ when it is (001), partial sum of $Y_4$ when it is (110) and partial sum of $Y_6$ when it is (011), respectively, when 4 bit trains consisting of the bits of the same bit positions of $X_0+X_7$, $X_1+X_6$, $X_2+X_5$ and $X_3+X_4$ are input from bit distributer 219. When 4 bit trains consisting of bits of the same bit positions of $X_0-X_7$, $X_1-X_6$, $X_2-X_5$ and $X_3-X_4$ are input from bit distributer, then selectors output partial sum of $Y_1$ when the row selection signal input from row selection circuit 220 to ROM 222 is (100), partial sum of $Y_3$ when it is (101), partial sum of $Y_5$ when it is (110) and partial sum of $Y_7$ when it is (111). Though not shown, in multiplication and accumulation block 221, output polarity of selector 223 is reversed. This corresponds to the fact that the partial sum having the 4 bit train consisting of the most significant bits as its component is negative. The following description is on the premise that selectors 223 to 232 and the ROM 222 are structured as described above.

First, (000) is input as row selection signal from row selection circuit 220 to ROM 222. To the multiplication and accumulation block 221, ten sets of 4 bit trains consisting of bits at respective same bit positions of $X_0+X_7$, $X_1+X_6$, $X_2+X_5$ and $X_3+X_4$ are simultaneously input from bit distributer 219. The 4 bit trains consisting of the most significant bits is input to selector 222, 4 bit train consisting of the bits at bit position 1 is input to selector 224, . . . and the 4 bit train consisting of the least significant bits (bits at bit position 9) is input to selector 232, respectively. Consequently, partial sum of $Y_0$ having the 4 bit train consisting of the most significant bits as its component is output from selector 223, partial sum of $Y_0$ having the 4 bit train consisting of bits at bit position 1 as its component is output from selector 224, . . . and partial sum of $Y_0$ having the 4 bit train consisting of the least significant bits as its component is output from selector 232.

Thereafter, outputs from selectors 223, 225, 227, 229 and 231 are shifted by 1 bit upward by shifters 233, 234, 235, 236 and 237, and added to output from selectors 224, 226, 228, 230, 232 in adders 238, 239, 240, 241 and 242, respectively. Therefore, output from adders 238, 239, 240, 241, and 242 are a result of addition of partial sum (shifted by 1 bit upward) of $Y_0$ having the 4 bit train consisting of the most significant bits as its component and partial sum of $Y_0$ having the 4 bit train consisting of bits at bit position 1 as its component; partial sum (shifted by 1 bit upward) of $Y_0$ having the 4 bit train consisting of bits at bit position 2 as its component and partial sum of $Y_0$ having the 4 bit train consisting of bits at bit position 3 as its component; . . . , and partial sum (shifted by 1 bit upward) of $Y_0$ having the 4 bit train consisting of bits at bit position 8 as its component and partial sum of $Y_0$ having the 4 bit train consisting of the least significant bits as its component, respectively.

The output from adders 239 to 241 are shifted by 2 bits upward by shifters 243 and 244, respectively, and added to the outputs from adders 240 and 242 in adders 245 and 246. Therefore, the output from adder 245 is the result of addition of partial sum (shifted by 3 bits upward) having the 4 bit train consisting of bits at bit position 2 as its component, partial sum (shifted by 2 bits upward) of $Y_0$ having the 4 bit trains consisting of the bits at bit position 3 as its component, partial sum (shifted by 1 bit upward) of $Y_0$ having the 4 bit train consisting of bits at bit position 4 as its component, and partial sum of $Y_0$ having the 4 bit train consisting of the bits at bit position 5 as its component. The output from adder 246 is the result of addition of partial sum (shifted by 3 bits upward) of $Y_0$ having the 4 bit train consisting of bits at bit position 6 as its component, partial sum (shifted by 2 bits upward) of $Y_0$ having the 4 bit train consisting of bits at bit position 7 at its component, partial sum (shifted by 1 bit upward) of $Y_0$ having the 4 bit train consisting of bits at bit position 8 as its component, and partial sum of $Y_0$ having the 4 bit trains consisting of the least significant bits as its component.

The output from adder 245 is shifted by 4 bits upward by shifter 247 and added to the output of adder 246 in adder 248. Therefore, the output from adder 248 is the result of addition of partial sum (shifted by 7 bits upward) of $Y_0$ having the 4 bit train consisting of bits at bit position 2 as its component, partial sum (shifted by 6 bits upward) having the 4 bit train consisting of bits at bit position 3 as its component, partial sum (shifted by 5 bits upward) of $Y_0$ having the 4 bit train consisting of bits at bit position 4, partial sum (shifted by 4 bits upward) of $Y_0$ having the 4 bit train consisting of bits at bit position 5 as its component, partial sum (shifted by 3 bits upward) of $Y_0$ having the 4 bit train consisting of bits at bit position 6 as its component, partial sum (shifted by 2 bits upward) of $Y_0$ having the 4 bit train consisting of bits at bit position 7 as its component, partial sum (shifted by 1 bit upward) of $Y_0$ having the 4 bit train consisting of bits at bit position 8 as its component, and partial sum of $Y_0$ having the 4 bit train consisting of the least significant bits as its component.

The output from adder 238 is shifted by 8 bits upward by shifter 249, and added to the output of adder 248 in adder 250. Therefore, the output from adder 250 is the result of addition of partial sum (shifted by 9 bits upward) of $Y_0$ having the 4 bit train consisting of the most significant bits as its component, partial sum (shifted by 8 bits upward) of $Y_0$ having the 4 bit train consisting of bits at bit position 1 as its component, partial sum (shifted by 7 bits upward) of $Y_0$ having the 4 bit train consisting of bits at bit position 2 as its component, partial sum (shifted by 6 bits upward) of $Y_0$ having the 4 bit train consisting of bits at bit position 3 as its component, partial sum (shifted by 5 bits upward) of $Y_0$ having the 4 bit train consisting of bits at bit position 4 as its component, partial sum (shifted by 4 bits upward) of $Y_0$ having the 4 bit train consisting of bits at bit position 5 as its component, partial sum (shifted by 3 bits upward) of $Y_0$ having the 4 bit train consisting of bits at bit position 6 as its component, partial sum (shifted by 2 bits upward) of $Y_0$ having the 4 bit train consisting of bits at bit position 7 as its component, partial sum (shifted by 1 bit upward) of $Y_0$ having the 4 bit train consisting of bits at bit position 8 as its component, and partial sum of $Y_0$ having the 4 bit train consisting of the least significant bits as its component.

The output from adder 250 is rounded to 9 bits at rounding circuit 251, and output from multiplication and accumulation block 221 to output terminal 252.

By the above described operation, ten partial sums (all partial sums) having ten sets of 4 bit trains consisting of bits of respective same bit positions as components of $X_0+X_7$, $X_1+X_6$, $X_2+X_5$ and $X_3+X_4$ are simultaneously generated, and shifted and added as shown in expression (13) in accordance with the bit positions, and thus $Y_0$ is calculated.

In multiplication and accumulation block 221, ten sets of 4 bit trains from the 4 bit train consisting of the most significant bits to the 4 bit train consisting of the least significant bits of $X_0+X_7$, $X_1+X_6$, $X_2+X_5$ and $X_3+X_4$ are input to selectors 223 to 232 from bit distributer 219. When the row selection signal input from row selection circuit 220 to ROM 222 is (001), (010) or (011), then $Y_2$, $Y_4$ or $Y_6$ is calculated.

In multiplication and accumulation block 221, ten sets of 4 bit trains from the 4 bit train consisting of the most significant bits to the 4 bit train consisting of the least significant bits of $X_0-X_7$, $X_1-X_6$, $X_2-X_5$ and $X_3-X_4$ are input to selectors 223 to 232 from bit distributer 219. When the row selection signal input from row selection circuit 220 to ROM 222 is (100), (101), (110) or (111), then $Y_1$, $Y_3$, $Y_5$ or $Y_7$ is calculated.

Which of (000), (001), . . . (111) is to be output as the 3 bit selection signal from row selection circuit 220 is appropriately selected. Whether ten sets of 4 bit trains consisting of the bits of respective same bit positions of $X_0+X_7$, $X_1+X_6$, $X_2+X_5$ and $X_3+X_4$, which are output of registers 211 to 214, respectively, or those consisting of the bits of the same bit positions of $X_0-X_7$, $X_1-X_6$, $X_2-X_5$ and $X_3-X_4$, which are outputs of registers 215 to 218, respectively, are to be simultaneously output is appropriately selected. $Y_0$ to $Y_7$ are calculated in a prescribed order, and one-dimensional DCT is completed.

In the one-dimensional DCT circuit, $X_j$ ($j=0$ to 7) are input successively in 8 steps from input terminal 201, and $Y_0$ to $Y_7$ are calculated in multiplication and accumulation block 221 in 8 steps, which is the same in number as the number of $Y_0$ to $Y_7$. In other words, the time for input is the same as the time for calculation. Therefore, the DCT circuit is capable of real time operation. Therefore, even when input is continuously provided to the DCT circuit from input terminal 201, calculation can be done in time, and therefore continuous input through input terminal 201 is possible. Thus image compression can be done efficiently.

Further, 8 multiplications and accumulations implementing matrix representations (3) and (4) are performed not in parallel as in the prior art but performed one by one in time-divisional manner. Further, ten partial sums having ten sets of 4 bit trains consisting of bits of respective same bit positions of four data, which are the object of one multiplication and accumulation, as components, that is, all the partial sums related to one multiplication and accumulation operation are generated simultaneously by selectors 223 to 232. Therefore, in the multiplication and accumulation block 221, multiplication and accumulation can be done by nine adders without a register. Further, addition of partial sums is not fed back but fed forward. Therefore, when each coefficient of representations (3) and (4) has ten bits, output from selectors 223 to 232 have 12 bits, adder 250 has 21 bits, adder 248 has 19 bits, adders 245 and 246 have 15 bits and adders 238 to 242 have 13 bits. Namely, the nearer the adder is to the input side, the smaller the output bit width and signal change can be reduced.

As compared with the first embodiment, when each coefficient of the matrixes (3) and (4) has 10 bits, the bit number of one set of outputs is 12 and therefore the output bit width of ROM 222 is 12×16=192, and therefore the signal change is increased by that amount. However, the number of ROMs is only one, that is, one tenth of the first embodiment.

It is possible to provide a one-dimensional IDCT circuit using multiplication and accumulation block 221 instead of the multiplication and accumulation block 121 of the one-dimensional IDCT circuit described with reference to FIG. 12. The process is similar to that described in the first embodiment, and therefore description is not repeated.

Now, multiplication and accumulation has been done based on distributed arithmetic in which partial sums having, as components, bit trains consisting of bits of same bit positions of a plurality of input data are generated for every bit position and these are added. As an alternative, it is possible to perform multiplication and accumulation by generating partial sums having, as components, bit trains consisting of bits of continuous bit positions of input data for every input data, and by adding these partial sums.

This method will be described in the following.

First, let us consider multiplication and accumulation operation of variable $X_j$ ($j=0$ to $M-1$) and fixed coefficient $C_j$ ($j=0$ to $M-1$) of the following expression (14).

$$Y = \sum_{j=0}^{M-1} C_j \cdot X_j \tag{14}$$

When $X_j$ is represented by 2's complement of N bits, $X_j$ will be given by the expression (15).

$$X_j = -X_j(0) + \sum_{k=1}^{N-1} X_j(k) \cdot 2^{-k} \ (j = 0 \text{ to } M-1) \tag{15}$$

where $X_j(k)$ represents a bit at bit position k (kth from the most significant bit) of $X_j$, which is 0 or 1.

When N is 10, specifically, $X_j$ is given by the following equation (16).

$$\begin{aligned}X_j =\ & -X_j(0) + \\ & \{X_j(1) \cdot 2^2 + X_j(2) \cdot 2 + X_j(3)\} \cdot 2^{-3} + \\ & \{X_j(4) \cdot 2^2 + X_j(5) \cdot 2 + X_j(6)\} \cdot 2^{-6} + \\ & \{X_j(7) \cdot 2^2 + X_j(8) \cdot 2 + X_j(9)\} \cdot 2^{-9} \\ & (j = 0 \text{ to } M-1)\end{aligned} \tag{16}$$

When $P_{ji}$ is defined by the following expression (17), then the expression (16) can be changed to the expression (18).

$$P_{j0} = -X_j(0) \ (j = 0 \text{ to } M-1) \tag{17}$$

$$P_{j1} = X_j(1) \cdot 2^2 + X_j(2) \cdot 2 + X_j(3) \ (j = 0 \text{ to } M-1)$$

$$P_{j2} = X_j(4) \cdot 2^2 + X_j(5) \cdot 2 + X_j(6) \ (j = 0 \text{ to } M-1)$$

$$P_{j3} = X_j(7) \cdot 2^2 + X_j(8) \cdot 2 + X_j(9) \ (j = 0 \text{ to } M-1)$$

$$X_j = P_{j0} + P_{j1} \cdot 2^{-3} + P_{j2} \cdot 2^{-6} + P_{j3} \cdot 2^{-9} \ (j = 0 \sim M-1) \tag{18}$$

From equation (18), the expression (14) can be modified to the expression (19).

$$Y = \sum_{j=0}^{M-1} C_j \cdot P_{j0} + \left( \sum_{j=0}^{M-1} C_j \cdot P_{j1} \right) \cdot 2^{-3} + \qquad (19)$$
$$\left( \sum_{j=0}^{M-1} C_j \cdot P_{j2} \right) \cdot 2^{-6} + \left( \sum_{j=0}^{M-1} C_j \cdot P_{j3} \right) \cdot 2^{-9}$$

When partial sum $Q_{ji}$ is defined by the following expression (20), the expression (19) is given by the expression (21).

$$Q_{ji} = C_j \cdot P_{ji} (j=0 \text{ to } M-1, i=0 \text{ to } 3) \qquad (20)$$

$$Y = \sum_{j=0}^{M-1} Q_{j0} + \left( \sum_{j=0}^{M-1} Q_{j1} \right) \cdot 2^{-3} + \qquad (21)$$
$$\left( \sum_{j=0}^{M-1} Q_{j2} \right) \cdot 2^{-6} + \left( \sum_{j=0}^{M-1} Q_{j3} \right) \cdot 2^{-9}$$

As described above, the result Y of multiplication and accumulation of variable $X_j$(j=0 to M−1) and fixed coefficient $C_j$(j=0 to M−1) is given by the expression (21). Note the partial sum $Q_{ji}$(j=0 to M−1, i=0 to 3) defined by expression (20). Components are $C_j$(j=0 to M−1) and $P_{ji}$(j=0 to M−1, i=0 to 3). $C_j$ is a fixed coefficient, and component of $P_{ji}$ is $2^n$(n=0 to 2) and 1 bit train $X_j(0)$ when i=0, 3 bit train ($X_j(1)$ $X_j(2)$ $X_j(3)$) when i=1, 3 bit train ($X_j=(4)$, $X_j(5)$ $X_j(6)$) when i=2, and 3 bit train ($X_j(7)$ $X_j(8)$ $X_j(9)$) when i=3, and therefore partial sum $Q_{ji}$ is a function of these bit trains. Therefore, values which the partial sum $Q_{ji}$ can assume are stored in advance in the memory and by accessing the memory (inputting) using the 1 bit train $X_j(0)$ or 3 bit train ($X_j(1)$ $X_j(2)$ $X_j(3)$, or 3 bit train ($X_j(4)$ $X_j(5)$ $X_j(6)$) or 3 bit train ($X_j(7)$ $X_j(8)$ $X_j(9)$), it is possible to read (output) the partial sum $Q_{ji}$ having the bit trains as its component. When the partial sum $Q_{ji}$ read from the memory is shifted and added as represented by the expression (21) in accordance with the bit position of the bits constituting the bit trains as its component, multiplication and accumulation is possible.

Figure 17:
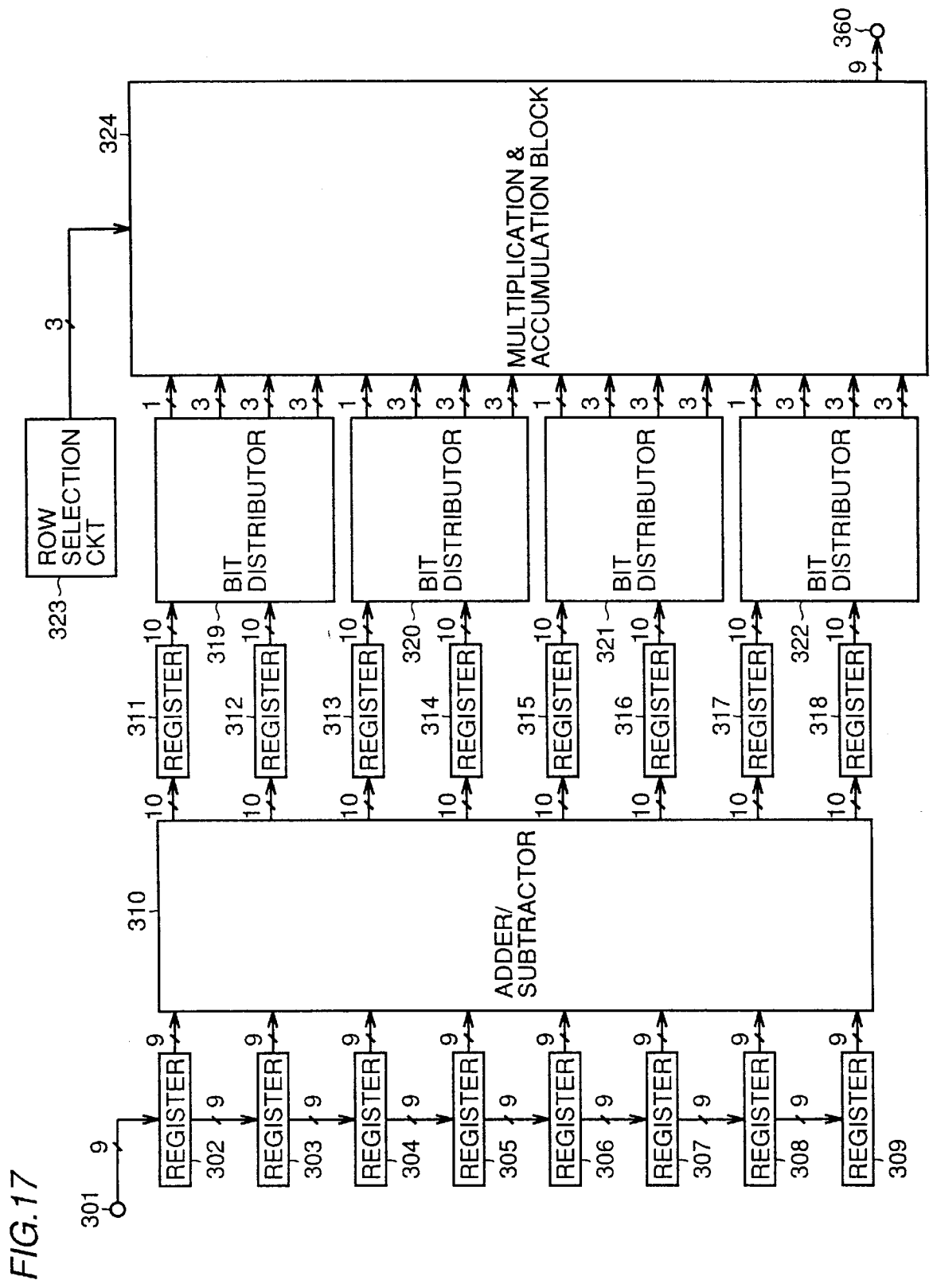
FIG. 17 is a block diagram of one-dimensional DCT circuit in accordance with a third embodiment of the present invention.

Referring to FIG. 17, a one-dimensional DCT circuit (discrete cosine transformer) in accordance with the third embodiment of the present invention employing such method of operation is adapted to perform 8 multiplications and accumulations implementing matrix representations of (3) and (4) on input $X_j$(j=0 to 7) by the above described arithmetic method and to output DCT coefficient $Y_i$(i=0 to 7). Here, it is assumed that $X_j$(j=0 to 7) and $Y_i$(i=0 to 7) are both data of 9 bits.

The one-dimensional DCT circuit in accordance with the third embodiment includes: an input terminal 301 for inputting input data; registers 309 to 302 connected to input terminal 301 for holding input data $X_0$ to $X_7$, respectively; an adder/subtracter 310 connected to registers 302 to 309 for outputting results of addition $X_0+X_7$, $X_1+X_6$, $X_2+X_5$ and $X_3+X_4$ and results of subtraction $X_0-X_7$, $X_1-X_6$, $X_2-X_5$ and $X_3-X_4$; registers 311, 313, 315, 317, 312, 314, 316 and 318 connected to adder/subtracter 310 for holding results of addition $X_0+X_7$, $X_1+X_6$, $X_2+X_5$ and $X_3+X_4$ and results of subtraction $X_0-X_7$, $X_1-X_6$, $X_2-X_5$ and $X_3-X_4$ respectively; bit distributer 319 connected to registers 311 and 312 for distributing respective outputs to four sets of 1 bit train, 3 bit train, 3 bit train and 3 bit train from the most significant ones for providing four sets of outputs for one output; a bit distributer 320 connected to registers 313 and 314 for distributing respective outputs to four sets of 1 bit train, 3 bit train, 3 bit train and 3 bit train from the most significant ones for providing four sets of outputs for one output; a bit distributor 321 connected to registers 315 and 316 for distributing respective output to four sets of 1 bit train, 3 bit train, 3 bit trains and 3 bit trains for outputting four sets for one output; a bit distributor 322 connected to registers 317 and 318 for distributing respective outputs to four sets of 1 bit train, 3 bit train, 3 bit train and 3 bit train for outputting four sets for one output; and a multiplication and accumulation block 324 connected to bit distributors 319 to 322 and row selection circuit 323 for calculating a value of DCT coefficient in accordance with a row selection signal output from row selection circuit 323 and for outputting the calculated value from output terminal 360.

Figure 18:
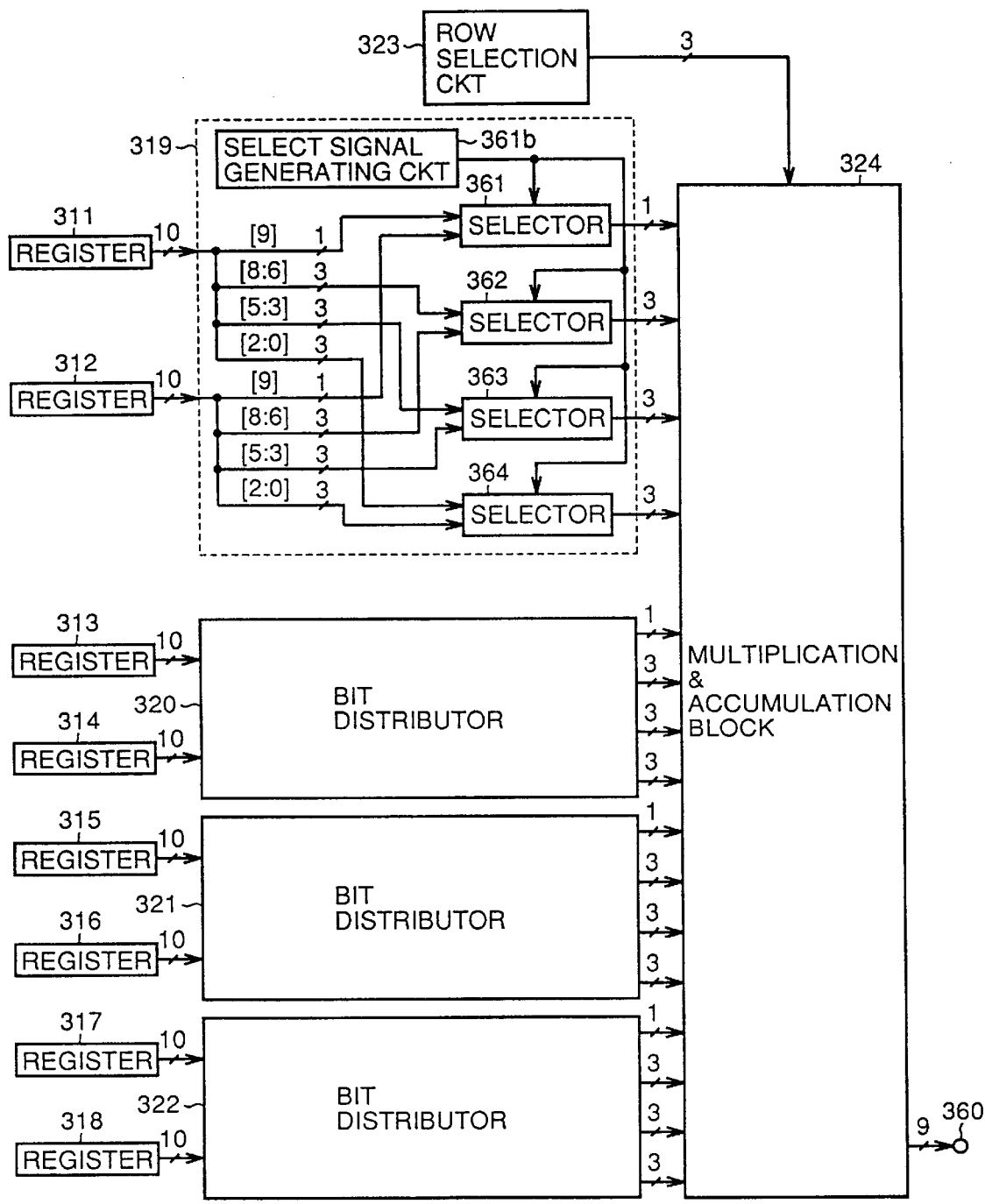
FIG. 18 shows structures of bit distributors 319 to 322.

Referring to FIG. 18, bit distributor 319 includes: a selector 361 connected to registers 311 and 312 for selecting and outputting one of the values at the most significant bit (0 bit) position of 10 bits of data $X_0+X_7$ and $X_0-X_7$ in accordance with a select signal output from select signal generating circuit 361b; a selector 362 for selecting and outputting one of bit trains of bit positions 1 to 3 of 10 bits of data $X_0+X_7$ and $X_0-X_7$ in accordance with the select signal output from select signal generating circuit 361b; a selector 363 for selecting and outputting one of bit trains of bit positions 4 to 6 of 10 bit data $X_0+X_7$ and $X_0-X_7$ in accordance with the select signal output from select signal generating circuit 361b; and a selector 364 for selecting and outputting one of bit trains of bit positions 7 to 9 of 10 bit data $X_0+X_7$ and $X_0-X_7$ in accordance with the select signal output from select signal generating circuit 361b.

Figure 19:
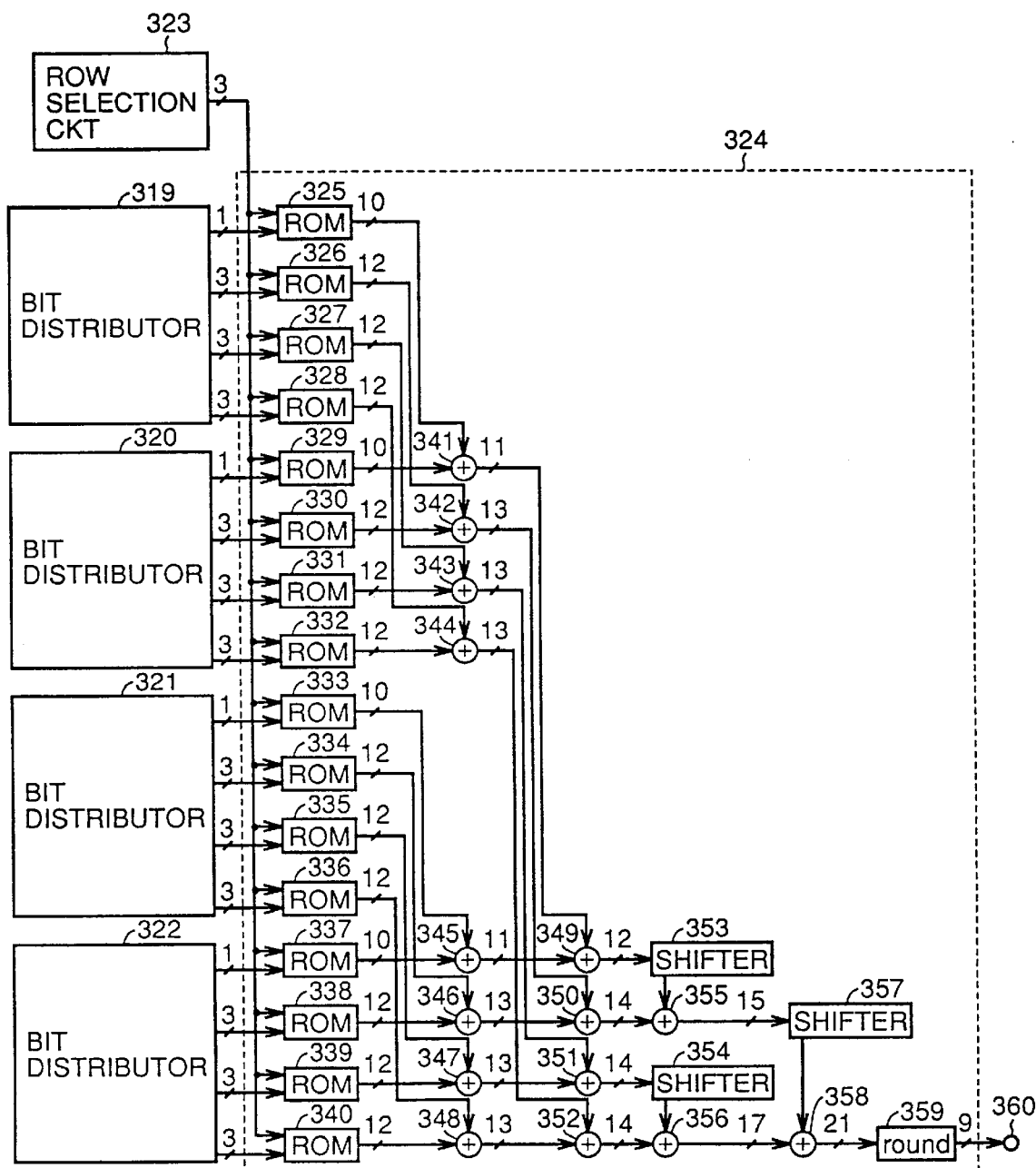
FIG. 19 shows a structure of multiplication and accumulation block 324.

Referring to FIG. 19, multiplication and accumulation block 324 includes: ROMs 325 to 328 connected to outputs of 1 bit train, 3 bit train, 3 bit train and 3 bit train of bit distributor 319, respectively, and each connected to row selection circuit 323 for outputting partial sums of DCT coefficient in accordance with the row selection signal output from row selection circuit 323; ROMs 329 to 332 connected to outputs of 1 bit train, 3 bit train, 3 bit train and 3 bit train of bit distributor 320 and each connected to row selection circuit 323 for outputting partial sums of DCT coefficient in accordance with the row selection signal output from row selection circuit 323; ROMs 333 to 336 connected to outputs of 1 bit train, 3 bit train, 3 bit train and 3 bit train of bit distributor 321, respectively and each connected to row selection circuit 323 for outputting partial sums of DCT coefficient in accordance with the row selection signal output from row selection circuit 323; ROMs 337 to 340 connected to outputs of 1 bit train, 3 bit train, 3 bit train and 3 bit train of bit distributor 322, respectively, and each connected to row selection circuit 323 for outputting partial sums of DCT coefficient in accordance with the row selection signal output from row selection circuit 323; an adder 341 connected to ROMs 325 and 329 for adding respective outputs and for outputting the result; an adder 342 connected to ROMs 326 and 330 for adding respective outputs and for outputting the result; an adder 343 connected to ROMs 327 and 331 for adding respective outputs and for outputting the result; an adder 344 connected to ROMs 328 and 332 for adding respective outputs and for outputting the result; an adder 345 connected to ROMs 333 and 337 for adding respective outputs and for outputting the result; an adder 346 connected to ROMs 334 and 338 for adding respective outputs and for outputting the result; an adder 347 connected to ROMs 335 and 339 for adding respective outputs and for outputting the result; an adder 348 connected to ROMs 336 and 340 for adding respective outputs and for outputting the result; an adder 349 connected to adders 341 and 345 for adding respective outputs and for outputting the result; an adder 350 connected to adders 342 and 346 for adding respective outputs and for outputting the result; an adder 351 connected to adders 343 and 347 for adding respective outputs and for outputting the result; an adder 352 connected to adders 344 and 348 for adding respective outputs and for outputting the result; shifters 353 and 354 connected to adders 349 and 351 respectively, for shifting respective outputs by 3 bits; an adder 355 connected to shifter 353 and adder 350 for adding respective outputs and for outputting the result; an adder 356 connected to shifter 354 and adder 352 for adding respective outputs and for outputting the result; a shifter 357 connected to adder 355 for shifting its output by 6 bits; an adder 358 connected to shifter 357 and adder 356 for adding respective outputs and for outputting the result; and a rounding circuit 359 connected to adder 358 for rounding its outputs to 9 bits and for outputting the rounded output to output terminal 360.

The operation of the circuit will be described in the following. 8 data $X_0$ to $X_7$ input from input terminal 301 are successively transferred to registers 302 to 309 in the order of input, and held in registers 309 to 302, respectively. Outputs $X_0$ to $X_7$ of registers 309 to 302 are added or subtracted in adder/subtractor 310. Results of addition $X_0+X_7$, $X_1+X_6$, $X_2+X_5$ and $X_3+X_4$ are held in registers 311, 313, 315 and 317, respectively. The results of subtraction $X_0-X_7$, $X_1-X_6$, $X_2-X_5$ and $X_3-X_4$ are held in registers 312, 314, 316 and 318, respectively. Since input $X_j$(j=0 to 7) is data of 9 bits, the results of addition $X_0+X_7$, $X_1+X_6$, $X_2+X_5$ and $X_3+X_4$ and the results of subtraction $X_0-X_7$, $X_1-X_6$, $X_2-X_5$ and $X_3-X_4$ are each data of 10 bits.

Operations of bit distributor 319 receiving outputs $X_0+X_7$ and $X_0-X_7$ of registers 311 and 312, respectively, bit distributor 320 receiving outputs $X_1+X_6$ and $X_1-X_6$ of registers 313 and 314, respectively, bit distributor 321 receiving outputs $X_2+X_5$ and $X_2-X_5$ of registers 315 and 316, respectively, and bit distributor 322 receiving outputs $X_3+X_4$ and $X_3-X_4$ of registers 317 and 318, respectively, will be described with reference to FIG. 18.

In bit distributor 319, outputs of registers 311 and 312 are distributed to four sets of signal lines including the signal line [9] of the most significant bit; three signal lines [8:6] corresponding to the bits at bit positions 1, 2 and 3; three signal lines [5:3] corresponding to bits of bit positions 4, 5 and 6; and three signal lines [2:0] corresponding to the bits of bit positions 7 and 8 and the least significant bit (bits of bit position 9). Signal line [9] is connected to selector 361, signal lines [8:6] are connected to selector 362, signal lines [5:3] are connected to selector 363 and signal lines [2:0] are connected to selector 364, respectively.

In this manner, selectors 361b to 364 receive two sets of signal lines, that is, signal lines from register 311 and signal lines from register 312. Each selector is adapted to output signals on the signal lines from register 311 to multiplication and accumulation block 324 when $Y_0$, $Y_2$, $Y_4$ and $Y_6$ are to be calculated, and to output signals on signal lines from register 312 to multiplication and accumulation block 324 when $Y_1$, $Y_3$, $Y_5$ and $Y_7$ are to be calculated, in response to the select signal output from select signal generating circuit 361b.

In bit distributors 320, 321 and 322 also, similar operations are performed based on the outputs from registers 313 and 314, registers 315 and 316 and registers 317 and 318. Each bit distributor is adapted to output signals on signal lines from register 312 to respectively to multiplication and accumulation block 324 when $Y_0$, $Y_2$, $Y_4$ and $Y_6$ are to be calculated, and to output signals on signal lines from registers 314, 316 and 318, respectively, to multiplication and accumulation block 324 when $Y_1$, $Y_3$, $Y_5$ and $Y_7$ are to be calculated, in response to the select signal output from select signal generating circuit 361b.

In summary, when $Y_0$, $Y_2$, $Y_4$ and $Y_6$ are to be calculated, one bit train consisting of the most significant bits, 3 bit train consisting of bits at bit positions 1, 2 and 3, 3 bit train consisting of bits at bit positions 4, 5 and 6 as well as 3 bit train consisting of bits at bit positions 7, 8 and 9 of $X_0+X_7$ which is the output of register 311, $X_1+X_6$ which is the output of register 313, $X_2+X_5$ which is the output of register 315 and of $X_3+X_4$ which is the output of register 317, are simultaneously output from bit distributors 319, 320, 321 and 322, respectively, to multiplication and accumulation block 324. When $Y_1$, $Y_3$, $Y_5$ and $Y_7$ are to be calculated, 1 bit train consisting of the most significant bits, 3 bit train consisting of bits at bit positions 1, 2 and 3, 3 bit train consisting of bits at bit positions 4, 5 and 6, as well as 3 bit train consisting of bits at bit positions 7, 8 and 9 of $X_0-X_7$, which is the output of register 312, $X_1-X_6$ which is the output of register 314, $X_2-X_5$ which is the output of register 316 and of $X_3-X_4$ which is the output of register 318 are simultaneously output from bit distributors respectively to multiplication and accumulation block 324.

Referring to FIG. 19, multiplication and accumulation block 324 simultaneously receives one set of 1 bit trains and three sets of 3 bit trains which are outputs from each of bit distributors 319, 320, 321 and 322, at the same time, that is, simultaneously receive 16 sets of bit trains (four sets of 1 bit trains and 12 sets of 3 bit trains), perform 8 multiplication and accumulation operations implementing matrix representations (3) and (4) in a prescribed order and successively calculates $Y_0$, $Y_1$, $Y_2$, $Y_3$, $Y_4$, $Y_5$, $Y_6$ and $Y_7$. The operation will be described taking calculation of the first row of representation (3), that is, calculation of $Y_0$, as an example.

ROMs 325, 329, 333 and 337 provided in multiplication and accumulation block 324 receive the row selection signal of 3 bits from row selection circuit 323 and, separate from the row selection signal, a 1 bit train. Referring to FIGS. 20A, 20C, 21A and 21C, ROMs are adapted to output 0 when 1 bit train is (0) and $-C_4$ when the train is (1), when the row selection signal is (000). When row selection signal is (001), these output 0 when 1 bit train is (0) and output $-C_2$, $-C_6$, $C_6$, $C_2$ when the train is (1). When row selection signal is (111) and one bit train is (0), ROMs output 0, respectively, and when the train is (1), these output $-C_7$, $C_5$, $-C_3$ and $C_1$, respectively.

Accordingly, considering expressions (3) and (4), ROMs 325, 329, 333 and 337 output partial sum of $Y_0$ when row selection signal is (000), partial sum of $Y_2$ when the selection signal is (001), partial sum of $Y_4$ when the selection signal is (010), and partial sum of $Y_6$ when the selection signal is (011), provided that the input 1 bit trains are ones consisting of the most significant bits of $X_0+X_7$, $X_1+X_6$, $X_2+X_5$ and of $X_3+X_4$, respectively. When the input 1 bit trains consist of most significant bits of $X_0-X_7$, $X_1-X_6$, $X_2-X_5$ and of $X_3-X_4$, then the ROMs output partial sum of $Y_1$ when the row selection signal is (100), partial sum of $Y_3$ when the signal is (101), partial sum of $Y_5$ when the signal is (110) and partial sum of $Y_7$ when the signal is (111), respectively.

ROMs 326 to 328, 330 to 332, 334 to 336 and 338 to 340 provided in multiplication and accumulation block 324 receive the row selection signal of 3 bits from row selection circuit 120 and, separate from the row selection signal, a 3 bit train. Referring to FIGS. 20B, 20D, 21B and 21D, when row selection signal is (000), ROMs output 0 when the 3 bit train is (000), output $C_4$ when the 3 bit train is (001), . . . , and $7C_4$ when the 3 bit train is (111), respectively. When the row selection signal is (001), the ROMs output 0 when the 3 bit train is (000), respectively output $C_2$ $C_6$, $-C_6$ and $-C_2$, when the 3 bit train is (001), respectively, . . . , and output $7C_2$, $7C_6$, $-7C_6$ and $-7C_2$ when the 3 bit train is (111), respectively. Similarly, when row selection signal is (111), the ROMs output 0, when the 3 bit train is (000), respectively output $C_7$, $-C_5$, $C_3$ and $-C_1$ when the 3 bit train is (001), respectively, . . . , and output $7C_7$, $-7C_5$, $7C_3$ and $-7C_1$ when the 3 bit train is (111), respectively.

Accordingly, considering representations (3) and (4), ROMs 326 to 328, 330 to 332, 334 to 336 and 338 to 340 output partial sum of $Y_0$ when row selection signal is (000), partial sum of $Y_2$ when the row selection signal is (001), partial sum of $Y_4$ when the row selection signal is (010), and partial sum of $Y_6$ when the row selection signal is (011), when the input 3 bit trains are 3 bit train consisting of bits at bit positions 1, 2 and 3, 3 bit train consisting of bits at bit positions 4, 5 and 6 and 3 bit train consisting of bits at bit positions 7, 8 and 9 of $X_0+X_7$, 3 bit train consisting of bits at bit positions 1, 2 and 3, 3 bit train consisting of bits at bit positions 4, 5 and 6 and 3 bit train consisting of bits at bit positions 7, 8 and 9 of $X_1+X_6$, and 3 bit train consisting of bits at bit positions 1, 2 and 3, 3 bit train consisting of bits at bit positions 4, 5 and 6 and 3 bit train consisting of bits at bit positions 7, 8 and 9 of $X_2+X_5$, and 3 bit train consisting of bits at bit positions 1, 2 and 3, 3 bit train consisting of bits at bit positions 4, 5 and 6 and 3 bit train consisting of bits at bit positions 7, 8 and 9 of $X_3+X_4$, respectively. The ROMs output partial sum of $Y_1$ when the row selection signal is (100), partial sum of $Y_3$ when the row selection signal is (101), partial sum of $Y_5$ when the row selection signal is (110) and partial sum of $Y_7$ when the row selection signal is (111), when the input 3 bit trains are 3 bit trains consisting of bits at bit positions 1, 2 and 3, bits at bit positions 4, 5 and 6 and bits at bit positions 7, 8 and 9 of $X_0-X_7$, 3 bit trains consisting of bits at bit positions 1, 2 and 3, bits of bit positions 4, 5 and 6 and bits at bit positions 7, 8 and 9 of $X_1-X_6$, 3 bit trains consisting of bits at bit positions 1, 2 and 3, bits at bit positions 4, 5 and 6 and bits at bit positions 7, 8 and 9 of $X_2-X_5$, and 3 bit trains consisting of bits at bit positions 1, 2 and 3, bits of bit positions 4, 5 and 6 and bits at bit positions 7, 8 and 9 of $X_3-X_4$, respectively.

The following description is on the premise that ROMs 326 to 328, 330 to 332, 334 to 336, 338 to 340 and ROMs 325, 329, 333 and 337 are structured as described above.

First, (000) is input as the row selection signal from row selection circuit 323 to ROMs 325 to 340. 1 bit train consisting of the most significant bits, 3 bit train consisting of bits at bit positions 1, 2 and 3, 3 bit train consisting of bits at bit positions 4, 5 and 6 and 3 bit train consisting of bits at bit positions 7, 8 and 9 of $X_0+X_7$ are input from bit distributor 319 to ROMs 325, 326, 327 and 328, respectively. 1 bit train consisting of the most significant bits, 3 bit train consisting of bits at bit positions 1, 2 and 3, 3 bit train consisting of bits at bit positions 4, 5 and 6 and 3 bit train consisting of bits at bit positions 7, 8 and 9 of $X_1+X_6$ are input from bit distributor 320 to ROMs 329, 330, 331 and 332, respectively. 1 bit train consisting of the most significant bits, 3 bit train consisting of bits at bit positions 1, 2 and 3, 3 bit train consisting of bits at bit positions 4, 5 and 6 and 3 bit train consisting of bits at bit positions 7, 8 and 9 of $X_2+X_5$ are input from bit distributor 321 to ROMs 333, 334, 335 and 336, respectively. 1 bit train consisting of the most significant bits, 3 bit train consisting of bits at bit positions 1, 2 and 3, 3 bit train consisting of bits at bit positions 4, 5 and 6 and 3 bit train consisting of bits at bit positions 7, 8 and 9 of $X_3+X_4$ are input from bit distributor 322 to ROMs 337, 338, 339 and 340, respectively. Consequently, partial sums of $Y_0$ having 1 bit trains consisting of the most significant bits of $X_0+X_7$, $X_1+X_6$, $X_2+X_5$ and $X_3+X_4$ as components are output from ROMs 325, 329, 333 and 337. Partial sums of $Y_0$ having 3 bit trains consisting of bits at bit positions 1, 2 and 3 of $X_0+X_7$, $X_1+X_6$, $X_2+X_5$ and $X_3+X_4$ as components are output from ROMs 326, 330, 334 and 338. Partial sums of $Y_0$ having 3 bit trains consisting of bits at bit positions 4, 5 and 6 of $X_0+X_7$, $X_1+X_6$, $X_2+X_5$ and $X_3+X_4$ as components are output from ROMs 327, 331, 335 and 339. Partial sums of $Y_0$ having 3 bit trains consisting of bits at bit positions 7, 8 and 9 of $X_0+X_7$, $X_1+X_6$, $X_2+X_5$ and $X_3+X_4$ as components are output from ROMs 328, 332, 336 and 340.

Outputs from ROMs 325, 329, 333 and 337 are summed in adders 341, 345 and 349. Outputs from ROMs 326, 330, 334 and 338 are summed in adders 342, 346 and 350. Outputs from ROMs 327, 331, 335 and 339 are summed in adders 343, 347 and 351. Outputs from ROMs 328, 332, 336 and 340 are summed in adders 344, 348 and 352. Therefore, the output from adder 349 will be the result of summation of four partial sums of $Y_0$ having 1 bit trains consisting of most significant bits of $X_0+X_7$, $X_1+X_6$, $X_2+X_5$ and $X_3+X_4$ (hereinafter referred to as partial sums related to the most significant bits). The output from adder 350 is the result of summation of four partial sums of $Y_0$ having 3 bit trains consisting of bits at bit positions 1, 2 and 3 of $X_0+X_7$, $X_1+X_6$, $X_2+X_5$ and $X_3+X_4$ as components, respectively (hereinafter referred to as partial sums related to bits at bit positions 1, 2 and 3). The output from adder 351 is the result of summation of four partial sums of $Y_0$ having 3 bit trains consisting of bits at bit positions 4, 5 and 6 of $X_0+X_7$, $X_1+X_6$, $X_2+X_5$ and $X_3+X_4$ as components (hereinafter referred to as partial sums related to bits at bit positions 4, 5 and 6). The output from adder 352 is the result of summation of four partial sums of $Y_0$ having 3 bit trains consisting of bits at bit positions 7, 8 and 9 of $X_0+X_7$, $X_1+X_6$, $X_2+X_5$ and $X_3+X_4$ as components, respectively (hereinafter referred to as partial sums related to bits at bit positions 7, 8 and 9).

Outputs from adders 349 and 351 are shifted by 3 bits upward by shifters 353 and 354, respectively, and added to outputs from adders 350 and 352 in adders 355 and 356. Therefore, the output of adder 355 is the result of addition of the partial sum (shifted by 3 bits upward) related to the most significant bit and the partial sum related to the bits of bit positions 1, 2 and 3. The output of adder 356 is the result of addition of the partial sum (shifted by 3 bits upward) related to the bits at bit positions 4, 5 and 6, and the partial sum related to the bits at bit positions 7, 8 and 9.

The output of adder 355 is shifted by 6 bits upward by shifter 357, and added to the output of adder 356 in adder 358. Therefore, the output of adder 358 is the result of addition of the partial sum (shifted by 9 bits upward) related to the most significant bits, partial sum (shifted by 6 bits upward) related to the bits of bit positions 1, 2 and 3, partial sum (shifted by 3 bits upward) related to the bits at bit positions 4, 5 and 6, and partial sum related to the bits at bit positions 7, 8 and 9.

The output of adder 358 is rounded to 9 bits at rounding circuit 359, and output from multiplication and accumulation block 324 to output terminal 360.

By the above described operation, four partial sums of $Y_0$ having 1 bit trains consisting of the most significant bits, four partial sums of $Y_0$ having 3 bit trains consisting of bits at bit positions 1, 2 and 3 as components, four partial sums of $Y_0$ having 3 bit trains consisting of bits at bit positions 4, 5 and 6 as components and four partial sums of $Y_0$ having 3 bit trains consisting of bits at bit positions 7,8 and 9 as components, of $X_0+X_7$, $X_1+X_6$, $X_2+X_5$ and $X_3+X_4$, that is, a total of 16 partial sums which are the entire partial sums of $Y_0$ are generated simultaneously. Since these partial sums are shifted and added as shown by the expression (21) in accordance with the bit positions, $Y_0$ is calculated.

In multiplication and accumulation block 324, 1 bit train consisting of most significant bit, 3 bit train consisting of bits at bit positions 1, 2 and 3, 3 bit train consisting of bits at bit positions 4, 5 and 6, and 3 bit train consisting of bits at bit positions 7, 8 and 9, of $X_0+X_7$ are input from bit distributor 319 to ROMs 325, 326, 327 and 328, respectively. 1 bit train consisting of the most significant bit, 3 bit train consisting of bits at bit positions 1, 2 and 3, 3 bit train consisting of bits at bit positions 4, 5 and 6 and 3 bit train consisting of bits at bit positions 7, 8 and 9 of $X_1+X_6$ are input from bit distributor 320 to ROMs 329, 330, 331 and 332, respectively. 1 bit train consisting of the most significant bit, 3 bit train consisting of bits at bit positions 1, 2 and 3, 3 bit train consisting of bits at bit positions 4, 5 and 6, and 3 bit train consisting of bits at bit positions 7, 8 and 9 of $X_2+X_5$ are input from bit distributor 321 to ROMs 333, 334, 335 and 336, respectively. 1 bit train consisting of the most significant bit, 3 bit train consisting of bits at bit positions 1, 2 and 3, 3 bit train consisting of bits at bit positions 4, 5 and 6, and 3 bit train consisting of bits at bit positions 7, 8 and 9 of $X_3+X_4$ are input from bit distributor 322 to ROMs 337, 338, 339 and 340, respectively. At that time, when row selection signal input from row selection circuit 323 to ROMs 325 to 340 is (001), (010) or (011), $Y_2$, $Y_4$ or $Y_6$ is calculated.

In multiplication and accumulation block 324, 1 bit train consisting of the most significant bit, 3 bit train consisting of bits at bit positions 1, 2 and 3, 3 bit train consisting of bits at bit positions 4, 5 and 6, and 3 bit train consisting of bits at bit positions 7, 8 and 9, of $X_0-X_7$ are input from bit distributor 319 to ROMs 325, 326, 327 and 328, respectively. 1 bit train consisting of the most significant bit, 3 bit train consisting of bits at bit positions 1, 2 and 3, 3 bit train consisting of bits at bit positions 4, 5 and 6 and 3 bit train consisting of bits at bit positions 7, 8 and 9 of $X_1-X_6$ are input from bit distributor 320 to ROMs 329, 330, 331 and 332, respectively. 1 bit train consisting of the most significant bit, 3 bit train consisting of bits at bit positions 1, 2 and 3, 3 bit train consisting of bits at bit positions 4, 5 and 6, and 3 bit train consisting of bits at bit positions 7, 8 and 9 of $X_2-X_5$ are input from bit distributor 321 to ROMs 333, 334, 335 and 336, respectively. 1 bit train consisting of the most significant bit, 3 bit train consisting of bits at bit positions 1, 2 and 3, 3 bit train consisting of bits at bit positions 4, 5 and 6, and 3 bit train consisting of bits at bit positions 7, 8 and 9 of $X_3-X_4$ are input from bit distributor 322 to ROMs 337, 338, 339 and 340, respectively. When the row selection signal input from row selection circuit 323 to ROMs 325 to 340 is (100), (101), (110) or (111), then $Y_1$, $Y_3$ $Y_5$ or $Y_7$ is calculated.

Which of (000), (001), ... , (111) is to be output as the selection signal of 3 bits from row selection circuit 323 is appropriately selected. Whether 1 bit train consisting of the most significant bit, 3 bit train consisting of bits at bit positions 1, 2 and 3, 3 bit train consisting of bits at bit positions 4, 5 and 6, and 3 bit train consisting of bits at bit positions 7, 8 and 9 of $X_0+X_7$, $X_1+X_6$, $X_2+X_5$ and $X_3+X_4$ which are outputs of registers 311, 313, 315 and 317, respectively, or of $X_0-X_7$, $X_1-X_6$, $X_2-X_5$ and $X_3-X_4$ which are the outputs of registers 312, 314, 316 and 318, respectively are to be output from bit distributors 319, 320, 321 and 322 is appropriately selected. $Y_0$ to $Y_7$ are calculated in a prescribed order in accordance with the row selection signal, and one-dimensional DCT is completed.

In the one-dimensional DCT circuit, $X_j$ (j=0 to 7) are input from input terminal 301 successively in 8 steps. $Y_0$ to $Y_7$ are calculated in multiplication and accumulation block 324 in 8 steps, that is, same in number as $Y_0$ to $Y_7$. Namely, the time for input is the same as the time for calculation. This means that the DCT circuit is capable of real time operation. Even when there is continuous input from input terminal 301 to DCT circuit, calculation can catch up, and image compression can be done efficiently.

The one-dimensional DCT performs 8 multiplication and accumulation operations implementing matrix representations (3) and (4) not in parallel as in the prior art but one by one in time-divisional manner. Further, in the one-dimensional DCT, 16 partial sums having 1 bit train consisting of the most significant bit, 3 bit train consisting of bits at bit positions 1, 2 and 3, 3 bit train consisting of bits at bit positions 4, 5 and 6 and 3 bit train consisting of bits at bit positions 7, 8 and 9 as components of each of four data which are the objects of one multiplication and accumulation, that is, all the partial sums related to one multiplication and accumulation are simultaneously generated from ROMs 325 to 340. Therefore, register is not necessary in the multiplication and accumulation block 324 and multiplication and accumulation can be done by 15 adders. Further, addition of partial sums is not fed back but fed forward. Therefore, when each coefficient of matrixes (3) and (4) has 10 bits, outputs from ROMs 325 to 340 have 12 bits, adder 356 has 17 bits, adder 355 has 15 bits, adders 350 to 352 have 14 bits, adders 342 to 344 and 346 to 348 have 13 bits, adder 349 has 12 bits, and adders 341 and 345 have 11 bits. Namely, the closer the adder is to the input side, the smaller the output bit width, and signal change can be reduced.

Further, each partial sum has only one fixed coefficient as shown by the expression (21). Therefore, the value which each partial sum assumes is an integer multiple of the fixed coefficient (see FIGS. 20A to 20D, 21A to 21D), which is more susceptible to compression when stored in the ROM. Therefore, capacity of the ROM can be made smaller.

Figure 22:
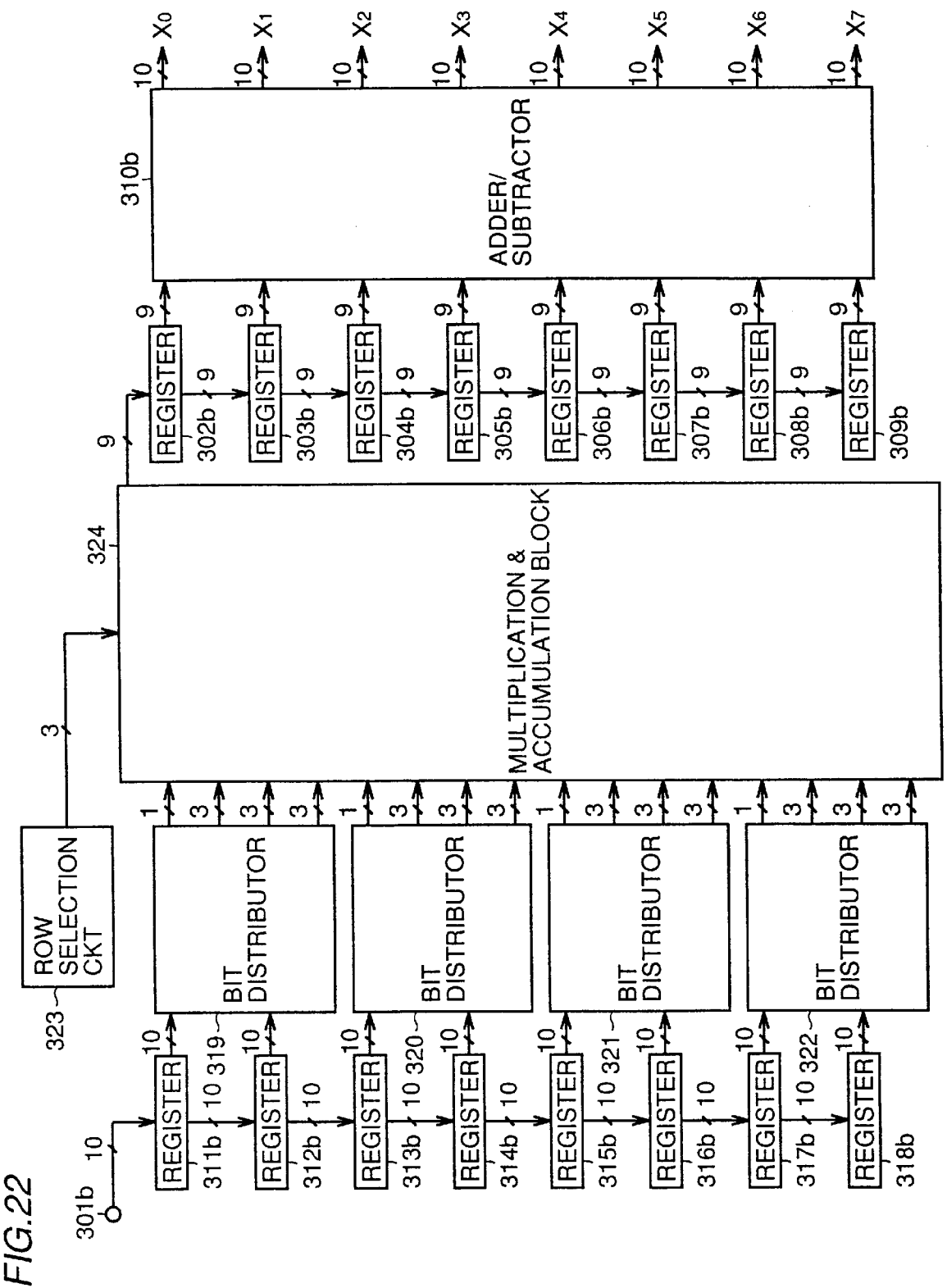
FIG. 22 is a block diagram of an IDCT circuit in accordance with a third embodiment of the present invention.

Referring to FIG. 22, by using multiplication and accumulation block 324, it is possible to provide a one-dimensional IDCT circuit (inverse discrete cosine transformer). The one-dimensional IDCT circuit is adapted to perform operations implementing matrix representations (7) and (8) on an input DCT coefficient $Y_i$ (i=0 to 7) by distributed arithmetic and to output data $X_j$ (j=0 to 7). Here, it is assumed that $X_j$ (j=0 to 7) and $Y_i$ (i=0 to 7) are each data having 10 bits.

Referring to FIG. 22, the one-dimensional IDCT circuit in accordance with the third embodiment includes: an input terminal 301b for inputting a DCT coefficient; registers 318b to 311b connected to input terminal 301b for holding DCT coefficients $Y_0$ to $Y_7$, respectively; a bit distributor 319 connected to registers 311b to 312b for distributing respective outputs to four sets including 1 bit train, 3 bit train, 3 bit train and 3 bit train, for outputting four sets for one output: a bit distributor 320 connected to registers 313b to 314b for distributing respective outputs to four sets including 1 bit train, 3 bit train, 3 bit train and 3 bit train from the most significant bit, for outputting four sets for one output; a bit distributor 321 connected to registers 315b to 316b for distributing respective outputs to four sets including 1 bit train, 3 bit train, 3 bit train and 3 bit train from the most significant bit, for outputting four sets for one output; a bit distributor 322 connected to registers 317b to 318b for distributing respective outputs to four sets including 1 bit train, 3 bit train, 3 bit train and 3 bit train from the most significant bit, for outputting four sets for one output; a multiplication and accumulation block 324 connected to bit distributors 319 to 322 and row selection circuit 323 for successively outputting $X_0+X_7$, $X_1+X_6$, $X_2+X_5$ and $X_3+X_4$ and $X_0-X_7$, $X_1-X_6$, $X_2-X_5$ and $X_3-X_4$ in accordance with the row selection signal output from row selection circuit 323; registers 309b to 302b connected to multiplication and accumulation block 324 for successively receiving and holding $X_0+X_7$, $X_1+X_6$, $X_2+X_5$ and $X_3+X_4$ and $X_0-X_7$, $X_1-X_6$, $X_2-X_5$ and $X_3-X_4$ output from multiplication and accumulation block 324, respectively; and an adder/subtractor 310b connected to registers 302b to 309b for outputting $X_0$ to $X_7$.

The operation of the circuit will be described in the following. 8 data $Y_0$ to $Y_7$ input from input terminal 301b are successively transferred to registers 311b to 318b in the order of input, and held in registers 318b to 311b, respectively. In bit distributors 319 to 322 and multiplication and accumulation block 324, operations realizing matrix representations are performed in the similar manner as in one-dimensional DCT. Results of operations $X_0+X_7$, $X_1+X_6$, $X_2+X_5$, $X_3+X_4$, $X_0-X_7$, $X_1-X_6$, $X_2-X_5$ and $X_3-X_4$, are successively output from multiplication and accumulation block 324. The results of operation are held in registers 302b to 309b. Adder/subtractor 310b receive values held in registers 302b to 309b, and outputs data $X_0$ to $X_7$.

Though one-dimensional DCT circuit and one-dimensional IDCT circuit have been described in the above embodiments, number of bits of $X_j$ and $Y_j$, number of bits of each of the coefficients of matrixes in (3), (4), (7) and (8) and so on are not limited to those described with reference to the above embodiments. Other bit numbers may be used.

In the third embodiment, input data to the bit distributor is divided into four sets of bit trains including 1 bit train consisting of the most significant bit, 3 bit train consisting of bits at bit positions 1, 2 and 3, 3 bit train consisting of bits at bit positions 4, 5 and 6 and 3 bit train consisting of bits at bit positions 7, 8 and 9. However, the manner of distribution is not limited thereto. The input data may be distributed with other bit ratio or distributed to sets other than four.

Though a shifter is used for shifting partial sum having a bit train consisting of bits of more significant bits as its component, shifting may be done by appropriate connection to adders, without providing such specific circuit.

By the discrete cosine transformer and the inverse discrete cosine transformer described with reference to the first to third embodiments, real time processing can be done without using a multiplier, the circuit scale can be reduced and the power consumption can be reduced. Further, the bit width of the output can be made smaller as it is nearer to the input side in the multiplication and accumulation block. Therefore, power consumption can be reduced.

According to the discrete cosine transformer or the inverse discrete cosine transformer of the second embodiment, the number of ROMs can be reduced.

By the discrete cosine transformer or the inverse discrete cosine transformer of the third embodiment, capacity of the ROM can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A discrete cosine transformer, comprising:

an adder/subtractor receiving a plurality of image data items for outputting a plurality of image data item addition/subtraction values in accordance with a prescribed rule;

a bit distributor connected to said adder/subtractor, receiving said plurality of image data item addition/subtraction values, for outputting a plurality of bit trains consisting of bits at same bit positions of said plurality of image data item addition/subtraction values;

a selection signal generating circuit for successively generating a selection signal of a DCT coefficient; and a DCT coefficient generating circuit connected to said bit distributor and said selection signal generating circuit, receiving said plurality of bit trains and responsive to said successively generated selection signal, performing calculation of said DCT coefficient in time-divisional manner.

2. The discrete cosine transformer according to claim 1, wherein said DCT coefficient generating circuit includes a bus having a minimum bit width for transferring an internal data item.

3. The discrete cosine transformer according to claim 1, wherein said DCT coefficient generating circuit includes memories same in number as bit number of said image data item addition/subtraction values, connected to said bit distributor and said selection signal generating circuit, responsive to said plurality of bit trains respectively and to said selection signal, for outputting partial sums of said DCT coefficient, respectively, and a circuit connected to said memories same in number as the bit number of said image data item addition/subtraction values, responsive to bit position of said plurality of image data item addition/subtraction values for shifting and adding a plurality of said partial sums.

4. The discrete cosine transformer according to claim 3, wherein said DCT coefficient generating circuit includes a bus having a minimum bit width for transferring an internal data item.

5. The discrete cosine transformer according to claim 1, wherein said DCT coefficient generating circuit includes a single memory connected to said selection signal generating circuit, responsive to said selection signal for outputting a plurality of partial sums of said DCT coefficient, a plurality of selectors, and a circuit connected to each of said plurality of selectors, responsive to bit position of said plurality of image data item addition/subtraction values for shifting and adding said plurality of partial sums; and each of said plurality of selectors is connected to said single memory and bit distributor, receives said plurality of partial sums, and responsive to a value of a predetermined bit train of said plurality of bit trains, selects and outputs one of said plurality of partial sums.

6. The discrete cosine transformer according to claim 5, wherein said DCT coefficient generating circuit includes a bus having a minimum bit width for transferring an internal data item.

7. A discrete cosine transformer, comprising:
   an adder/subtractor receiving a plurality of image data items for outputting a plurality of image data item addition/subtraction values in accordance with a prescribed rule;
   a bit distributor connected to said adder/subtractor, receiving said plurality of image data item addition/subtraction values for outputting a plurality of bit trains consisting of bits at continuous bit positions of said image data item addition/subtraction values;
   a selection signal generating circuit for successively generating a selection signal of a DCT coefficient; and
   a DCT coefficient generating circuit connected to said bit distributor and said selection signal generating circuit, receiving said plurality of bit trains, responsive to successively generated said selection signal for performing calculation of said DCT coefficient in time-divisional manner.

8. The discrete cosine transformer according to claim 7, wherein
   said DCT coefficient generating circuit includes a bus having a minimum bit width for transferring an internal data item.

9. The discrete cosine transformer according to claim 7, wherein
   said DCT coefficient generating circuit includes a plurality of memories connected to said bit distributor and said selection signal generating circuit, responsive to said plurality of bit trains respectively and to said selection signal for outputting partial sums of said DCT coefficient respectively, and
   a circuit connected to said plurality of memories respectively, responsive to continuous bit positions of said image data item addition/subtraction values, for shifting and adding a plurality of said partial sums.

10. The discrete cosine transformer according to claim 9, wherein
    said DCT coefficient generating circuit includes a bus having a minimum bit width for transferring an internal data item.

11. An inverse discrete cosine transformer, comprising:
    a bit distributor receiving a plurality of DCT coefficients for outputting a plurality of bit trains consisting of bits at same bit position of said plurality of DCT coefficients;
    a selection signal generating circuit for generating a selection signal of image data item addition/subtraction value;
    an image data item addition/subtraction value generating circuit connected to said bit distributor and said selection signal generating circuit, receiving said plurality of bit trains, and responsive to successively generated said selection signal, for performing calculation of said image data item addition/subtraction values in time-divisional manner; and
    an adder/subtractor connected to said image data item addition/subtraction value generating circuit, receiving a plurality of said image data item addition/subtraction values for outputting a plurality of image data item in accordance with a prescribed rule.

12. The inverse discrete cosine transformer according to claim 11, wherein
    said image data item addition/subtraction value generating circuit includes a bus having a minimum bit width for transferring an internal data item.

13. The inverse discrete cosine transformer according to claim 11, wherein
    said image data item addition/subtraction value generating circuit includes memories same in number as bit number of said DCT coefficient, connected to said bit distributor and said selection signal generating circuit, responsive to said plurality of bit trains and to said selection signal, for outputting partial sums of said image data item addition/subtraction values, respectively, and
    a circuit connected to said memories same in number as the bit number of said DCT coefficient respectively, responsive to bit position of said plurality of DCT coefficients, for shifting and adding a plurality of said partial sums.

14. The inverse discrete cosine transformer according to claim 13, wherein
    said image data item addition/subtraction value generating circuit includes a bus having a minimum bit width for transferring an internal data item.

15. The inverse discrete cosine transformer cosine transformer according to claim 11, wherein
    said image data item addition/subtraction value generating circuit includes a single memory connected to said selection signal generating circuit, responsive to said selection signal for outputting a plurality of partial sums of said image data item addition/subtraction value,
    a plurality of selectors, and
    a circuit connected to said plurality of selectors respectively, responsive to a bit position of said plurality of DCT coefficient for shifting and adding said plurality of partial sums; and
    each of said plurality of selectors is connected to said single memory and said bit distributor, receives said plurality of partial sums and responsive to a value of a predetermined bit train of said plurality of bit trains, selects and outputs one of the plurality of said partial sums.

16. The inverse discrete cosine transformer according to claim 15, wherein
    said image data item addition/subtraction value generating circuit includes a bus having a minimum bit width for transferring an internal data item.

17. An inverse discrete cosine transformer, comprising:
    a bit distributor receiving a plurality of DCT coefficients, for outputting a plurality of bit trains consisting of bits at continuous bit positions of the DCT coefficients;
    a selection signal generating circuit for successively generating a selection signal of image data item addition/subtraction value;
    an image data item addition/subtraction value generating circuit connected to said bit distributor and said selection signal generating circuit, receiving said plurality of bit trains, and responsive to successively generated said selection signal, performing calculation of said image data item addition/subtraction value in time-divisional manner; and
    an adder/subtractor connected to said image data item addition/subtraction value generating circuit, receiving a plurality of said image data item addition/subtraction values, for outputting a plurality of image data items in accordance with a prescribed rule.

18. The inverse discrete cosine transformer according to claim 17, wherein said image data item addition/subtraction value generating circuit includes a bus having a minimum bit width for transferring an internal data item.

19. The inverse discrete cosine transformer according to claim 17, wherein said image data item addition/subtraction value generating circuit includes a plurality of memories connected to said bit distributor and said selection signal generating circuit, responsive to said plurality of bit trains respectively and to said selection signal, for outputting partial sums of said image data item addition/subtraction value respectively, and a circuit connected to said plurality of memories respectively, responsive to continuous bit positions of said DCT coefficient for shifting and adding a plurality of said partial sums, respectively.

20. The inverse discrete cosine transformer according to claim 19, wherein said image data item addition/subtraction value generating circuit includes a bus having a minimum bit width for transferring an internal data item.

* * * * *